US012683794B2

(12) United States Patent　　　(10) Patent No.:　US 12,683,794 B2
Wheeler et al.　　　　　　　　　 (45) Date of Patent:　　　Jul. 14, 2026

(54) SYSTEMS AND METHODS FOR ESTABLISHING SHARED TRUST BETWEEN A PRIMARY CLIENT USER AND RECIPIENT AGENT USER

(71) Applicant: Wells Fargo Bank, N.A., San Francisco, CA (US)

(72) Inventors: Matthew N. Wheeler, Charlotte, NC (US); John Andrew Chuprevich, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 132 days.

(21) Appl. No.: 18/482,687

(22) Filed: Oct. 6, 2023

(65) Prior Publication Data

US 2025/0119294 A1　　Apr. 10, 2025

(51) Int. Cl.
| | |
|---|---|
| *H04L 29/06* | (2006.01) |
| *H04L 9/06* | (2006.01) |
| *H04L 9/08* | (2006.01) |
| *H04L 9/32* | (2006.01) |
| *H04L 9/40* | (2022.01) |

(52) U.S. Cl.
CPC .......... *H04L 9/3228* (2013.01); *H04L 9/0625* (2013.01); *H04L 9/0643* (2013.01); *H04L 9/085* (2013.01); *H04L 9/3273* (2013.01); *H04L 63/18* (2013.01)

(58) Field of Classification Search
None
See application file for complete search history.

(56) References Cited

U.S. PATENT DOCUMENTS

| | | | |
|---|---|---|---|
| 9,197,746 | B2 | 11/2015 | Kurapati |
| 9,609,514 | B2 | 3/2017 | Mistry |
| 10,812,661 | B2 | 10/2020 | Garg |
| 2009/0217039 | A1* | 8/2009 | Kurapati ............... H04L 9/3273 |
| | | | 713/168 |
| 2015/0350224 | A1 | 12/2015 | Li |
| 2016/0219435 | A1* | 7/2016 | Mistry .................. H04L 65/403 |

(Continued)

OTHER PUBLICATIONS

"Hiya: Caller ID, Call Blocker Protection for a Better Voice Experience", retrieved from https://www.hiya.com, Jun. 16, 2023, 10 pages (2023).

(Continued)

*Primary Examiner* — Andrew J Steinle

(74) *Attorney, Agent, or Firm* — K&L Gates LLP

(57)　　　　　　ABSTRACT

Systems, apparatuses, methods, and computer program products are disclosed for establishing shared trust between a client user and an agent user for a current communication. An example method includes providing a logon request for a client user account associated with a client user to a system device. The example method further includes determining an authentication sequence code using the mobile application in an instance in which the logon request was successfully authenticated and causing the authentication sequence code to be provided to the agent device associated with the agent user. The example method further includes receiving a shared trust decision message from the system device, wherein the shared trust decision message is indicative of a verification status for the current communication.

20 Claims, 33 Drawing Sheets

(56) References Cited

U.S. PATENT DOCUMENTS

| | | | |
|---|---|---|---|
| 2020/0162450 A1 | 5/2020 | Yarabolu | |
| 2022/0247836 A1* | 8/2022 | Duong | ............... H04L 63/0807 |
| 2023/0379324 A1* | 11/2023 | Gillis | ................. H04L 63/0861 |

OTHER PUBLICATIONS

"Making it clear when we"re on a call with you to protect you from fraud", Retrieved from https://monzo.com/blog/2023/09/06/making-it-clear-when-were-on-a-call-with-you, Sep. 6, 2023, 7 pages.
Wise, "Monzo launches industry-first "call status" tool to stall impersonation scams", Retrieved from https://www.standard.co.uk/news/tech/monzo-starling-bank-people-b1105137.html, Sep. 6, 2023, 5 pages.

* cited by examiner

Example Implementation of 502

Generate an agent shared system key for the agent user
602

Provide the agent shared system key to the agent device
604

Protect the agent shared system key
606

Store the protected agent shared system key
608

To 504

Example Implementation of 504

From 502

Generate a client shared system key for the client user
702

Provide the client shared system key to the client device
704

Protect the client shared system key
706

Store the protected client shared system key
708

To 506

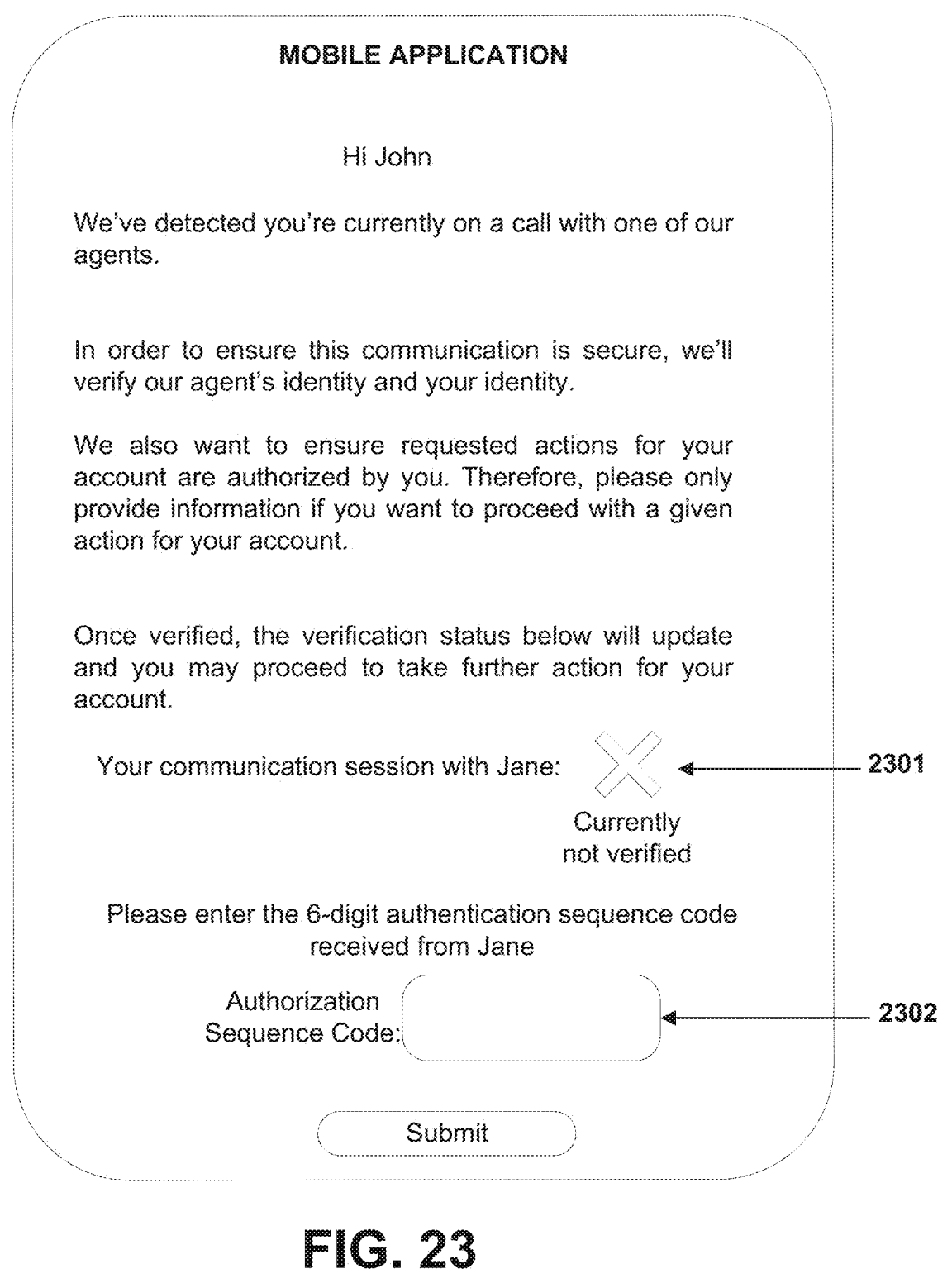

MOBILE APPLICATION

Hi John

We've detected you're currently on a call with one of our agents.

In order to ensure this communication is secure, we'll verify our agent's identity and your identity.

We also want to ensure requested actions for your account are authorized by you. Therefore, please only provide information if you want to proceed with a given action for your account.

Once verified, the verification status below will update and you may proceed to take further action for your account.

Your communication session with Jane:    ✕  ◄————— 2301

Currently
not verified

Please enter the 6-digit authentication sequence code received from Jane

Authorization
Sequence Code:  [                    ]  ◄————— 2302

Submit

FIG. 23

MOBILE APPLICATION

Hi John

We've detected you're currently on a call with one of our agents.

In order to ensure this communication is secure, we'll verify our agent's identity and your identity.

We also want to ensure requested actions for your account are authorized by you. Therefore, please only provide information if you want to proceed with a given action for your account.

Once verified, the verification status below will update and you may proceed to take further action for your account.

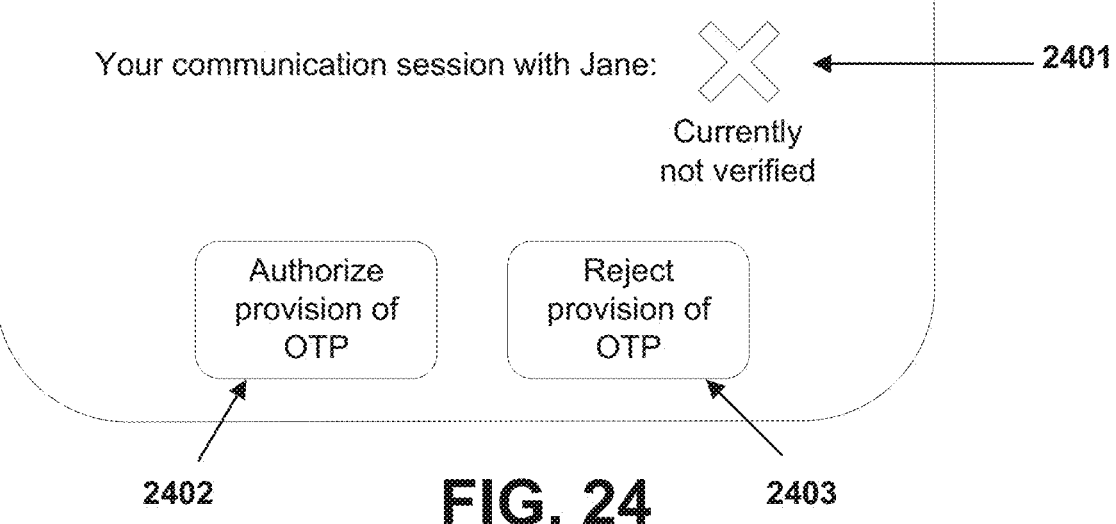

Your communication session with Jane:                    ◄——— 2401

Currently
not verified

| Authorize provision of OTP | Reject provision of OTP |

2402                    FIG. 24                    2403

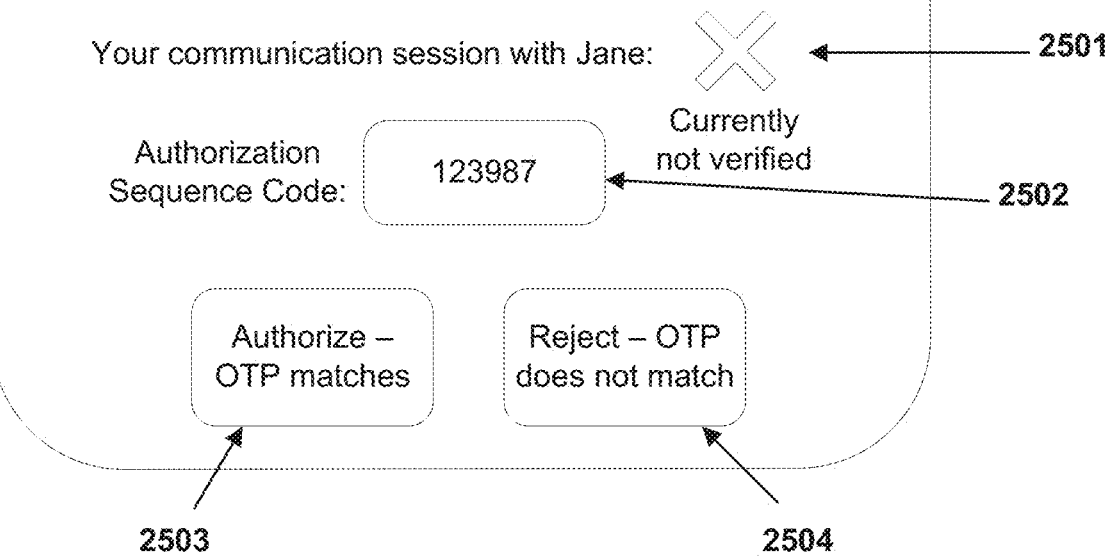

MOBILE APPLICATION

Hi John

We've detected you're currently on a call with one of our agents.

In order to ensure this communication is secure, we'll verify our agent's identity and your identity.

We also want to ensure requested actions for your account are authorized by you. Therefore, please only provide information if you want to proceed with a given action for your account.

Once verified, the verification status below will update and you may proceed to take further action for your account.

Your communication session with Jane:   ✕   ⟵ 2501

Currently not verified

Authorization Sequence Code:   123987   ⟵ 2502

Authorize – OTP matches

Reject – OTP does not match 2503   2504

FIG. 25

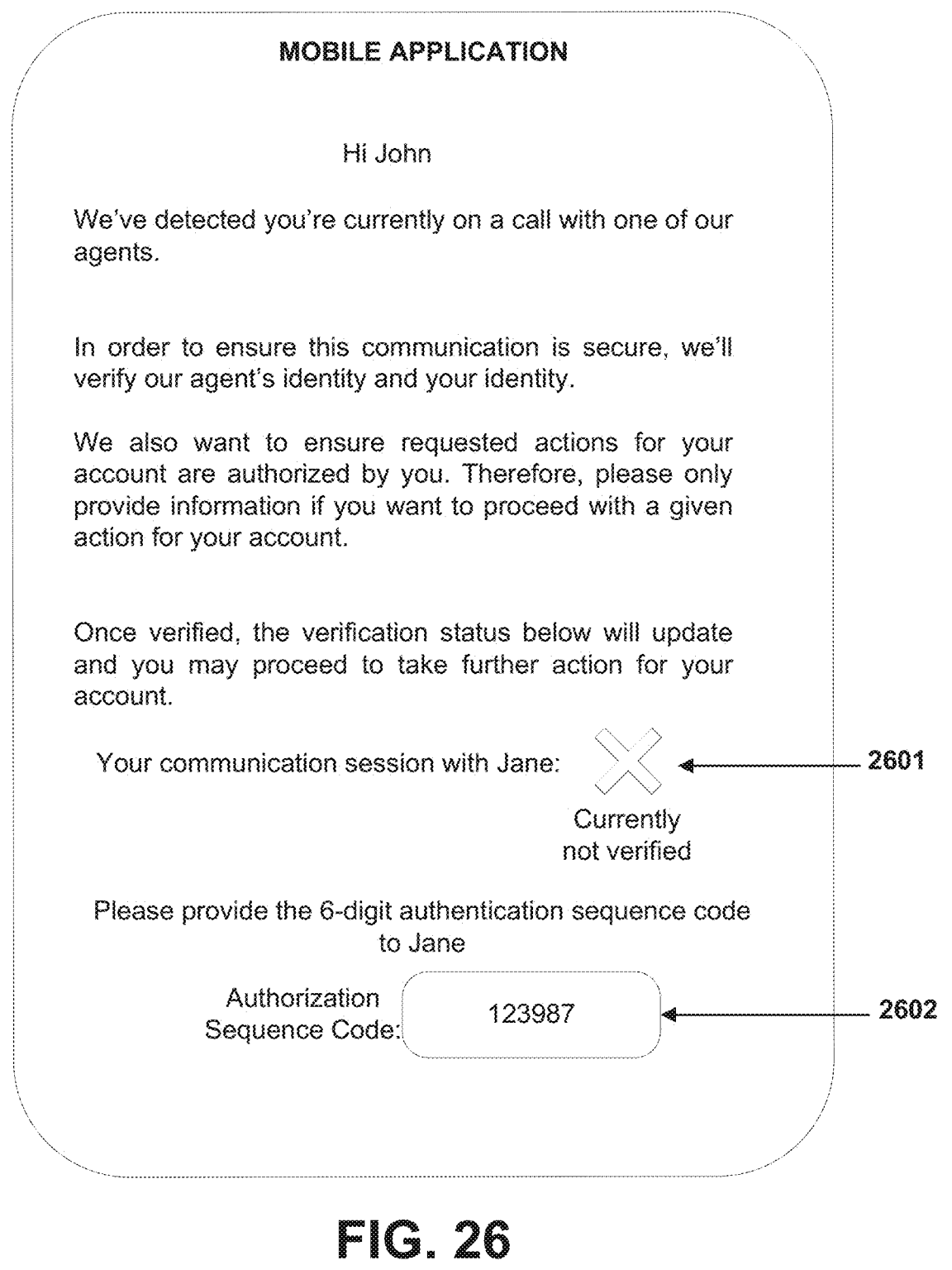

MOBILE APPLICATION

Hi John

We've detected you're currently on a call with one of our agents.

In order to ensure this communication is secure, we'll verify our agent's identity and your identity.

We also want to ensure requested actions for your account are authorized by you. Therefore, please only provide information if you want to proceed with a given action for your account.

Once verified, the verification status below will update and you may proceed to take further action for your account.

Your communication session with Jane:   ✕   ◀——— 2601

Currently
not verified

Please provide the 6-digit authentication sequence code to Jane

Authorization
Sequence Code:    123987   ◀——— 2602

FIG. 26

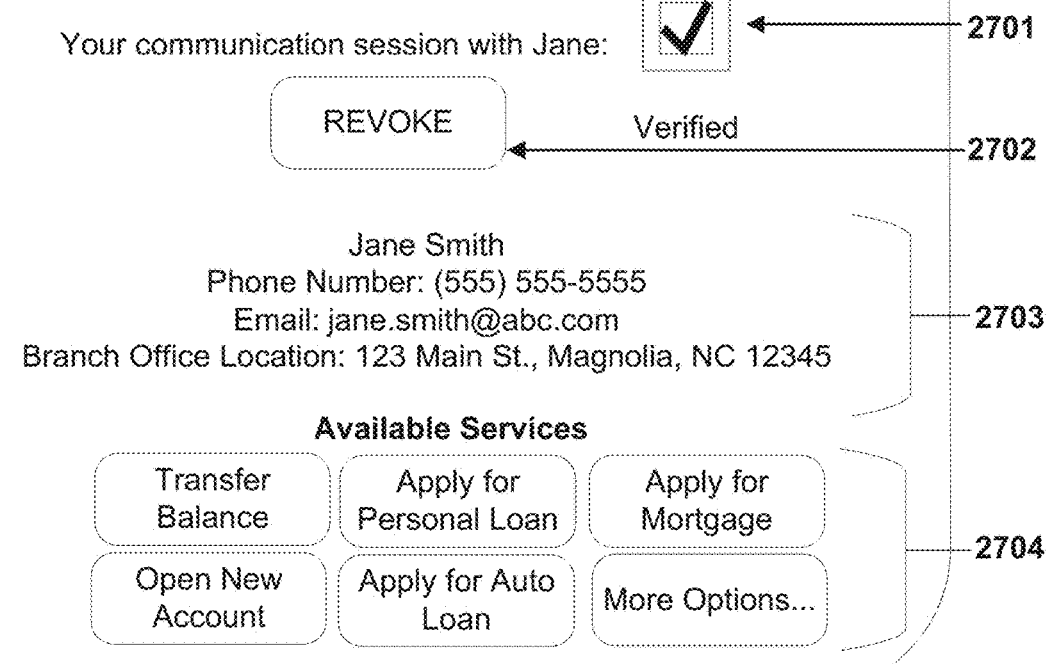

MOBILE APPLICATION

Hi John

We've detected you're currently on a call with one of our agents.

In order to ensure this communication is secure, we'll verify our agent's identity and your identity.

We also want to ensure requested actions for your account are authorized by you. Therefore, please only provide information if you want to proceed with a given action for your account.

Once verified, the verification status below will update and you may proceed to take further action for your account.

Your communication session with Jane:    ☑ ← 2701

REVOKE    Verified —2702

Jane Smith
Phone Number: (555) 555-5555
Email: jane.smith@abc.com
Branch Office Location: 123 Main St., Magnolia, NC 12345 —2703

Available Services

| Transfer Balance | Apply for Personal Loan | Apply for Mortgage |
| Open New Account | Apply for Auto Loan | More Options... |

SYSTEMS AND METHODS FOR ESTABLISHING SHARED TRUST BETWEEN A PRIMARY CLIENT USER AND RECIPIENT AGENT USER

BACKGROUND

Authentication challenges, such as one-time password (OTP) challenges, provide a mechanism for companies to verify the identity of a user prior to performing services or actions for the user and/or user account. In particular, user responses to verification challenges may be used to verify a user identity.

BRIEF SUMMARY

As described above, verification challenges have been used by companies as a security mechanism to verify a user's identity prior to performing some operation. In particular, verification challenges have traditionally been used as one factor in two-factor authentication (2FA) or multi-factor authentication (MFA) setups, such as when authenticating user account access. In some examples, verification challenges have also been used outside the 2FA and MFA context in situations where they may serve as a means for a user to authorize or verify certain actions, such as transactions, for a user account.

These traditional approaches have been one-sided and merely serve to authenticate the user. Thus, traditional approaches may leave users vulnerable to fraudulent activity, such as phishing scams or impersonation scams. For example, fraudulent users may pose as a legitimate agent or representative of a company and deceive users into providing them with codes (e.g., an OTP) necessary to access the user's accounts. Even in instances where the provision of a code is to a legitimate agent, these conventional approaches only establish unidirectional trust such that the user is not provided with any assurances of the agent's identity. Thus, users may actually be more susceptible to fraudulent behavior as these traditional approaches condition the provision of codes without mutual assurance. Furthermore, while these traditional approaches may serve to verify certain actions for a user account, these traditional approaches are often limited to broad verifications, such as verifying a particular transaction or verifying a registration request for communication channel or device (e.g., adding an email account or a device to a user account). However, these approaches fail to consider verification of more granular actions performed for a user account.

In contrast to these conventional techniques for verification challenges, example embodiments described herein allow for shared trust to be established between a client user using a client device and an agent user using an agent device. In doing so, example embodiments described herein establish bi-directional trust between the client user and agent user and further, may serve to verify client user intent and/or authorization to perform granular actions or interactions related to his/her client user account.

In particular, a current communication over a communication channel may be established between the client user via the client device and the agent user via the agent device. The communication channel may be any pathway or medium through which the client user and agent user communicate, such as a phone call, an online or mobile application chat center, text messaging, and/or the like. In some examples, the current communication may further associated with one or more particular client user requests associated with a client user account. A system device may determine the current communication and assign a client device of the client user or agent device of the agent user to be a primary device and the remaining device to be the recipient device. The primary device may determine an authentication sequence code, which may be an OTP. In some examples, in order for the primary device to determine the authentication sequence code and in an instance in which the primary device is the client device, the client user must be logged into a mobile application, thus requiring the client user to provide a client user identifier and authorized client user credentials (e.g., a password, biometric data, personal identification number, and/or the like) to access. In an instance in which the primary device is the agent device, the agent user must be logged into an internal account environment, thus requiring the agent user to provide an agent user identifier and authorized agent user credentials to access.

The primary device may provide the authentication sequence code to the recipient device and the recipient device in turn, may generate a candidate authentication sequence code message and provide this candidate authentication sequence code message to the system device. In some examples, in order for the recipient device to determine the candidate authentication sequence code and in an instance in which the recipient device is the client device, the client user must be logged into a mobile application, thus requiring the client user to provide a client user identifier and authorized client user credentials to access. In an instance in which the recipient device is the agent device, the agent user must be logged into an internal account environment, thus requiring the agent user to provide an agent user identifier and authorized agent user credentials to access.

In some examples, the authentication sequence code may be displayed to a primary user (e.g., within the mobile application for a client user or within the internal account environment for the agent user) of the primary device, who may then relay the authentication sequence code to the recipient user, such as by verbally describing the authentication sequence code if the communication channel is a phone call or by messaging the authentication sequence code if the communication channel is a text-based platform. In turn, the recipient user may be required to input a candidate authentication message into the mobile application in an instance in which the recipient user is the client user or into the internal account environment in an instance in which the recipient user is the agent user.

Alternatively, the primary device may provide the authentication sequence code to the recipient device in response to authorization to do so from the primary user (e.g., interaction with an authorization element within a mobile application of a client device or within an internal account environment of an agent device) such that the primary user need not directly exchange information about the authentication sequence code. Similarly, the recipient device may provide the candidate authentication sequence code to the system device in response to authorization to do so from the recipient user (e.g., interaction with an authorization element within a mobile application of a client device or within an internal account environment of an agent device).

In some examples, the authentication sequence code may also be provided to a recipient user of the recipient device as a candidate authentication sequence code and this candidate authentication sequence code may be displayed to the recipient user (e.g., within the mobile application for a client user or within the internal account environment for the agent user). The authentication code may also be displayed to a primary user (e.g., within the mobile application for a client user or within the internal account environment for the agent user) of the primary device, who may then relay the authentication sequence code to the recipient user, such as by verbally describing the authentication sequence code if the communication channel is a phone call or by messaging the authentication sequence code if the communication channel is a text-based platform. In turn, the recipient user may be required to verify the candidate authentication sequence code based on the primary user's response. Thus, the recipient user may verify the candidate authentication sequence code.

The system device may receive the candidate authentication sequence code message, which may include the candidate authentication sequence code or an indication of whether the candidate authentication sequence message was verified or rejected by the recipient user. In an instance in which the candidate authentication sequence code message includes the candidate authentication sequence code, the system device may perform verification operations to determine whether to verify or reject the candidate authentication sequence code. The system device may update a verification status for the current communication based on whether the candidate authentication sequence code was successfully verified. Alternatively, in an instance in which the candidate authentication sequence code message includes the indication of whether the candidate authentication sequence message was verified or rejected by the recipient user, the system device may automatically determine to proceed to update the verification status of the current communication based on this indication. The system device may further provide a shared trust decision message that includes the verification status of the current communication to both the client device and agent device. As such, a client user and agent user may be apprised of whether the other identity of the party has been authenticated. Additionally, in some examples in which the current communication is associated with one or more client user request, the client user may further provide an authorization or indication of his/her intent to proceed with the particular action or interaction.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 23 illustrates an example user interface of a mobile application where a current communication has not yet been verified and an input element may be used to provide the candidate authentication sequence code, as used in some example embodiments described herein.

FIG. 24 illustrates an example user interface of a mobile application where a current communication has not yet been verified and an authorization element may be used to provide the candidate authentication sequence code, as used in some example embodiments described herein.

FIG. 25 illustrates an example user interface of a mobile application where a current communication has not yet been verified and a recipient user may authenticate or verify a candidate authentication code, as used in some example embodiments described herein.

FIG. 26 illustrates an example user interface of a mobile application where a current communication has not yet been verified and an indication element may be used to display the authentication sequence code, as used in some example embodiments described herein.

FIG. 27 illustrates an example user interface of a mobile application where a current communication has been verified, as used in some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1A:
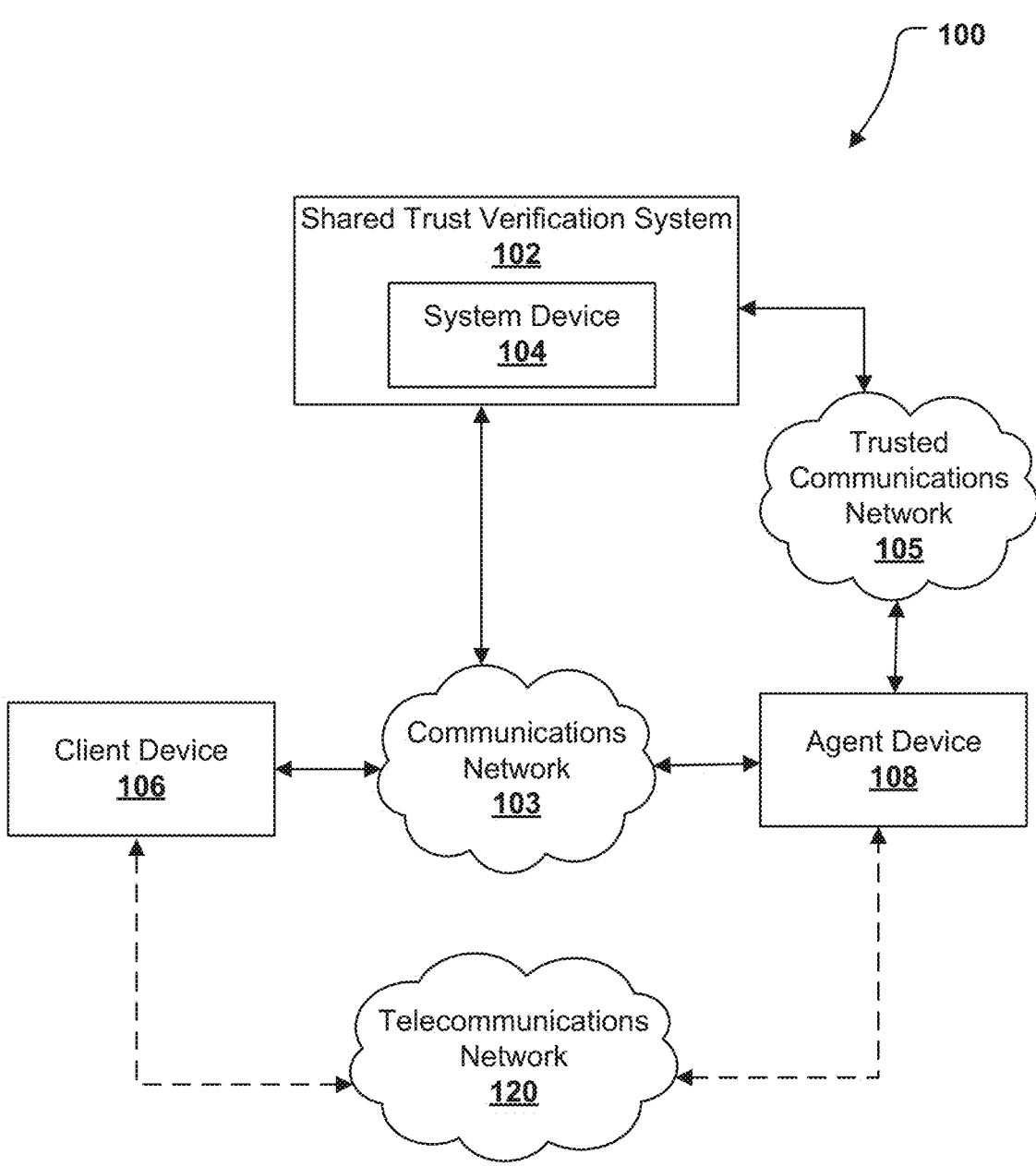
FIGS. 1A, 1B, and 1C illustrate example systems in which some example embodiments may be used to establish shared trust between a client user and an agent user for a current communication.
Figure 1B:
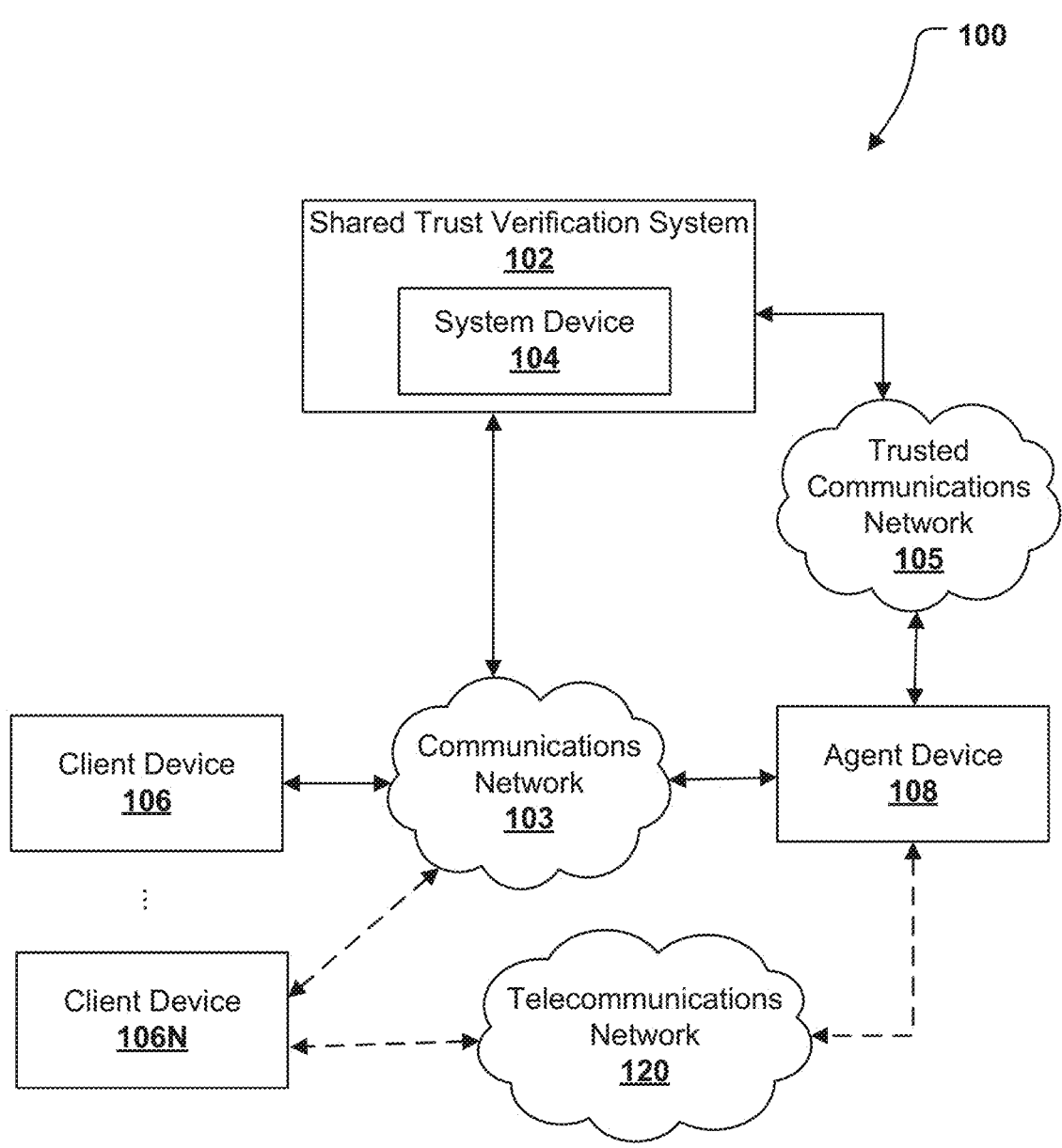
Figure 1C:
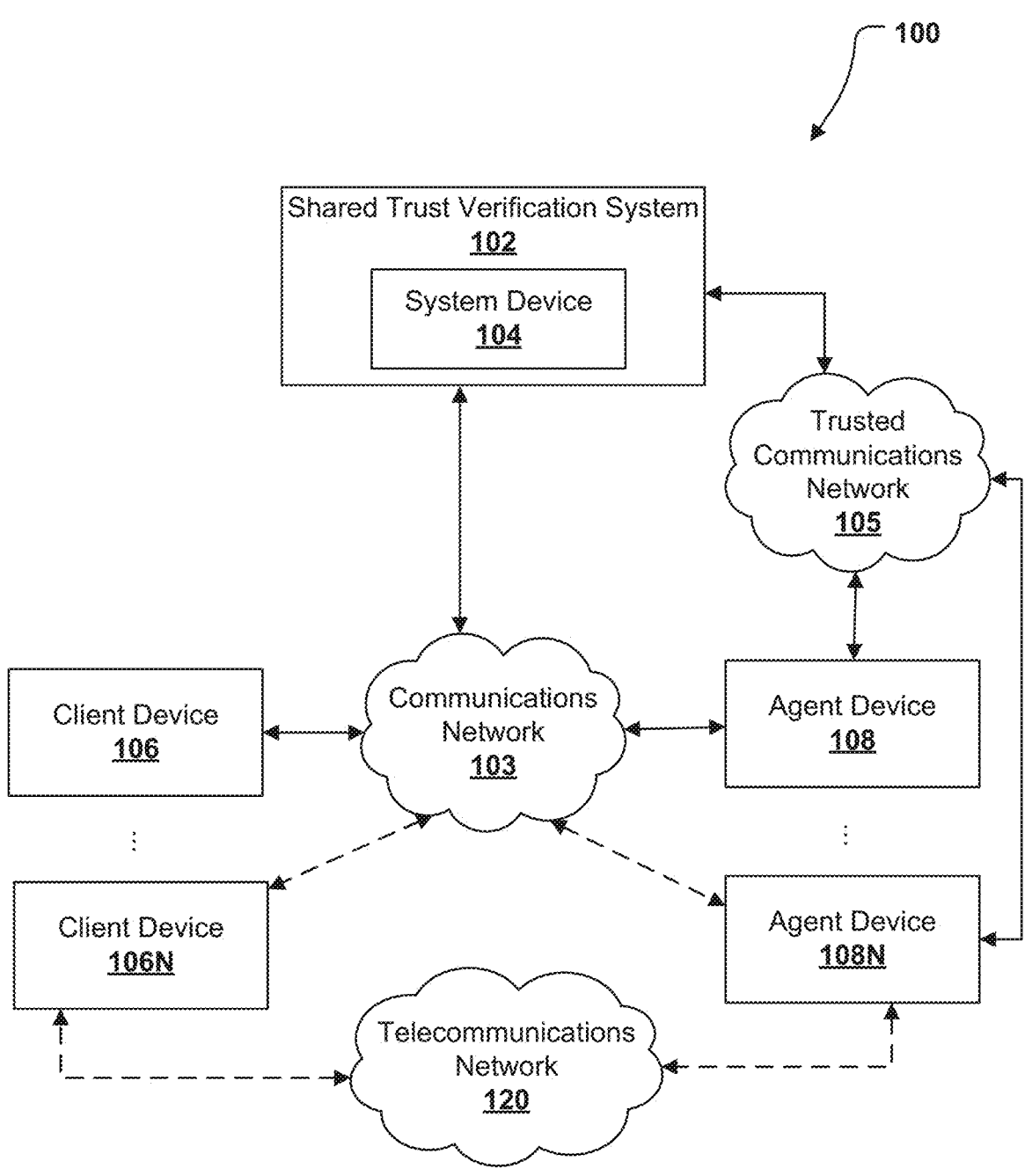

Example embodiments described herein may be implemented using any of a variety of computing devices or servers. To this end, FIGS. 1A-1C illustrate example environment 100 within which various embodiments may operate. As illustrated, a shared trust verification system 102 may receive and/or transmit information via communications network 103 (e.g., the Internet) with any number of other devices, such as client device 106-106N and/or agent device 108-108N. Additionally, the shared trust verification system 102 may receive and/or transmit information via trusted communications network 105 (e.g., an Intranet), which may be a private or restricted communication environment within which only certain, authorized devices may communication. A system device 104 of the shared trust verification system 102 and the agent device 108 may be authorized devices and may receive and/or transmit information via trusted communications network 105.

The shared trust verification system 102 may be implemented as one or more computing devices or servers, which may be composed of a series of components. Particular components of the shared trust verification system 102 are described in greater detail below with reference to apparatus 200 in connection with FIG. 2.

In some embodiments, the shared trust verification system 102 further includes a system device 104. The system device 104 may be embodied by any computing devices known in the art. In some embodiments, the shared trust verification system 102 further includes a storage device that comprises a distinct component from other components of the shared trust verification system 102. The storage device may be embodied as one or more direct-attached storage devices (such as hard drives, solid-state drives, optical disc drives, or the like) or may alternatively comprise one or more network attached storage devices independently connected to a communications network (e.g., communications network 103). The storage device may host the software executed to operate the shared trust verification system 102. The storage device may store information relied upon during operation of the shared trust verification system 102, such as various shared system keys that may be used by the shared trust verification system 102, data and documents to be analyzed using the shared trust verification system 102, or the like. In addition, the storage device may store control signals, device characteristics, and access credentials enabling interaction between the shared trust verification system 102 and one or more of the client device 106, or agent device 108.

The client device 106 and/or agent device 108, may be embodied by any computing devices known in the art. In some embodiments, the client devices 106-106N and agent devices 108A-108N may additionally or alternatively receive and/or transmit information via telecommunications network 120. The client device 106 and/or the agent device 108 need not themselves be independent devices, but may be peripheral devices communicatively coupled to other computing devices. In some embodiments, the client device 106 may be associated with a client user who is associated with a client user account maintained by the shared trust verification system 102 (e.g., a customer). In some embodiments, the agent device 108 may be associated with an agent user who is an authorized user associated with the shared trust verification system 102 (e.g., an employee of the entity associated with the shared trust verification system 102). Particular components of the client device 106 are described in greater detail below with reference to apparatus 300 in connection with FIG. 3, while particular components of the agent device 108 are described in greater detail below with reference to apparatus 400 in connection with FIG. 4.

Example Implementing Apparatuses

System Device

Figure 2:
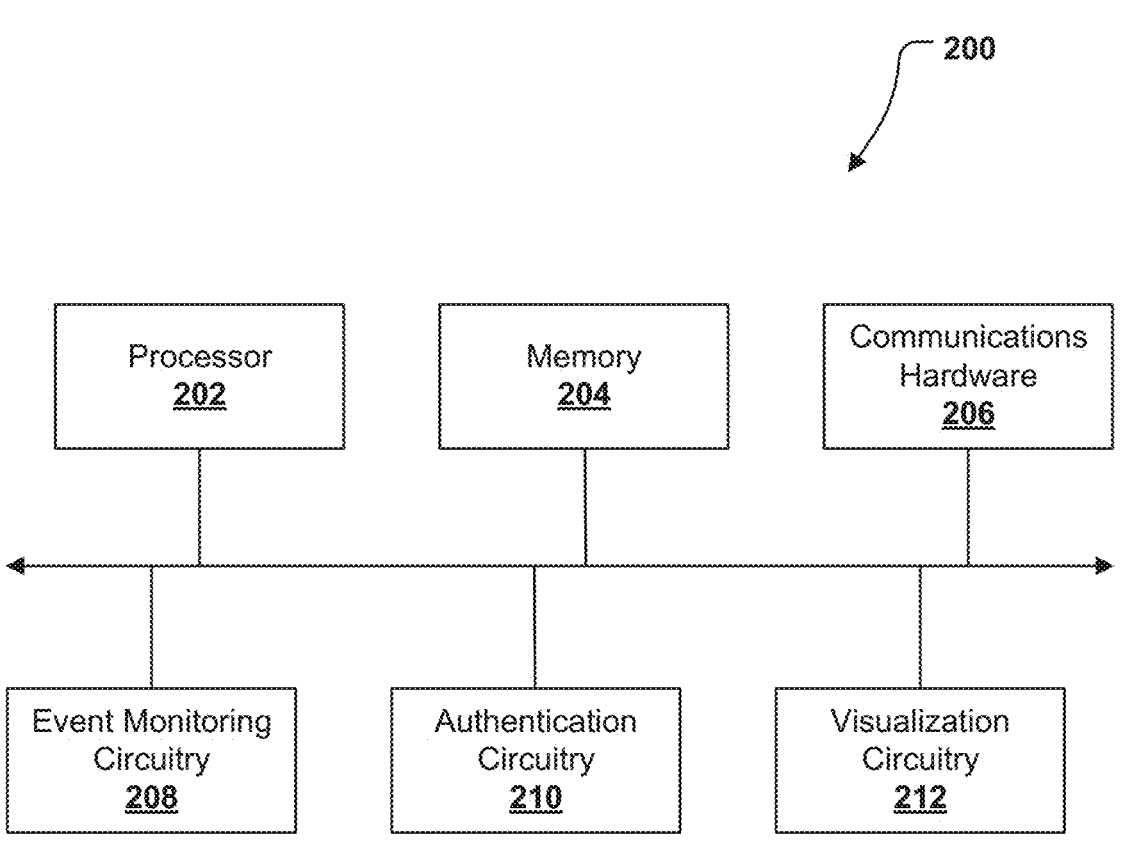
FIG. 2 illustrates a schematic block diagram of example circuitry embodying a system device that may perform various operations in accordance with some example embodiments described herein.

The system device 104 (described previously with reference to FIGS. 1A-1C) may be embodied by one or more computing devices or servers, shown as apparatus 200 in FIG. 2. The apparatus 200 may be configured to execute various operations described above in connection with FIGS. 1A-1C and below in connection with FIGS. 5-24. As illustrated in FIG. 2, the apparatus 200 may include processor 202, memory 204, communications hardware 206, event monitoring circuitry 208, authentication circuitry 210, and visualization circuitry 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In some embodiments, the communications hardware 206 may be configured to receive a candidate authenticate sequence code, provide a shared trust decision message, cause display of a verification status, cause display of agent information, provide a client shared system key to a client device, provide an agent shared system key to an agent device, provide an authentication sequence to a primary device, and/or the like. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an event monitoring circuitry 208 that is configured to determine a current communication over an established communication channel between a client device and an agent device. The event monitoring circuitry 208 may utilize processor 202, memory 204, or any other hardware component included in the apparatus 200 to perform these operations, as described in connection with FIGS. 5-27 below. The event monitoring circuitry 208 may further utilize communications hardware 206 to gather data from a variety of sources (e.g., client device 106 and/or agent device 108, as shown in FIGS. 1A-1C), and/or exchange data with a user.

In addition, the apparatus 200 further comprises authentication circuitry 210 that may be configured to perform one or more verification operations and update a verification status. In some embodiments, the authentication circuitry 210 may further be configured to generate a verification ciphertext, generate a verification authentication sequence code, and verify or reject the candidate authentication sequence code. In some embodiments, the authentication circuitry 210 may be configured to generate a client shared system key for a client user, protect the client shared system key, and/or store the client shared system key. In some embodiments, the authentication circuitry 210 may be configured to generate an agent shared system key for an agent user, protect the agent shared system key, and/or store the agent shared system key. In some embodiments, the authentication circuitry 210 may further be configured to generate an authentication sequence code, determine a primary device, determine a shared system key linked to a user account associated with a primary user of the primary device, and generate an initial ciphertext. In some embodiments, the authentication circuitry 210 may further be configured to assign the recipient device to either the client device or agent device, assign the primary device to the client device or agent device, prompt the primary device to determine the authentication sequence code, and/or prompt the recipient device to provide the candidate authentication sequence code. The authentication circuitry 210 may utilize processor 202, memory 204, or any other hardware component included in the apparatus 200 to perform these operations, as described in connection with FIGS. 5-27 below. The authentication circuitry 210 may further utilize communications hardware 206 to gather data from a variety of sources (e.g., client device 106 and/or agent device 108, as shown in FIGS. 1A-1C), and/or exchange data with a user.

Further, the apparatus 200 further comprises a visualization circuitry 212 that is configured to cause display of a verification status of the current communication and/or generate a visualization of the verification status of the current communication using verification indicium. The visualization circuitry 212 may utilize processor 202, memory 204, or any other hardware component included in the apparatus 200 to perform these operations, as described in connection with FIGS. 5-27 below. The visualization circuitry 212 may further utilize communications hardware 206 to gather data from a variety of sources (e.g., client device 106 and/or agent device 108, as shown in FIGS. 1A-1C), and/or exchange data with a user.

Client Device

Figure 3:
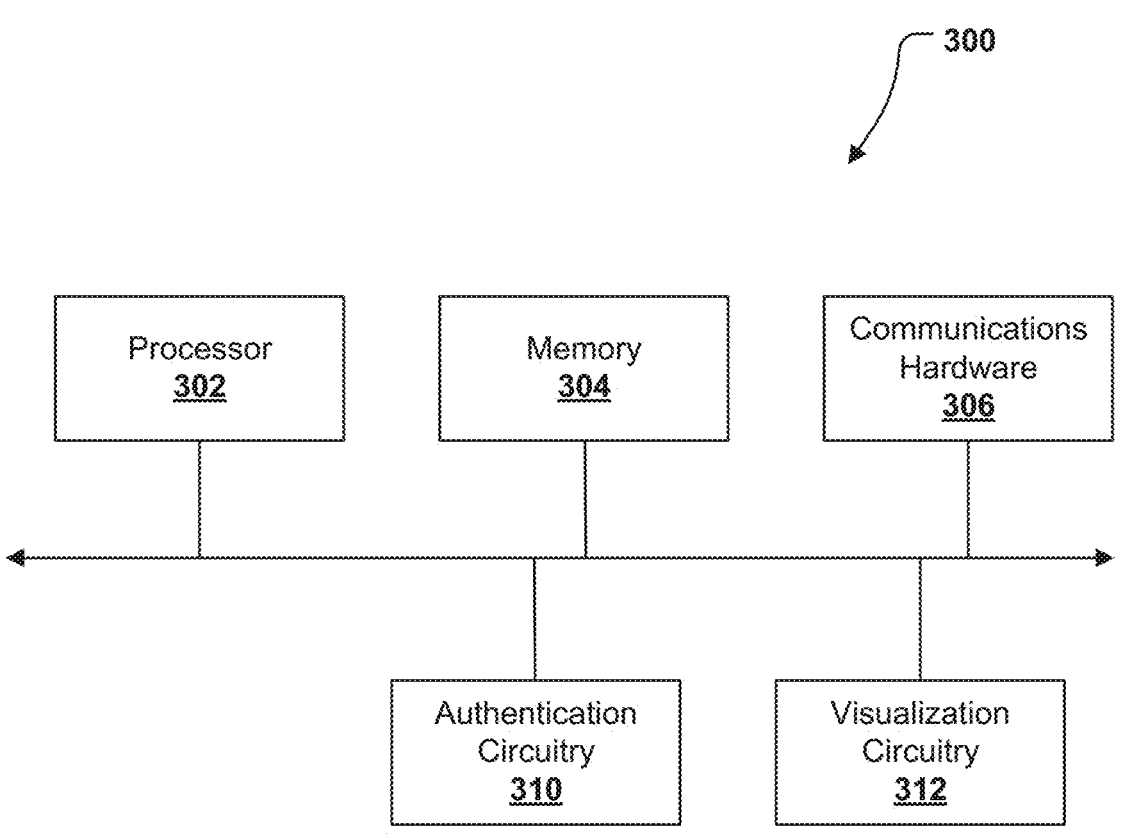
FIG. 3 illustrates a schematic block diagram of example circuitry embodying a client device that may perform various operations in accordance with some example embodiments described herein.

As illustrated in FIG. 3, an apparatus 300 is shown that represents an example client device (e.g., client device 106). The apparatus 300 includes processor 302, memory 304, and communications hardware 306, and may optionally include authentication circuitry 310 and visualization circuitry 312. The apparatus 300 may include processor 302, memory 304, and communications hardware 306, each of which is configured to be similar to the similarly named components described above in connection with FIG. 2.

The apparatus 300 may further comprise authentication circuitry 310 that may be configured to determine an authentication sequence code. The authentication circuitry 310 may further be configured to determine a device assignment, generate a candidate authentication sequence code message, determine an authentication sequence code to be provided to an agent device, and/or cause the authentication sequence code to be provided to the agent device. In some embodiments, the authentication circuitry 310 may be configured to generate a verification ciphertext, generate a verification authentication sequence code, determine whether the candidate authentication sequence code corresponds to a verification authentication sequence code, generate an initial ciphertext, and/or generate an authentication sequence code. The authentication circuitry 310 may utilize processor 302, memory 304, or any other hardware component included in the apparatus 300 to perform these operations, as described in connection with FIGS. 5-27 below. The authentication circuitry 310 may further utilize communications hardware 306 to gather data from a variety of sources (e.g., system device 104 and/or agent device 108, as shown in FIGS. 1A-1C), and/or exchange data with a user.

Further, the apparatus 300 may further comprise a visualization circuitry 312 that is configured to cause verification indicium to be displayed in a mobile application and render various elements in the mobile application environment. The visualization circuitry 312 may utilize processor 302, memory 304, or any other hardware component included in the apparatus 300 to perform these operations, as described in connection with FIGS. 5-27 below. The visualization circuitry 312 may further utilize communications hardware 306 to gather data from a variety of sources (e.g., client device 106 and/or agent device 108, as shown in FIGS. 1A-1C), and/or exchange data with a user.

Agent Device

Figure 4:
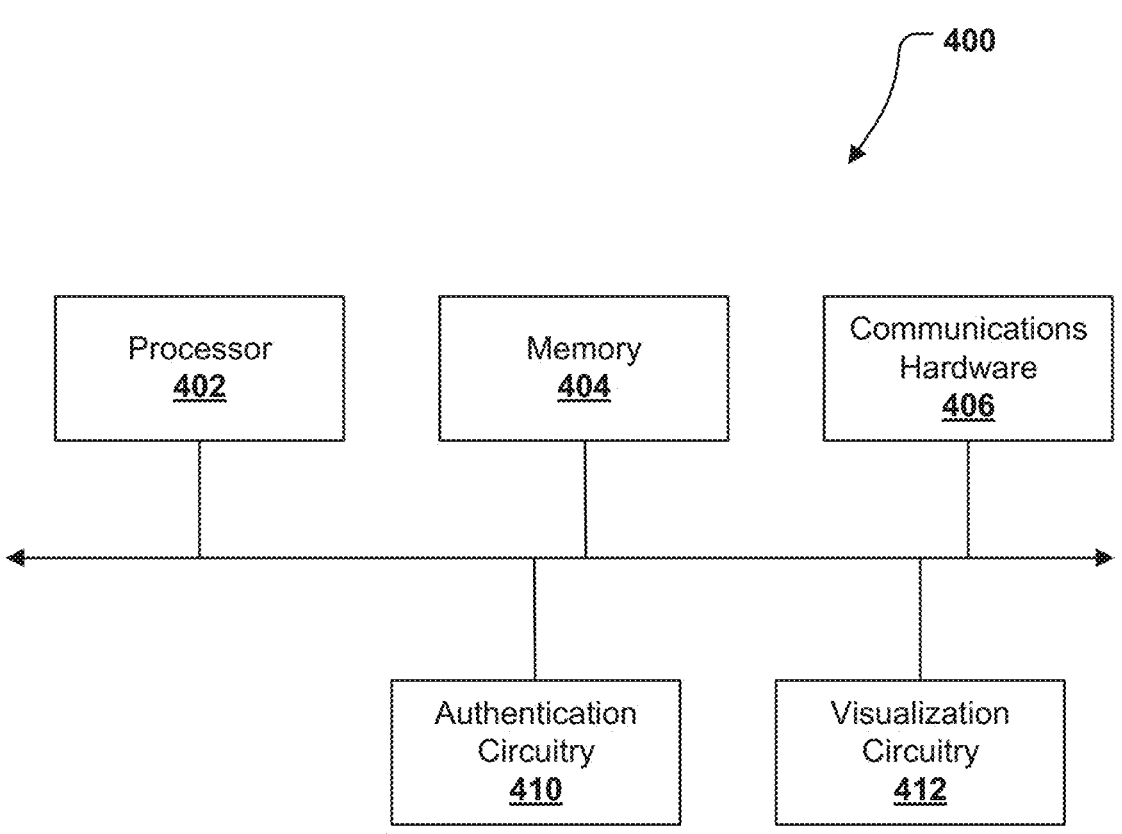
FIG. 4 illustrates a schematic block diagram of example circuitry embodying an agent device that may perform various operations in accordance with some example embodiments described herein.

As illustrated in FIG. 4, an apparatus 400 is shown that represents an example agent device (e.g., agent device 108). The apparatus 400 includes processor 402, memory 404, and communications hardware 406, and may optionally include authentication circuitry 410 and visualization circuitry 412. The apparatus 400 may include processor 402, memory 404, and communications hardware 406, each of which is configured to be similar to the similarly named components described above in connection with FIGS. 2 and 3.

The apparatus 400 may further comprise authentication circuitry 410 that may be configured to determine an authentication sequence code. The authentication circuitry 410 may further be configured to determine a device assignment, generate a candidate authentication sequence code message, determine an authentication sequence code to be provided to an agent device, and/or cause the authentication sequence code to be provided to the agent device. In some embodiments, the authentication circuitry 410 may be configured to generate an initial ciphertext, and/or generate an authentication sequence code. The authentication circuitry 410 may utilize processor 402, memory 404, or any other hardware component included in the apparatus 400 to perform these operations, as described in connection with FIGS. 5-27 below. The authentication circuitry 410 may further utilize communications hardware 406 to gather data from a variety of sources (e.g., system device 104 and/or client device 106, as shown in FIGS. 1A-1C), and/or exchange data with a user.

Further, the apparatus 400 may further comprise a visualization circuitry 412 that is configured to cause verification indicium to be displayed in an internal account environment and render various elements in the internal account environment. The visualization circuitry 412 may utilize processor 402, memory 404, or any other hardware component included in the apparatus 400 to perform these operations, as described in connection with FIGS. 5-27 below. The visualization circuitry 412 may further utilize communications hardware 406 to gather data from a variety of sources (e.g., client device 106 and/or client device 106, as shown in FIGS. 1A-1C), and/or exchange data with a user.

Although components 202-212, 302-312, 402-412 are described in part using functional language, it will be understood that the particular implementations necessarily include the use of particular hardware. It should also be understood that certain of these components 202-212, 302-312, and/or 402-412 may include similar or common hardware. For example, the event monitoring circuitry 208, authentication circuitry 210, and visualization circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatuses 200, 300, or 400 to perform the various functions described herein.

Although the event monitoring circuitry 208, authentication circuitry 210, and visualization circuitry 212 may leverage processor 202, memory 204, or communications hardware 206 as described above, it will be understood that any of event monitoring circuitry 208, authentication circuitry 210, and visualization circuitry 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that event monitoring circuitry 208, authentication circuitry 210, and visualization circuitry 212 comprise particular machinery designed for performing the functions described herein in connection with such elements of apparatus 200. Similarly, it will be understood that authentication circuitry 310 and visualization circuitry 312 comprise particular machinery designed for performing the functions described herein in connection with such elements of apparatus 300 and it will also be understood that authentication circuitry 410 and visualization circuitry 412 comprise particular machinery designed for performing the functions described herein in connection with such elements of apparatus 400.

In some embodiments, various components of the apparatuses 200, 300, and 400 may be hosted remotely (e.g., by one or more cloud servers) and thus need not physically reside on the corresponding apparatus 200, 300, or 400. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200, 300, or 400. Furthermore, some example embodiments may take the form of a computer program product comprising software instructions stored on at least one non-transitory computer-readable storage medium (e.g., memory 204, memory 304, or memory 404). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, apparatus 300 as described in FIG. 3, or apparatus 400 as described in FIG. 4, that loading the software instructions onto a computing device or apparatus produces a special-purpose machine comprising the means for implementing various functions described herein.

Having described specific components of example apparatuses 200, 300, and 400 example embodiments are described below in connection with a series of graphical user interfaces and flowcharts.

Example Operations
System Device Operations

Turning to FIGS. 5-9, example flowcharts are illustrated that contain example operations implemented by example embodiments described herein. The operations illustrated in FIGS. 5-9 may, for example, be performed by system device 104 of the shared trust verification system 102 shown in FIGS. 1A-1C, which may in turn be embodied by an apparatus 200, which is shown and described in connection with FIG. 2. To perform the operations described below, the apparatus 200 may utilize one or more of processor 202, memory 204, communications hardware 206, event monitoring circuitry 208, authentication circuitry 210, visualization circuitry 212, and/or any combination thereof. It will be understood that user interaction with the shared trust verification system 102 may occur directly via communications hardware 206, or may instead be facilitated by a separate client device 106 and/or a separate agent device 108, as shown in FIGS. 1A-1C, and which may have similar or equivalent physical componentry facilitating such user interaction.

Figure 5:
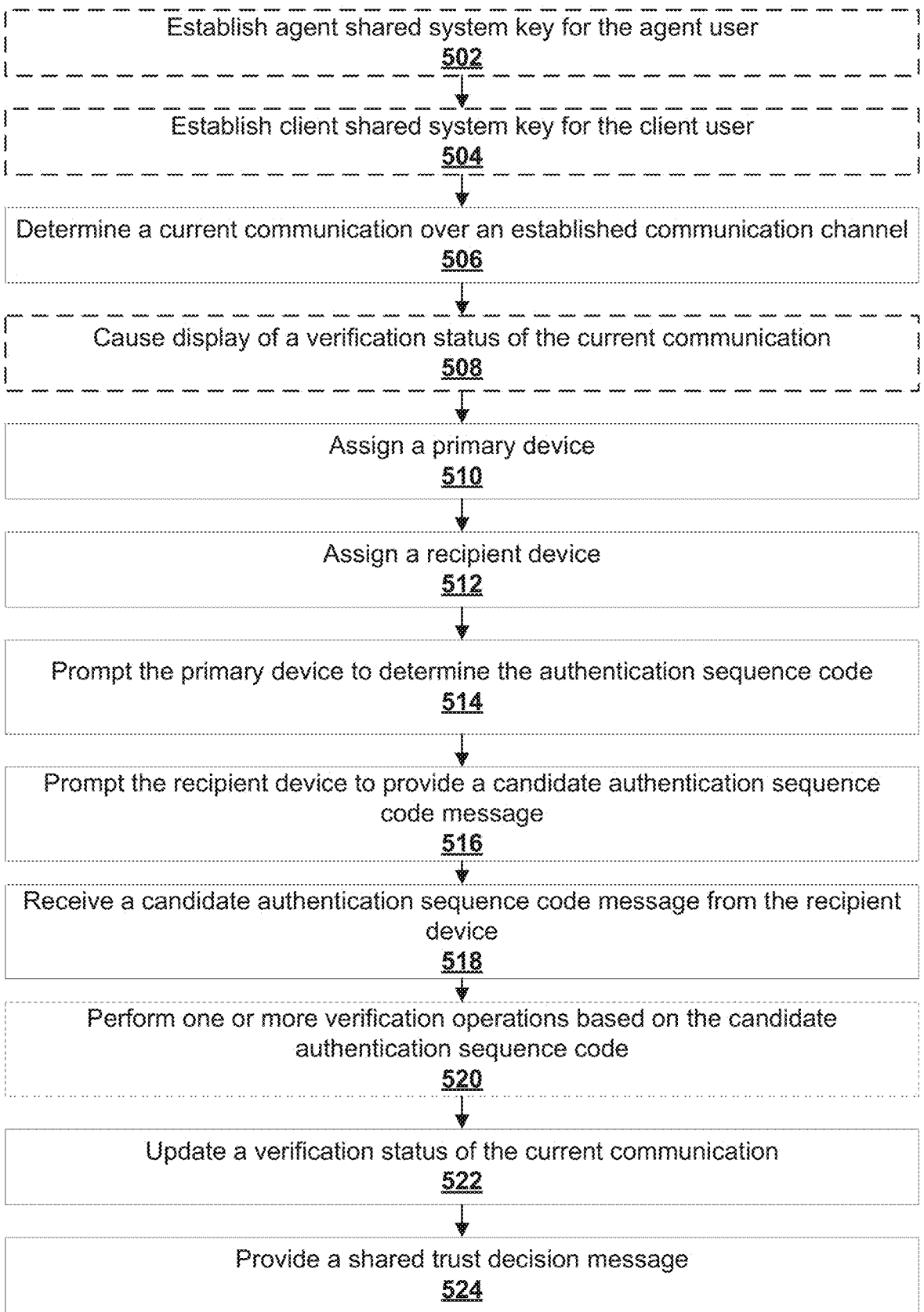
FIG. 5 illustrates an example flowchart for establishing shared trust between a client user and an agent user for a current communication using a system device, in accordance with some example embodiments described herein.

Turning first to FIG. 5, example operations are shown for establishing shared trust between a client user and an agent user for a current communication.

Optionally, as shown by operation 502, the apparatus 200 includes means, such as processor 202, memory 204, communications hardware 206, authentication circuitry 210, or the like, for establishing an agent shared system key for an agent user. An agent user may be a user associated with agent device 108. In some embodiments, the agent user may be an authorized user associated with the shared trust verification system (e.g., an employee, contractor, or other authorized party). An agent user may also be associated with an agent user account, which may include information about the agent user (e.g., name, email, title, role, department, and/or the like) and may be stored and maintained in an associated memory (e.g., memory 204 or another data repository). The agent user account may further be associated with an agent user identifier (e.g., a username, email, employee number, and/or the like) and agent user credentials (e.g., a password, biometric data, personal identification number, and/or the like). The authentication circuitry 210 may identify a particular agent user using the agent user identifier and authenticate the agent user based on the associated agent user credentials.

The agent user profile may also include a set of permissions that allow the agent user to access certain data or information within the shared trust verification system 102 that other unauthorized users would not be able to access. For example, a set of permissions associated with the agent user may allow the agent user to use agent device 108 to access client user information (e.g., client user account information) within an internal account environment, such as via trusted communications network 105.

In order for apparatus 200 to authenticate received candidate authentication sequence codes and/or generate authentication sequence codes in an instance in which the agent device 108 is the primary device, the authentication circuitry 210 must first establish an agent shared system key for the agent user. In some embodiments, the agent shared system key may be used as seed value for generating an authentication sequence code for and/or by agent device 108. In some embodiments, the shared system key may be a cryptographic symmetric key. As described in further detail in FIG. 6, the authentication circuitry 210 may generate an agent shared system key for the agent user, provide the agent shared system key to the agent device, and protect and store the agent shared system key for future use (e.g., during authentication sequence code generation and/or candidate authentication sequence code verification).

Figure 6:
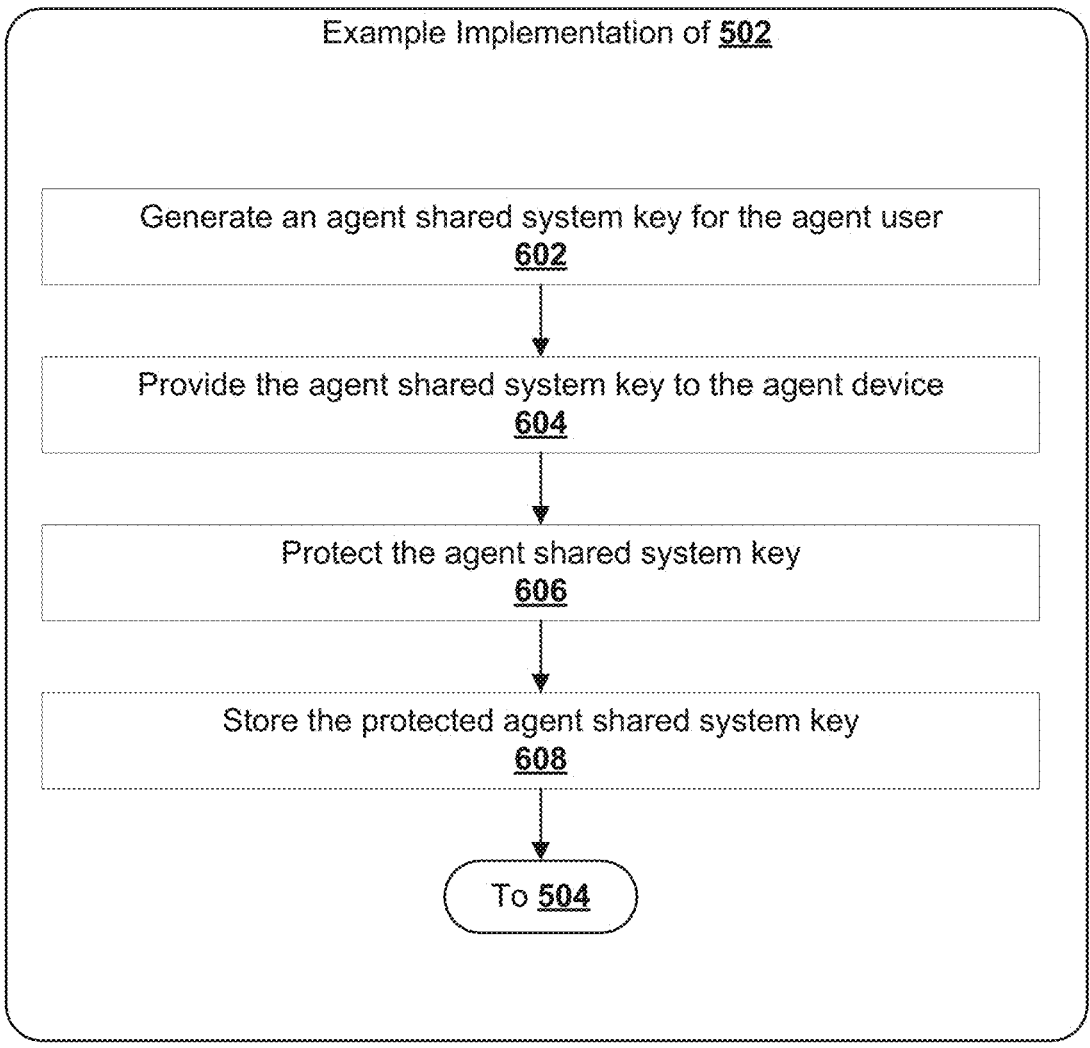
FIG. 6 illustrates an example flowchart for establishing a shared secret for an agent user using a system device, in accordance with some example embodiments described herein.

In some embodiments, operation 502 may be performed in accordance with the operations described by FIG. 6. Turning now to FIG. 6, example operations are shown for establishing a shared secret for an agent user.

As shown by operation 602, the apparatus 200 includes means, such as processor 202, memory 204, communications hardware 206, authentication circuitry 210, or the like, for generating an agent shared system key for the agent user. The authentication circuitry 210 may generate the agent shared system key during an initial account or registration setup for the agent user and/or in response to a trigger event. In some embodiments, the authentication circuitry 210 may detect a trigger event in response to a key rotation protocol that requires a periodic or semi-periodic replacement and/or rotation of an agent shared system key. In some embodiments, the authentication circuitry 210 may detect a trigger event in response to a detection of a fraudulent or potentially fraudulent event associated with the agent user account.

The authentication circuitry 210 may generate the shared system key for the agent user by any suitable methods. For example, the authentication circuitry 210 may generate the agent shared system key using a random number generation (RNG) algorithm or pseudo-random number generation (PRNG) algorithm that is certified by particular industry standards (e.g., Federal Information Processing Standards (FIPS) publication 140, such as FIPS 140-1, 140-2, or 140-3). As another example, the authentication circuitry 210 may generate the agent shared system key using a key derivation function (KDF), pre-shared keys (PSKs), hardware-security modules (HSM), and/or the like.

As shown by operation 604, the apparatus 200 includes means, such as processor 202, memory 204, communications hardware 206, or the like, for providing the agent shared system key to the agent device. Once the authentication circuitry 210 has generated the agent shared system key, the shared system key may be provided to the agent device 108. The communications hardware 206 may provide the agent shared system key to agent device 108 using any suitable means. For example, the communications hardware 206 may use cryptographic exchange protocols (e.g., Diffie-Hellman (DH) or Elliptical Curve Diffie-Hellman (ECDH)), a public key infrastructure, a secure socket layer (SSL)/transport security layer (TSL) protocol, secure communication protocols (e.g., secure shell (SSH) or internet protocol security (IPSec)), and/or the like to provide the agent device 108 with the agent shared system key. In some embodiments, the communications hardware 206 may upload the agent shared system key onto a removable hardware that may be provided to the agent user, who may then configure the agent device 108 with the agent shared system key using the removable hardware. In some embodiments, the communications hardware 206 may cause rendering or display of visual indicium (e.g., a quick-response (QR) code) on a display associated with the agent user such that the agent device 108 may scan the visual indicium to extract the agent shared system key.

As shown by operation 606, the apparatus 200 includes means, such as processor 202, memory 204, communications hardware 206, authentication circuitry 210, or the like, for protecting the agent shared system key. In some embodiments, the authentication circuitry 210 may protect the agent shared system key using any suitable method, such as by encrypting the agent shared system key using a symmetric encryption algorithm (e.g., an advanced encryption standard (AES) algorithm, a data encryption standard (DES) algorithm, a Blowfish algorithm, or an Rivest Cipher algorithm, such as RC4, RC5, or RC6) or an asymmetric encryption algorithm (e.g., a Rivest-Shamiar-Adleman (RSA) algorithm).

As shown by operation 608, the apparatus 200 includes means, such as processor 202, memory 204, communications hardware 206, authentication circuitry 210, or the like, for storing the agent shared system key. The authentication circuitry 210 may store the agent shared system key in a secure manner. For example, the authentication circuitry 210 may store the agent shared system key within a HSM or cloudHSM. As another example, the authentication circuitry 210 may store the agent shared system key in a dedicated key management system or secure key vault. As another example, the authentication circuitry 210 may store the agent shared system key within an associated database or memory, such as memory 204. The authentication circuitry 210 may further link the agent shared system key to the agent user account. That is, the authentication circuitry 210 may require that an agent user identifier and agent user credentials be provided and successfully verified prior to allowing access to the stored agent shared system key. This ensures that the correct agent shared system key is used when generating an authentication sequence and/or verifying a candidate authentication sequence code for the agent user using an agent device, such as agent device 108.

Returning now to FIG. 5, optionally, as shown by operation 504, the apparatus 200 includes means, such as processor 202, memory 204, communications hardware 206, authentication circuitry 210, or the like, for establishing a shared secret for a client user. A client user may be a user associated with client device 106. In some embodiments, the client user may be a user who is associated with a client user account maintained by the shared trust verification system 102 (e.g., a customer). A client user account, which may include information about the client user (e.g., name, email, phone number, address, associated device identifiers, account number identifiers, financial information, and/or the like.) and may be stored and maintained in an associated memory (e.g., memory 204 or another data repository). The client user account may further be associated with a client user identifier (e.g., a username, email, customer number, and/or the like) and client user credentials (e.g., a password, biometric data, personal identification number, and/or the like). The authentication circuitry 210 may identify a particular client user using the client user identifier and authenticate the client user based on the associated client user credentials.

In order for apparatus 200 to authenticate received candidate authentication sequence codes and/or generate authentication sequence codes in an instance in which the client device 106 is the primary device, the authentication circuitry 210 must first establish a client shared system key for the client user. In some embodiments, the client shared system key may be used as seed value for generating an authentication sequence code for and/or by client device 106. In some embodiments, the client shared system key may be a cryptographic symmetric key. As described in further detail in FIG. 7, the authentication circuitry 210 may generate a client shared system key for the client user, provide the client shared system key to client device 106, and protect and store the client shared system key for future use (e.g., during authentication sequence code generation and/or candidate authentication sequence code verification).

Figure 7:
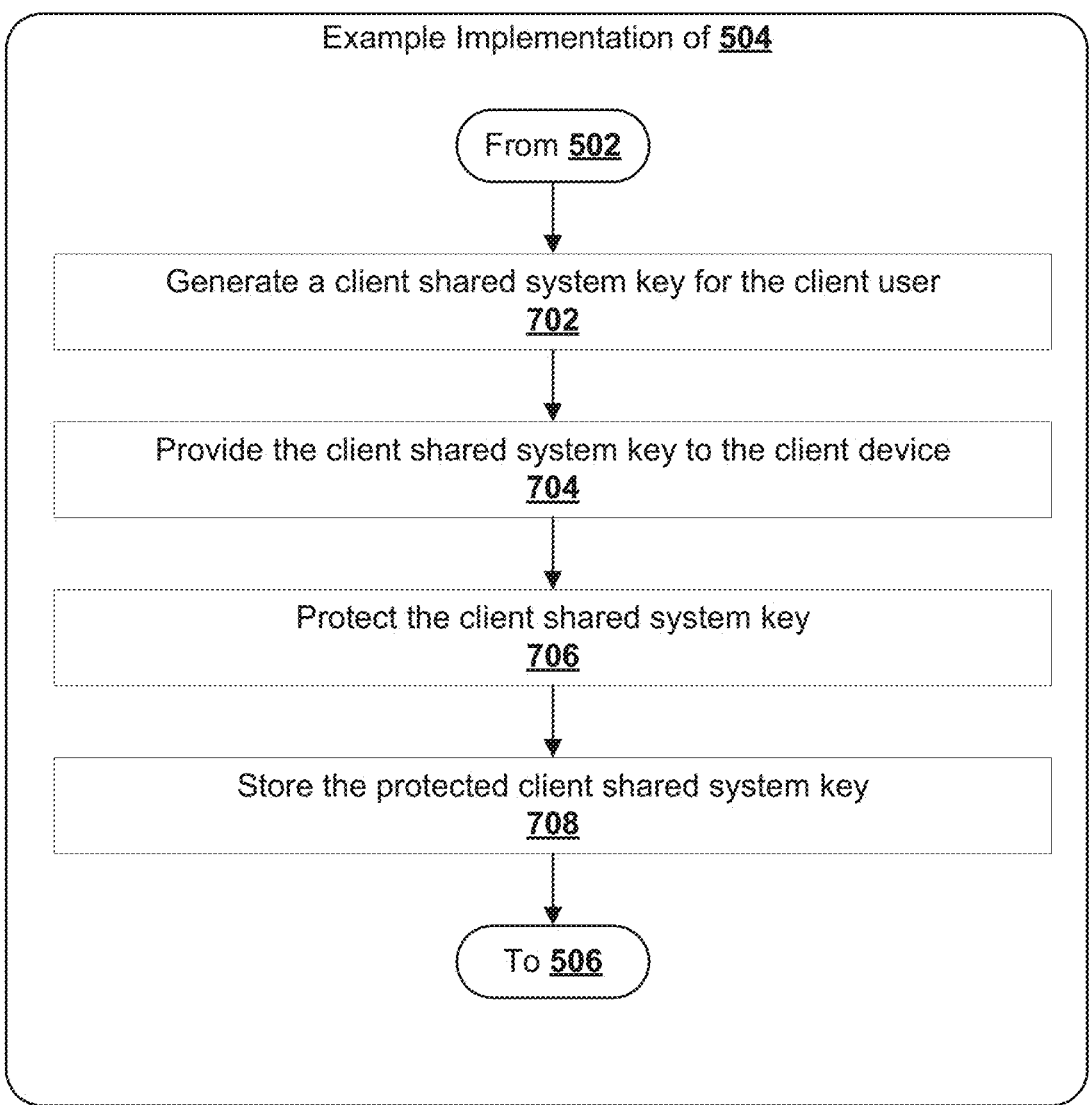
FIG. 7 illustrates an example flowchart for establishing a shared secret for a client user using a system device, in accordance with some example embodiments described herein.

In some embodiments, operation 504 may be performed in accordance with the operations described by FIG. 7.

Turning now to FIG. 7, example operations are shown for establishing a shared secret for a client user.

As shown by operation 702, the apparatus 200 includes means, such as processor 202, memory 204, communications hardware 206, authentication circuitry 210, or the like, for generating a client shared system key for the client user. The authentication circuitry 210 may generate the client shared system key during an initial account or registration setup for the client user and/or in response to a trigger event. In some embodiments, the authentication circuitry 210 may detect a trigger event in response to a key rotation protocol that requires a periodic or semi-periodic replacement and/or rotation of a client shared system key. In some embodiments, the authentication circuitry 210 may detect a trigger event in response to a detection of a fraudulent or potentially fraudulent event associated with the client user account.

The authentication circuitry 210 may generate the shared system key for the client user by any suitable methods. For example, the authentication circuitry 210 may generate the client shared system key using a RNG algorithm or PRNG algorithm that is certified by particular industry standards (e.g., FIPS publication 140, such as FIPS 140-1, 140-2, or 140-3). As another example, the authentication circuitry 210 may generate the client shared system key using KDF, PSKs, HSM, and/or the like.

As shown by operation 704, the apparatus 200 includes means, such as processor 202, memory 204, communications hardware 206, authentication circuitry 210, or the like, for providing the client shared system key to the client device. Once the authentication circuitry 210 has generated the client shared system key, the shared system key may be provided to the client device 106. The communications hardware 206 may provide the client shared system key to client device 106 using any suitable means. For example, the communications hardware 206 may use cryptographic exchange protocols (e.g., DH or ECDH), a public key infrastructure, a SSL/TSL protocol, secure communication protocols (e.g., SSH or IPSec), and/or the like to provide the client device 106 with the client shared system key. In some embodiments, the communications hardware 206 may upload the client shared system key onto a removable hardware that may be provided to the client user, who may then configure the client device 106 with the client shared system key using the removable hardware. In some embodiments, the communications hardware 206 may cause rendering or display of visual indicium (e.g., a QR code) on a display associated with the client user such that the client device 106 may scan the visual indicium to extract the client shared system key.

As shown by operation 706, the apparatus 200 includes means, such as processor 202, memory 204, communications hardware 206, authentication circuitry 210, or the like, for protecting the client shared system key. In some embodiments, the authentication circuitry 210 may protect the client shared system key using any suitable method, such as by encrypting the client shared system key using a symmetric encryption algorithm (e.g., an AES algorithm, a DES algorithm, a Blowfish algorithm, or a Rivest Cipher algorithm, such as RC4, RC5, or RC6) or an asymmetric encryption algorithm (e.g., an RSA algorithm).

As shown by operation 708, the apparatus 200 includes means, such as processor 202, memory 204, communications hardware 206, authentication circuitry 210, or the like, for storing the client shared system key. The authentication circuitry 210 may store the client shared system key in a secure manner. For example, the authentication circuitry 210 may store the client shared system key within a HSM or cloudHSM. As another example, the authentication circuitry 210 may store the client shared system key in a dedicated key management system or secure key vault. As another example, the authentication circuitry 210 may store the client shared system key within an associated database or memory, such as memory 204. The authentication circuitry 210 may further link the client shared system key to the client user account. That is, the authentication circuitry 210 may require that a client user identifier and client user credentials be provided and successfully verified prior to allowing access to the stored client shared system key. This ensures that the correct client shared system key is used when generating an authentication sequence and/or verifying a candidate authentication sequence code for the client user using a client device, such as client device 106.

Returning now to FIG. 5, as shown by operation 506, the apparatus 200 includes means, such as processor 202, memory 204, communications hardware 206, event monitoring circuitry 208, authentication circuitry 210, or the like, for detecting a current communication over an established communication channel. Event monitoring circuitry 208 may be configured to monitor for a current communication between a client user and an agent user over an established communication channel. A communication channel may be any pathway or medium through which the client user and agent user communicate. For example, a communication channel may be a voice communication channel (e.g., phone calls), a messaging platform (e.g., online or mobile application chat center), text-based messaging (e.g., short message service (SMS) texts), and/or the like. An established communication channel may indicate that either an agent user or client user has used a respective device (e.g., agent device 108 or 108N or client device 106 or 106N) to successfully communicate at least one message or connect to the other party (e.g., client device 106 or 106N or agent device 108 or 108N). In some embodiments, the client device and user device used in the current communication may not necessarily be the devices to be assigned as a primary device and recipient device, as discussed in more detail below.

In some embodiments, a client user and agent user may establish a communication channel with one another without sending data through apparatus 200. For example, in an instance in which the communication channel is a voice communication channel, a client device and agent device may communicate over a telecommunications network, such as telecommunications network 120 illustrated in FIGS. 1A-1C. By way of particular example, in some embodiments, a client user may use client device 106N, which may be a landline phone that uses physical connections and a public switched telephone network (PSTN) to establish a current communication with an agent device. The agent may use an agent device, such as 108N, which may also be a landline phone such that it also uses physical connection and the PSTN to connect with the client device. Alternatively, a client device or agent device may be a cellular device and thereby use a cellular network (e.g., 2G, 3G, 4G, 4G long term evolution, 5G, a wide area network, a local area network, and/or the like) to establish communication with the other device.

Alternatively, in some embodiments, a client user and agent user may establish a communication channel with one another that includes sending data through apparatus 200. For example, in an instance in which the communication channel is a messaging platform communication channel, a client device may provide messages through a mobile application which are then received by communications hardware 206 and communications hardware 206 may provide the message content to the agent device. In some embodiments, the event monitoring circuitry 208 may be configured to automatically monitor for a current communication over the established communication channel. The event monitoring circuitry 208 may configured to monitor network traffic associated with shared trust verification system 102. In some embodiments, the event monitoring circuitry 208 may be configured to detect a current communication over the established communication channel when the agent device 108 or client device 106 provides data to the communications hardware 206 of apparatus 200. For example, in some embodiments, the client device 106 may use a mobile application (to which the client user has successfully established a logon session with such that the client user account and client user identity is known) to communicate with an agent device 108 within an internal account environment (to which the agent user has successfully established a logon session with such that the agent user identity is known) such that data transferred between these communications is passed through the shared trust verification system 102. The event monitoring circuitry 208 may be configured to analyze a data packet or data communication to identify a sender and recipient and use this information to determine a current communication between a client user and an agent user. In some embodiments, the communicated information may be received using a hypertext transfer protocol (HTTP) or HTTP secure (HTTPS) protocol. In some embodiments, apparatus 200 may be used to connect the client device 106 and agent device 108, such as by using various application programming interfaces (APIs), such as WebSocket, or representational state transfer (RESTful) APIs.

In some embodiments, in an instance in which the communication channel is a voice communication channel and uses the telecommunications network, a call log may be generated for incoming and outgoing phone calls to and from an agent device (e.g., agent device 108 or 108N). In some embodiments, the event monitoring circuitry 208 may be configured to monitor such calls and generate the call log itself or may receive and/or access a stored call log generated by another device (e.g., an associated phone system). In some embodiments, a phone system may monitor the incoming and outgoing calls for associated agent devices and generate and store a call log in an associated memory (e.g., memory 204 or another data repository). The call log may include call log entries that each detail and incoming or outgoing call for agent devices, including ongoing calls. A call log entry may further describe call details, such as the call origin (e.g., agent device of client device identifier), the call destination (e.g., agent device of client device identifier), the current length of the call, and/or the like. Thus, the event monitoring circuitry 208 may use the call log to determine a current communication between the client user and agent user.

In some embodiments, the event monitoring circuitry 208 may receive a direct or explicit communication from either the agent device 108 or client device 106 that is indicative of the current communication. In some embodiments, the device which provides the event monitoring circuitry 208 with this indication is the device which initiates the communication. For example, in an instance in which an agent user uses agent device 108 to call client device 106N, the agent device 108 may be configured to provide the event monitoring circuitry 208 with an indication that it is performing this operation and further, may notify the event monitoring circuitry 208 once connection has been established. As another example, an agent user may manually select an option within the internal account environment that alerts provides monitoring circuitry 208 with an indication that an agent device 108 has established a current communication or attempting to establish a current communication with client device 106 or 106N. As another example, a client user may use an associated mobile application via client device 106, the client user may provide a request that a current communication be verified. The request to verify the current communication may be accessed through the mobile application on the client device 106 such that the client user must have successfully established a logon session for the client user account, as discussed in greater detail below. Thus, event monitoring circuitry 208 may identify the client user account, identify whether an agent device 108 is currently accessing the client user account and in an instance an agent device 108 is currently accessing a client user account, may detect a current communication between the agent user of agent device 108 and client user of client device 106. Alternatively, the event monitoring circuitry 208 may use a call log to determine the agent user and associated agent device 108 in communication with the client user and client device 106.

As described above, in some embodiments, the client device and user device used in the current communication may not necessarily be the devices to be assigned as a primary device and recipient device, as discussed in more detail below. For example, as depicted in FIG. 1B and FIG. 1C, client device 106N and agent device 108 or 108N may have established a communication session over telecommunications network 120. In an instance in which client device 106N and/or agent device 108N are landline devices, they may lack the capability for the subsequent authentication process. Alternatively, either the client user or agent user may prefer to use a different device for the current communication than the device to be used to perform the authentication. As such, the event monitoring circuitry 208 may identify the current communication and identities of the client user and agent user using any one or a combination of the above described methods but may identify a client device and/or agent device using a subsequent process. In some embodiments, the event monitoring circuitry 208 may wait until a logon request for a client user account is received from a client device (which may be the same client device involved in the current communication or a different client device) and then determine the client device to be used based on the logon request. As described below, the client user account logon request includes details regarding the client device identifier such that the event monitoring circuitry 208 may identify the client device to be used for the authentication based on the logon request. Similarly, in some embodiments, the event monitoring circuitry 208 may detect a current established session for an agent user involved in the current communication on an agent device (which may be the same agent device involved in the current communication or a different agent device) and then determine the agent device to be used based on the established session information. Alternatively, if the agent user does not currently have an established session with an agent device, the event monitoring circuitry 208 may wait until a logon request for the agent user account is received from the agent device and then determine the agent device to be used based on the logon request. A device identifier may be a media access control address, internet protocol address, international mobile equipment identity number, phone number, or any other identifier which uniquely identifies the particular device.

For simplicity, the term "client device 106" may be used to identify the particular client device used in the authentication process and the term "agent device 108" may be used to identify the particular agent device used in the authentication process. However, it will be appreciated that any client device or agent device may be used in the authentication process.

In general, apparatus 200 may receive a logon request from the client device 106 when a client attempts to log into his/her mobile app via the client device 106. In some embodiments, authentication circuitry 210 may be configured to authenticate a logon request for a client user account from a client device 106. In some embodiments, the logon request may be received using an HTTP/HTTPS protocol (e.g., an HTTP request). In some embodiments, the logon request may be a request to access a client user account within a mobile application. The logon request may include a candidate client user identifier (e.g., a username, email, customer number, and/or the like) and candidate client user credentials (e.g., a password, biometric data, personal identification number, and/or the like). Furthermore, the logon request may be indicative of the client device 106, such as by including a client device identifier. As described above, the client user identifier may be used by the event monitoring circuitry 208 to identify the client device 106. The authentication circuitry 210 may authenticate the logon request based on the received candidate client user credentials and stored client user credentials associated with the client user account and may determine whether the received candidate client user credentials match stored client user credentials. In an instance the received candidate client user credentials match stored client user credentials, the client user may be authenticated and provide a response (e.g., an HTTP response) that includes client user account data for the mobile application to client device 106.

In some embodiments, authentication circuitry 210 may be configured to authenticate a logon request for an agent user account from an agent device 108. In some embodiments, the logon request may be received using an HTTP/HTTPS protocol (e.g., an HTTP request). In some embodiments, the logon request may be a request to access an agent user account within an internal account environment. The logon request may include a candidate agent user identifier (e.g., a username, email, employee number, and/or the like) and candidate agent user credentials (e.g., a password, biometric data, personal identification number, and/or the like). Furthermore, the logon request may be indicative of the agent device 108, such as by including an agent device identifier. As described above, the agent device identifier may be used by the event monitoring circuitry 208 to identify the agent device 108. The authentication circuitry 210 may authenticate the logon request based on the received candidate agent user credentials and stored agent user credentials associated with the agent user account and may determine whether the received candidate agent user credentials match stored agent user credentials. In an instance the received candidate agent user credentials match stored agent user credentials, the agent user may be authenticated and provide a response (e.g., an HTTP response) that includes agent user account data for the internal account environment to agent device 108.

Optionally, as shown by operation 508, the apparatus 200 includes means, such as processor 202, memory 204, communications hardware 206, authentication circuitry 210, visualization circuitry 212, or the like, for causing display of a verification status of the current communication. In some embodiments, the authentication circuitry 210 may generate a verification status for the current communication. The verification status may be indicative of a current status of where the current communication is within the verification operation process. In some embodiments, a verification status may include a not yet verified verification status, successful verification status, or failed verification status. The authentication circuitry 210 may update the verification status for the current communication based on whether one or more verification operations have been performed and/or whether a candidate authentication sequence code was verified, as described in more detail in operation 520.

In some embodiments, the visualization circuitry 212 may generate a visualization of the verification status of the current communication using verification indicium. The verification indicium may a graphical representation of the verification status where the verification status is indicated by a particular shape (e.g., an 'x', a checkmark, a thumbs up, a thumbs down, and/or the like) and/or color (e.g., red, green, or yellow) that depicts a representation of the verification status. For example, in an instance in which a verification status is a not yet verified verification status, the verification indicium may be a yellow 'x'. As another example, in an instance in which a verification status is a successful verification status, the verification indicium may be a green checkmark. As yet another example, in an instance in which a verification status is a failed verification status, the verification indicium may be a red 'x'. In some embodiments, the verification indicium may further include text that is indicative of the verification status. For example, in an instance in which a verification status is a not yet verified verification status, the verification indicium may include the text "not yet verified". As another example, in an instance in which a verification status is a successful verification status, the verification indicium may include the text "successful verification". As yet another example, in an instance in which a verification status is a failed verification status, the verification indicium may include the text "failed verification-possible fraud".

The visualization circuitry 212 may generate the verification indicium in a standardized format (e.g., JavaScript Object Notation (JSON), Extensible Markup Language (XML), HTML, an image, and/or the like) and cause the verification indicium to be provided to a mobile application of the client user (e.g., at the client device 106) and/or to an internal account environment (e.g., at the agent device 108). In particular, the visualization circuitry 212 may provide the formatted verification indicium to communications hardware 206, and communications hardware 206 may include the verification indicium with the verification status and provide this information to the mobile application and/or internal account environment.

In some embodiments, the communications hardware 206 may use a push notification to provide the verification status and/or verification indicium to the mobile application of the client device 106 and/or to an internal account environment of the agent device 108. In some embodiments, the communications hardware 206 may use HTTP or HTTPS protocols to provide the verification status and/or verification indicium to the mobile application of the client device 106 and/or to an internal account environment of the agent device 108. In some embodiments, the communications hardware 206 may receive an initial HTTP request from a client device 106 and/or agent device 108. The communications hardware 206 may then provide the verification status and/or verification indicium to the mobile application of client device 106 and/or the internal account environment of agent device 108 using an appropriate HTTP response, such as a "POST", "GET", "PUT", or "PATCH" method with an appropriate HTTP header. As another example, the communications hardware 206 may use specific APIs, such as RESTful APIs or WebSocket APIs to provide the verification status and/or verification indicium to the client device 106 and/or agent device 108. In some embodiments, the communications hardware 206 may use WebSocket to provide the verification status and/or verification indicium to the client device 106 and/or agent device 108 in real time or near real time without the need for repeated HTTP requests.

As shown by operation 510, the apparatus 200 includes means, such as processor 202, memory 204, communications hardware 206, authentication circuitry 210, or the like, for assigning a primary device. Authentication circuitry 210 may assign either the client device 106 or agent device 108 to be the primary device. The primary device may be the device which is tasked with determining an authentication sequence code and causing the authentication sequence code to be provided to the recipient device. Thus, the device assigned as the primary device cannot also be assigned as the recipient device.

In some embodiments, authentication circuitry 210 may be configured to always assign the agent device 108 to be the primary device. Alternatively, in some embodiments, authentication circuitry 210 may be configured to always assign the client device 106 to be the primary device. In some embodiments, the authentication circuitry 210 may be configured to assign the primary device to either the client device 106 or agent device 108 in accordance with a set schedule. In some embodiments, the authentication circuitry 210 may be configured to assign the primary device to either the client device 106 or agent device 108 at random, such as by using a random number generation algorithm or pseudo-random number generation algorithm. The particular method used by authentication circuitry 210 to select a primary device may be configured by an authorized end user, such as an security administrator user associated with shared trust verification system 102. In some embodiments, the method used by authentication circuitry 210 may be configured to change periodically or semi-periodically in order to make it more difficult for fraudsters to impersonate either a client user or agent user.

As shown by operation 512, the apparatus 200 includes means, such as processor 202, memory 204, communications hardware 206, authentication circuitry 210, or the like, for assigning a recipient device. Authentication circuitry 210 may assign either the client device 106 or agent device 108 to be the recipient device. However, as described above, the recipient device cannot be the same device as the primary device and vice versa. The recipient device may be the device which is tasked with providing the candidate authentication sequence code message to communications hardware 206.

Similar to the primary device, in some embodiments, authentication circuitry 210 may be configured to always assign the agent device 108 to be the recipient device. Alternatively, in some embodiments, authentication circuitry 210 may be configured to always assign the client device 106 to be the recipient device. In some embodiments, the authentication circuitry 210 may be configured to assign the recipient device to either the client device 106 or agent device 108 in accordance with a set schedule. In some embodiments, the authentication circuitry 210 may be configured to assign the primary or recipient device to either the client device 106 or agent device 108 at random, such as by using a random number generation algorithm or pseudo-random number generation algorithm and then assigning the currently unassigned device to be the recipient or primary device, respectively. The particular method used by authentication circuitry 210 to select a recipient device may be configured by an authorized end user, such as an security administrator user associated with shared trust verification system 102. In some embodiments, the method used by authentication circuitry 210 may be configured to change periodically or semi-periodically in order to make it more difficult for fraudsters to impersonate either a client user or agent user.

As shown by operation 514, the apparatus 200 includes means, such as processor 202, memory 204, communications hardware 206, authentication circuitry 210, or the like, for prompting the primary device to determine an authentication sequence code. Once authentication circuitry 210 has assigned a primary device, the authentication circuitry 210 may prompt the primary device to determine an authentication sequence code. The prompt may further provide an indication to the primary device that it is assigned as the primary device. In some embodiments, the prompt may further include device information for the recipient device. For example, the prompt may provide the primary device with an indication of the recipient device identifier (e.g., a client device identifier or agent device identifier) such that the primary device may, in some embodiments, provide the authentication sequence code to the recipient device. In some embodiments, the prompt to determine an authentication sequence code may include instructions from authentication circuitry 210 that instruct the primary device to generate its own authentication sequence code. As such, in some embodiments, the primary device may determine an authentication sequence code by generating the authentication sequence code itself, as will be discussed in greater detail in FIGS. 10 and 15. Alternatively, in some embodiments, the prompt to determine an authentication sequence code may include an authentication sequence code generated by authentication circuitry. As such, in some embodiments, the authentication circuitry 210 may generate the authentication sequence code and the primary device may determine an authentication sequence code by receiving it from apparatus 200. In some embodiments, the authentication sequence code is an OTP.

In some embodiments, the particular method used by authentication circuitry 210 to prompt the primary device to determine the authentication sequence code may be configured by an authorized end user, such as an security administrator user associated with shared trust verification system 102. In some embodiments, the method used by authentication circuitry 210 may be configured to change periodically or semi-periodically in order to make it more difficult for fraudsters to impersonate either a client user or agent user.

Figure 8:
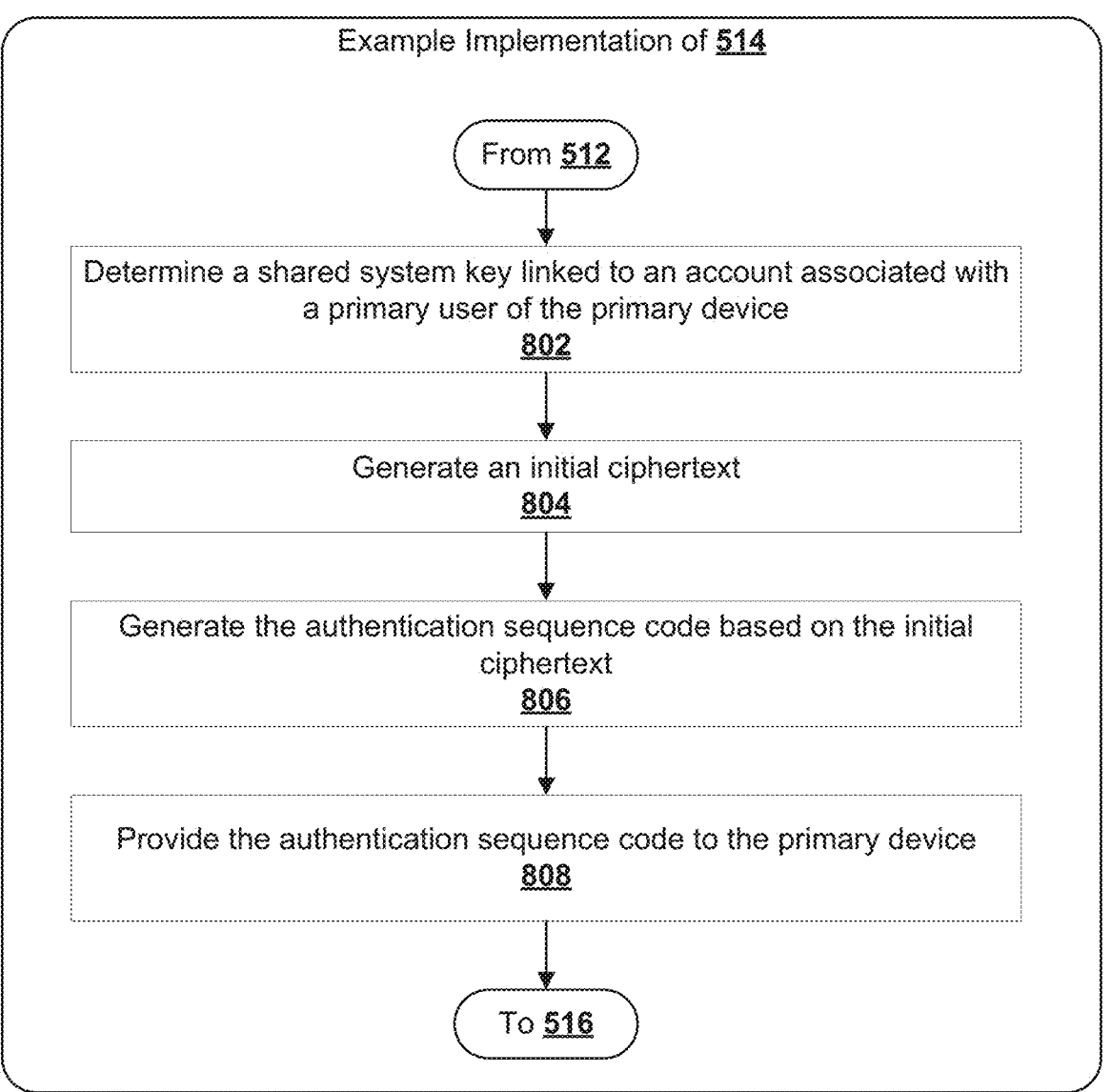
FIG. 8 illustrates an example flowchart for providing an authentication sequence code to a primary device using a system device, in accordance with some example embodiments described herein.

In some embodiments, operation 514 may be performed in accordance with the operations described by FIG. 8. Turning now to FIG. 8, example operations are shown for generating an authentication sequence code to provide to the primary device.

As shown by operation 802, the apparatus 200 includes means, such as processor 202, memory 204, communications hardware 206, authentication circuitry 210, or the like, for determining a shared system key linked to a user account associated with a primary user of the primary device. As described above in operations 502-504, the authentication circuitry 210 may establish a shared system key for the agent user and/or client user. Thus, authentication circuitry 210 may access the shared system key (e.g., an agent shared system key or a client shared system key) linked to a user account of the user corresponding to the primary user. In some embodiments, the shared system key may be used as a seed value for generating the authentication sequence code.

As shown by operation 804, the apparatus 200 includes means, such as processor 202, memory 204, communications hardware 206, authentication circuitry 210, or the like, for generating an initial ciphertext. In some embodiments, the authentication circuitry 210 may generate the initial ciphertext using a cryptographic hash function and using the shared system key. In some embodiments, the authentication circuitry 210 may use a hash-based message authentication code (HMAC) based one-time-password (HOTP) algorithm, a time-based one-time password (TOTP) algorithm, and/or other suitable OTP generation algorithms and/or extensions to generate the initial ciphertext. In particular, the authentication circuitry 210 may determine and provide a value of a counter, as done in HOTP, or a time-based counter, as done in TOTP, and the shared system key to a cryptographic hash function to generate the initial ciphertext. In some embodiments, the cryptographic hash function may be any suitable one-way cryptographic hash function, such as secure hash algorithm (e.g., SHA-1, SHA-2, SHA-3), message digest algorithm (e.g., MD2, MD4, MD5, MD6), and/or the like. In some embodiments, the initial ciphertext value output may have a size of 128-bit, 224-bit, 256-bit, 384-bit, or 512-bit.

As shown by operation 806, the apparatus 200 includes means, such as processor 202, memory 204, communications hardware 206, authentication circuitry 210, or the like, for generating the authentication sequence code based on the initial ciphertext. The authentication circuitry 210 may then generate the authentication sequence code based on the initial ciphertext. In some embodiments, the authentication circuitry 210 may extract a portion of the digits from the initial ciphertext value and use these extracted digits as the authentication sequence code. For example, the authentication circuitry 210 may extract the last 6-8 digits of the initial ciphertext value and use these digits to generate the authentication sequence code. In some embodiments, the authentication circuitry 210 may generate the authentication sequence code using the entire initial ciphertext such that the value of the authentication sequence code is the same as the value of the initial ciphertext.

As shown by operation 808, the apparatus 200 includes means, such as processor 202, memory 204, communications hardware 206, or the like, for providing the authentication sequence code to the primary device. Once the authentication circuitry 210 has generated the authentication sequence code, the communications hardware 206 may provide the authentication sequence code to the primary device (e.g., client device 106 or agent device 108). The authentication circuitry 210 may further include instructions for the primary device to determine the authentication sequence code based on the provided authentication sequence code.

Returning now to FIG. 5, as shown by operation 516, the apparatus 200 includes means, such as processor 202, memory 204, communications hardware 206, authentication circuitry 210, or the like, for prompting the recipient device to provide a candidate authentication sequence code message. Once authentication circuitry 210 has assigned a recipient device, the authentication circuitry 210 may prompt the recipient device to provide a candidate authentication sequence code message. The prompt may further provide an indication to the recipient device that it is assigned as the recipient device.

In some embodiments, the prompt may further include a candidate authentication sequence code. As described above, in some embodiments, the authentication circuitry 210 may generate the authentication sequence code for the primary device and provide this authentication sequence code to the primary device. In some embodiments the authentication sequence code may also be provided to the recipient device as a candidate authentication sequence code. As described in further detail in FIGS. 10 and 15, in some embodiments, the recipient user may be tasked to verify the candidate authentication sequence code by comparing the candidate authentication sequence code provided in this prompt to an authentication sequence code provided by the primary user.

In some embodiments, the prompt may further include device information for apparatus 200. For example, the prompt may provide the recipient device with an indication of a device identifier for apparatus 200 such that once the recipient device determines the candidate authentication sequence code, it may provide the candidate authentication sequence code to the apparatus 200. For example, an indication of a device identifier may be an internet protocol address, domain name, etc. In some embodiments, the candidate authentication sequence code is an OTP that is determined by the recipient device based on data received from the primary device or primary user.

As shown by operation 518, the apparatus 200 includes means, such as processor 202, memory 204, communications hardware 206, authentication circuitry 210, or the like, for receiving the candidate authentication sequence code message from the recipient device. In some embodiments, the communications hardware 206 may receive the candidate authentication sequence code message with a HTTP or HTTPS protocol (e.g., HTTP or HTTPS requests from the recipient device). For example, the communications hardware 206 may receive an HTTP request for a "POST" method with an HTTP header that indicates a primary user identifier, a recipient user identifier, a current communication identifier, etc.

In some embodiments, the candidate authentication sequence code message may be received using specific APIs, such as RESTful APIs or WebSocket APIs. In some embodiments, the communications hardware 206 may receive the candidate authentication sequence code message from a mobile application of the recipient device in an instance in which the recipient device is client device 106. Alternatively, the communications hardware 206 may receive the candidate authentication sequence code message from an internal account environment of the recipient device in an instance in which the recipient device is an agent device 108.

In some embodiments, the authentication circuitry 210 may determine a response time indicative of an amount of time from the time the recipient device was prompted to provide the candidate authentication sequence code message until the current time or until the candidate authentication sequence code message is received. In some embodiments, in an instance in which the response time has exceeded a response time threshold (e.g., 30 seconds), the authentication circuitry 210 may automatically reject the candidate authentication sequence code and/or determine a failed verification status for the current communication. As such, in an instance in which the communications hardware 206 fails to receive a candidate authentication sequence code from the recipient device or in an instance in which the communications hardware 206 receives the candidate authentication sequence code from the recipient device after the response time threshold has been exceeded, the authentication circuitry may determine a failed verification status for the current communication. In some embodiments, the process may then proceed back to operation 510, where the authentication circuitry 210 may repeat operations 510-516 to allow a new authentication sequence code to be determined and a new candidate authentication sequence code message to be received in order to retry verification of the current communication. In some embodiments, the authentication circuitry 210 may only repeat this process a set number of times (e.g., three times). The response time threshold may thus be used to detect fraudulent users attempting to impersonate an agent user or client user using any one of external devices 110A-110N. However, the fraudulent user will not be able to provide candidate authentication sequence code message to communications hardware 206 because the fraudulent user does not have access to a mobile account requiring client user credentials to access such that the fraudulent user cannot impersonate a client user or client device. Additionally, the fraudulent user does not have access to an internal account environment requiring agent user credentials to access such that the fraudulent user cannot impersonate a client user or client device and thus, again cannot provide a candidate authentication sequence code to communications hardware 206.

In some embodiments, the candidate authentication sequence code message includes a candidate authentication sequence code which must be authenticated or verified by the authentication circuitry 210. In an instance in which the candidate authentication sequence code message includes the candidate authentication sequence code to be verified, the process proceeds to operation 520.

In some embodiments, the candidate authentication sequence code message includes an indication of whether the recipient user of the recipient device verified the candidate authentication sequence code. In an instance in which the candidate authentication sequence code message includes the indication of whether the recipient user of the recipient device verified the candidate authentication sequence code, the process proceeds to operation 522. This is because the recipient user has already verification the candidate authentication sequence code and thus, authentication circuitry 210 need not perform the verification operations.

Optionally, as shown by operation 520, the apparatus 200 includes means, such as processor 202, memory 204, communications hardware 206, authentication circuitry 210, or the like, for performing one or more verification operations based on the candidate authentication sequence code. Once the authentication circuitry 210 has received the candidate authentication sequence code, it may perform one or more verification operations to attempt to verify the candidate authentication sequence code and thereby, verify the current communication. Verification of the current communication may establish the client user's identity and intent to proceed with a particular action or service as well as establish the agent user's identity and association with shared trust verification system 102.

Figure 9:
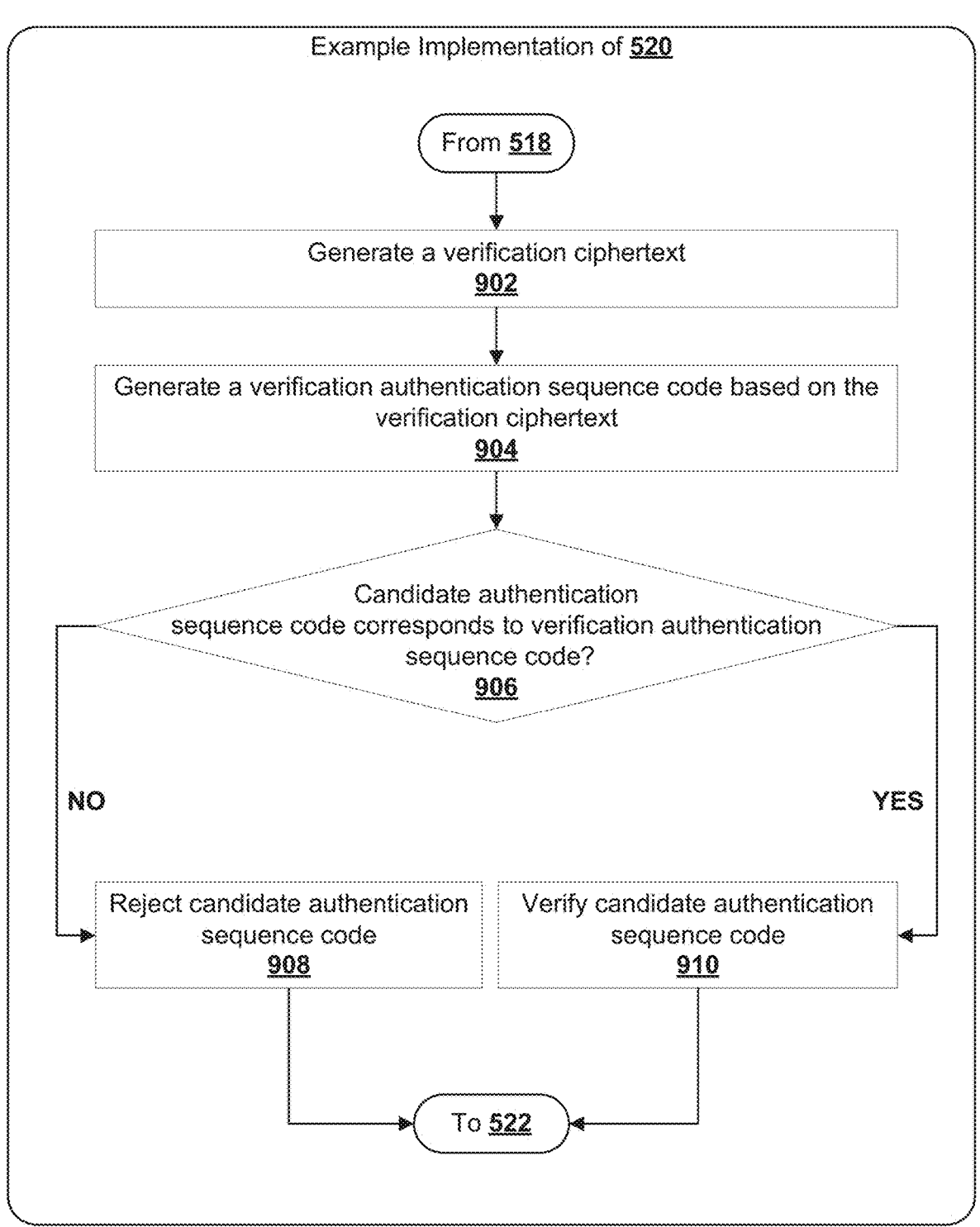
FIG. 9 illustrates an example flowchart for performing one or more verification operations using a system device, in accordance with some example embodiments described herein.

In some embodiments, operation 520 may be performed in accordance with the operations described by FIG. 9. Turning now to FIG. 9, example operations are shown for performing the one or more verification operations.

As shown by operation 902, the apparatus 200 includes means, such as processor 202, memory 204, communications hardware 206, authentication circuitry 210, or the like, for generating a verification ciphertext. The verification ciphertext may be an independently derived ciphertext value using the same parameters theoretically used to generate the received candidate authentication sequence code and thus, can be used to verify the received candidate authentication sequence code. Regardless of which device generated the authentication sequence code (e.g., apparatus 200 or the primary device), the authentication circuitry 210 may generate a verification ciphertext, which may then be used to generate the verification authentication sequence code.

The authentication circuitry 210 may access the shared system key (e.g., an agent shared system key or a client shared system key) linked to the user account corresponding to the primary user. In some embodiments, the shared system key may be used as a seed value for generating the authentication sequence code.

The authentication circuitry 210 may then generate the verification ciphertext using a cryptographic hash function and the shared system key of the primary user. In some embodiments, the authentication circuitry 210 may use a HOTP algorithm, a TOTP algorithm, and/or other suitable OTP generation algorithm and/or extensions to generate the verification ciphertext. In particular, the authentication circuitry 210 may determine and provide a value of a counter, as done in HOTP, or a time-based counter, as done in TOTP, and the shared system key to a cryptographic hash function to generate the verification ciphertext. In some embodiments, the cryptographic hash function may be any suitable one-way cryptographic hash function, such as secure hash algorithm (e.g., SHA-1, SHA-2, SHA-3), message digest algorithm (e.g., MD2, MD4, MD5, MD6), and/or the like. In some embodiments, the verification ciphertext value output may have a size of 128-bit, 224-bit, 256-bit, 384-bit, or 512-bit. The particular cryptographic hash function used may be the same cryptographic hash function used to generate an initial ciphertext that was used to generate the authentication sequence code.

As shown by operation 904, the apparatus 200 includes means, such as processor 202, memory 204, communications hardware 206, authentication circuitry 210, or the like, for generating a verification authentication sequence code based on the verification ciphertext. The authentication circuitry 210 may then generate the verification authentication sequence code based on the verification ciphertext. In some embodiments, the authentication circuitry 210 may extract a portion of the digits from the verification ciphertext value and use these extracted digits as the verification authentication sequence code. For example, the authentication circuitry 210 may extract the last 6-8 digits of the verification ciphertext value and use these digits to generate the verification authentication sequence code. In some embodiments, the authentication circuitry 210 may generate the verification authentication sequence code using the entire verification ciphertext such that the value of the verification authentication sequence code is the same as the value of the verification ciphertext. The protocol the authentication circuitry 210 uses to generate the verification authentication sequence code may be the same protocol used to generate the authentication sequence code.

As shown by operation 906, the apparatus 200 includes means, such as processor 202, memory 204, communications hardware 206, authentication circuitry 210, or the like, for determining whether the candidate authentication circuitry sequence code corresponds to the verification authentication sequence code. The authentication circuitry 210 may then compare the value of the candidate authentication sequence code (e.g., received in operation 518) to the value of the verification authentication sequence code to determine whether the values correspond to one another. In some embodiments, the candidate authentication sequence code may be determined to correspond to the verification authentication sequence code in an instance in which the values exactly match. In an instance in which the candidate authentication sequence code and verification authentication sequence code values exactly match, this may indicate that the primary device successfully provided the authentication sequence code to the recipient device, which in turn, provided a candidate authentication sequence code that matches the authentication sequence code. Thus, the client user identity is verified, the agent user identity is verified, and the client user's intent for a service or interaction to be performed in verified.

In some embodiments, the candidate authentication sequence code may be determined to fail to correspond to the verification authentication sequence code in an instance in which the values do not exactly match. In an instance in which the candidate authentication sequence code and verification authentication sequence code values do not exactly match, this may indicate that the primary device failed to receive or generate the authentication sequence code, the primary device failed to provide the authentication sequence code to the recipient device, or the recipient device failed to provide the candidate authentication sequence code to communications hardware 206. Therefore, neither the client user's identity nor the agent user's identity may be verified and further, the client user's intent cannot be verified. Such a failure may occur in an instance in which the client user does not want to proceed with a service or interaction or in an instance in which the agent user or client user is a fraudster impersonating an agent user or client user. However, the fraudster does not have access to a mobile application of a client user via a client device 106 nor an internal account environment of an agent user via an agent device 108 and therefore, may not access the authentication sequence code.

In an instance in which the candidate authentication circuitry sequence code does not correspond to the verification authentication sequence code, the process proceeds to operation 908. As shown by operation 908, the apparatus 200 includes means, such as processor 202, memory 204, communications hardware 206, authentication circuitry 210, or the like, for rejecting the candidate authentication sequence code. In an instance in which the authentication circuitry 210 determines the candidate authentication circuitry sequence code does not correspond to the verification authentication sequence code, the authentication circuitry 210 may reject the candidate authentication sequence code. As described above, in this instance, neither the client user's identity nor the agent user's identity may be verified and further, the client user's intent cannot be verified. Thus, the authentication circuitry 210 may reject the candidate authentication sequence code.

In an instance in which the candidate authentication circuitry sequence code corresponds to the verification authentication sequence code, the process proceeds to operation 910. As shown by operation 910, the apparatus 200 includes means, such as processor 202, memory 204, communications hardware 206, authentication circuitry 210, or the like, for verifying the candidate authentication sequence code. In an instance in which the authentication circuitry 210 determines the candidate authentication circuitry sequence code corresponds to the verification authentication sequence code, the authentication circuitry 210 may verify the candidate authentication sequence code. As described above, in this instance, the client user identity is verified, the agent user identity is verified, and the client user's intent for a service or interaction to be performed in verified. Thus, the authentication circuitry 210 may verify the candidate authentication sequence code.

Returning now to FIG. 5, as shown by operation 522, the apparatus 200 includes means, such as processor 202, memory 204, communications hardware 206, authentication circuitry 210, visualization circuitry 212, or the like, for updating a verification status of the current communication. In some embodiments, the authentication circuitry 210 may update the verification status of the current communication based on the results of the verification operations. For example, in an instance in which the one or more verification operations verified the candidate authentication sequence code, the authentication circuitry 210 may update the verification status to a successful verification status. Alternatively, in an instance in which the one or more verification operations rejected the candidate authentication sequence code, the authentication circuitry 210 may update the verification status to a failed verification status. In some embodiments, the authentication circuitry 210 may update the verification status of the current communication based on the candidate authentication sequence message received operation 518. In some embodiments, the candidate authentication sequence code message includes an indication of whether the recipient user of the recipient device authenticated the candidate authentication sequence code. In an instance in which the indication is indicative that the recipient user verified the candidate authentication sequence code, the authentication circuitry 210 may update the verification status to a successful verification status. In an instance in which the indication is indicative that the recipient user failed to verify (e.g., rejected) the candidate authentication sequence code, the authentication circuitry 210 may update the verification status to a failed verification status.

As shown by operation 524, the apparatus 200 includes means, such as processor 202, memory 204, communications hardware 206, authentication circuitry 210, visualization circuitry 212, or the like, for providing a shared trust decision message. The shared trust decision message may be indicative of the updated verification status for the current communication. In some embodiments, the shared trust decision message further includes updated verification indicium. The visualization circuitry 212 may generate the updated verification indicium in a standardized format (e.g., JSON, XML, HTML, an image, and/or the like) and the updated verification indicium may be included in the shared trust decision message.

In some embodiments, the communications hardware 206 may provide the shared trust decision message as a push notification to the mobile application of client device 106 and/or the internal account environment of the agent device 108. In some embodiments, the communications hardware 206 may use specific APIs, such as RESTful APIs or WebSocket APIs to provide the shared trust decision message. In some embodiments, the communications hardware 306 may use WebSocket to provide the shared trust decision message in real time or near real time without the need for repeated HTTP requests.

In some embodiments, in an instance in which the verification status is a successful verification status, the shared trust decision provided to client device 106 may further include one or more client user request elements that allow the client user to provide one or more new client user requests. In particular, the shared trust decision message may include the one or more available client user requests.

In some embodiments, in an instance in which the verification status is a successful verification status, the shared trust decision provided to client device 106 may further include agent information. The agent information may describe information regarding the agent user. For example, the agent information may include an agent name, department, phone number, email, branch location, picture, live video, and/or the like.

Client Device Operations

Turning to FIGS. 10-14, example flowcharts are illustrated that contain example operations implemented by example embodiments described herein. The operations illustrated in FIGS. 10-14 may, for example, be performed by a client device (e.g., client devices 106 shown in FIGS. 1A-1C), which may in turn be embodied by an apparatus 300, which is shown and described in connection with FIG. 3. To perform the operations described below, the apparatus 300 may utilize one or more of processor 302, memory 304, communications hardware 306, authentication circuitry 310, visualization circuitry 312, and/or any combination thereof.

Figure 10:
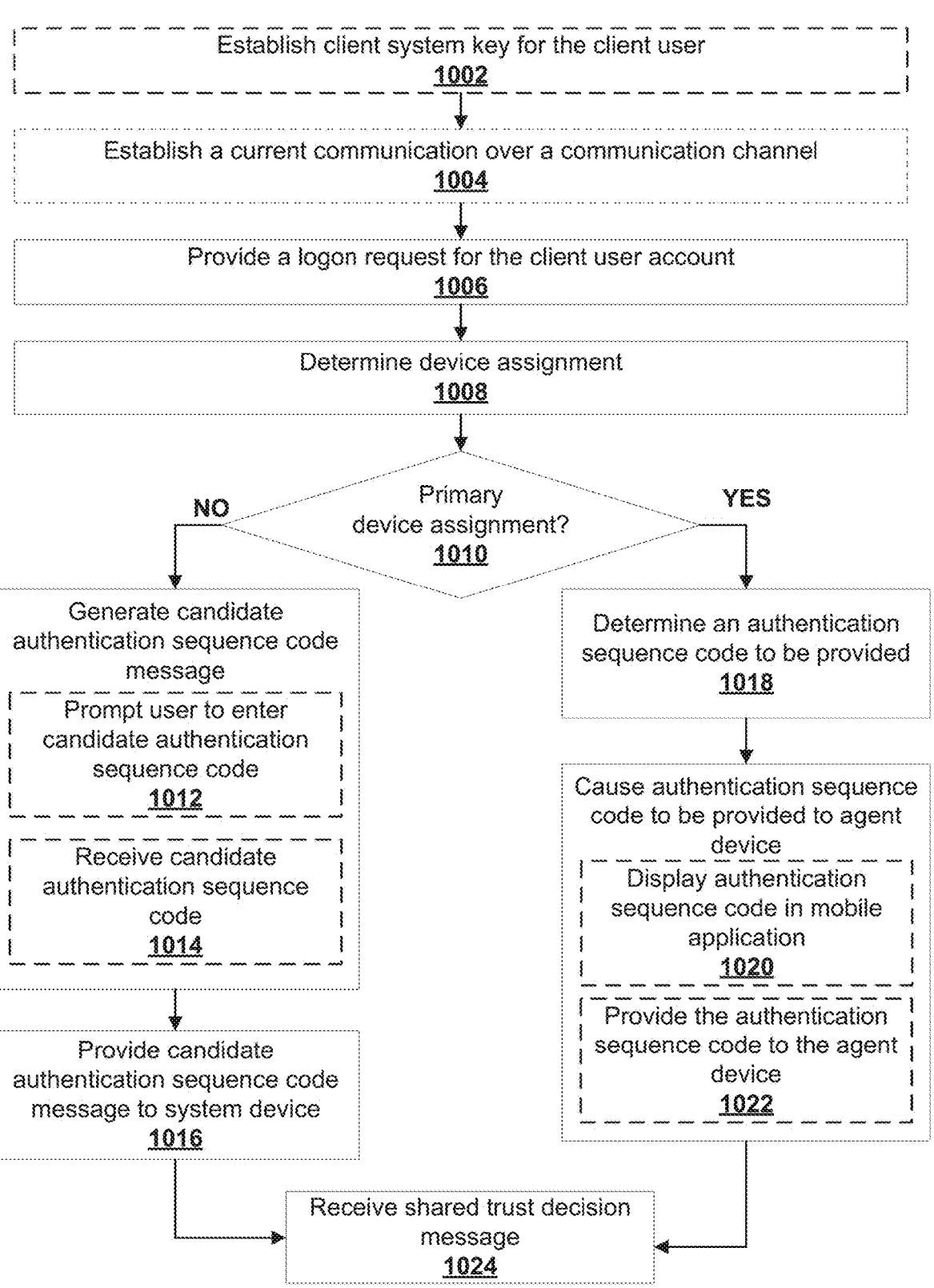
FIG. 10 illustrates an example flowchart for establishing shared trust with an agent user for a current communication using a client device, in accordance with some example embodiments described herein.

Turning now to FIG. 10, example operations are shown for establishing shared trust with an agent user for a current communication. Optionally, as shown by operation 1002, the apparatus 300 includes means, such as processor 302, memory 304, communications hardware 306, authentication circuitry 310, or the like, for establishing a client shared system key for a client user. A client user may be a user associated with apparatus 300. In some embodiments, the client user may be a user who is associated with a client user account maintained by the shared trust verification system 102 (e.g., a customer). A client user account, which may include information about the client user (e.g., name, email, phone number, address, associated device identifiers, account number identifiers, financial information, and/or the like.) and may be stored and maintained in an associated memory (e.g., memory 304 or another data repository). The client user account may further be associated with a client user identifier (e.g., a username, email, customer number, and/or the like) and client user credentials (e.g., a password, biometric data, personal identification number, and/or the like).

In order for apparatus 300 to generate authentication sequence codes and/or verify a received candidate authentication sequence codes from a system device 104 in an instance in which the apparatus 300 is the primary device, the authentication circuitry 310 must first establish a client shared system key for the client user. In some embodiments, the client shared system key may be used as seed value for generating an authentication sequence code and/or verification sequence code for the client user. In some embodiments, the client shared system key may be a cryptographic symmetric key. As described in further detail in FIG. 11, the authentication circuitry 310 may receive a client shared system key for the client user from system device 104 and protect and store the client shared system key for future use (e.g., during authentication sequence code generation and/or received candidate authentication sequence code verification).

Figure 11:
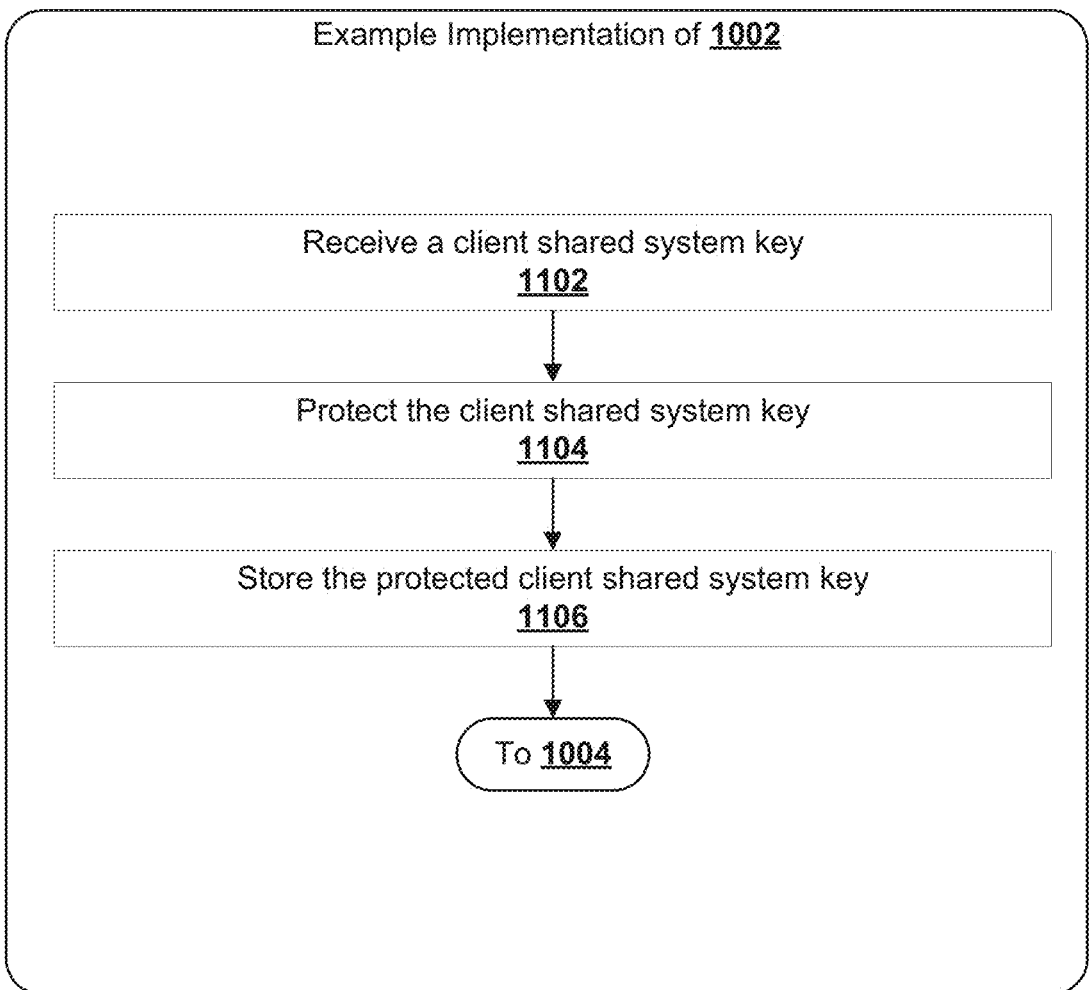
FIG. 11 illustrates an example flowchart for establishing a shared secret for a client user using a client device, in accordance with some example embodiments described herein.

In some embodiments, operation 1002 may be performed in accordance with the operations described by FIG. 11. Turning now to FIG. 11, example operations are shown for establishing a shared secret for a client user.

As shown by operation 1102, the apparatus 300 includes means, such as processor 302, memory 304, communications hardware 306, or the like, for receiving a client shared system key. In some embodiments, the communications hardware 306 may receive the client shared system key from system device 104 by any suitable means. For example, the communications hardware 306 may use cryptographic exchange protocols (e.g., DH or ECDH), a public key infrastructure, a SSL/TSL protocol, secure communication protocols (e.g., SSH or IPSec), and/or the like to receive the client shared system key from system device 104. In some embodiments, the communications hardware 306 may download the client shared system key from a removable hardware configured with the client shared system key. In some embodiments, the communications hardware 306 may capture visual indicium (e.g., a QR code) displayed on another client device and/or monitor associated with the client user and use the visual indicium to extract the client shared system key.

As shown by operation 1104, the apparatus 300 includes means, such as processor 302, memory 304, communications hardware 306, authentication circuitry 310 or the like, for protecting a client shared system key. In some embodiments, the authentication circuitry 310 may protect the client shared system key using any suitable method, such as by encrypting the client shared system key using a symmetric encryption algorithm (e.g., an AES algorithm, a DES algorithm, a Blowfish algorithm, or a Rivest Cipher algorithm, such as RC4, RC5, or RC6) or an asymmetric encryption algorithm (e.g., an RSA algorithm).

As shown by operation 1106, the apparatus 300 includes means, such as processor 302, memory 304, communications hardware 306, authentication circuitry 310 or the like, for storing a client shared system key. The authentication circuitry 310 may store the client shared system key in a secure manner. For example, the authentication circuitry 310 may store the client shared system key within a HSM or cloudHSM. As another example, the authentication circuitry 310 may store the client shared system key in a dedicated key management system or secure key vault. As another example, the authentication circuitry 310 may store the client shared system key within an associated database or memory, such as memory 304. The authentication circuitry 310 may further link the client shared system key to the client user account. That is, the authentication circuitry 310 may require that a client user identifier and client user credentials be provided and successfully verified prior to allowing access to the stored client shared system key. This ensures that the correct client shared system key for the particular client user account is used when generating an authentication sequence and/or verifying a received authentication sequence code for the client user when apparatus 300 is assigned as the primary device.

Optionally, returning to FIG. 10, as shown by operation 1004, the apparatus 300 includes means, such as processor 302, memory 304, communications hardware 306, or the like, for establishing a current communication over an established communication channel. As described above in operation 506 of FIG. 5, in some embodiments, apparatus 300 may establish a current communication with agent device 108. A communication channel may be any pathway or medium through which the client user and agent user communicate. For example, a communication channel may be a voice communication channel (e.g., phone calls), a messaging platform (e.g., online or mobile application chat center), text-based messaging (e.g., SMS texts), and/or the like. The communication channel need not be the mobile application for apparatus 300 or the internal account environment of agent device 108. Additionally, in some embodiments, the current communication need not be established using apparatus 300 and a different client device (e.g., client device 106N) may be used to establish the current communication over the communication channel.

The current communication over the communication channel may be initiated by either the client user or the agent user. In some embodiments, the current communication may be initiated in response to one or more client user requests from the client user. A client user request may be a request for one or more actions to be performed for a client user account. For example, a client user request may correspond to transferring funds from a client user account, applying for additional products and/or services (e.g., mortgages, auto loans, home loans, personal loans, new accounts), cancelling a product and/or service, modifying a product and/or service, and/or the like. A client user request may be associated with a client user account such that it is visible to an agent user accessing a client user account. In some embodiments, a client user request may further be associated with a request status (e.g., initiated, pending, submitted, waiting for client, waiting for agent, completed, cancelled). A client user request may have occurred prior to the current communication. For example, a client user may use a mobile application to request a modification of a service but may be unable to complete the request via the mobile app without speaking to an agent user. The request status of the client user request may thus be updated by system device 104 to "waiting for agent". The system device 104 may further be configured to push this client user request to an appropriate agent user to handle. Thus, the agent user may call the client user and initiate the current communication in response to the request for modification of a service initiated by the client user. As another example, the client user may call a phone number associated with the client user account and may be connected to an agent user to establish the current communication. During the current communication, the client user may provide one or more client user requests directly to the agent user, who may input these client user requests into the client user account via an agent device 108.

As shown by operation 1006, the apparatus 300 includes means, such as processor 302, memory 304, communications hardware 306, visualization circuitry 312, or the like, for providing a logon request for the client user account. In some embodiments, the logon request may be a request to access a client user account within a mobile application. A mobile application may refer to a digital platform developed by a company or institution that manages and/or maintains the client user account. The mobile application may allow client users to manage their account and associated account activity conveniently through their device. In order to access a client account within a mobile application, a client user may first need to provide a logon request, which requires his/her client user identifier (e.g., a username, email, customer number, and/or the like) and client user credentials (e.g., a password, biometric data, personal identification number, and/or the like). A client user may input this information into the mobile application to create a logon request and communications hardware 306 may be used to provide the logon request that includes the client user identifier and client user credentials, to system device 104. In some embodiments, the logon request follows an HTTP/HTTPS protocol (e.g., an HTTP request). The communications hardware 306 may receive an indication of whether the logon request was successfully authenticated (e.g., via an HTTP response) and in an instance in which the logon request was successfully authenticated, may receive data or content for the client user account. Thus, visualization circuitry 312 may process the received content to cause rendering or display of the content within the mobile application.

In some embodiments, the received content may include a verification status of the current communication. This may occur in an instance in which the client user provides a logon request to system device 104 after the system device 104 has determined the current communication over the established communication channel. In some embodiments, the client user may provide a logon request to system device 104 before the system device 104 has determined the current communication and/or before the current communication has been established. In such an instance, the communications hardware 306 may provide an HTTP request to receive the verification status from system device 104. Alternatively, the system device 104 may provide a push notification to the communications hardware 306 for the mobile application such that the verification status is received via the push notification. In some embodiments, the communications hardware 306 may use specific APIs, such as RESTful APIs or WebSocket APIs to receive the verification status from system device 104. In some embodiments, the communications hardware 306 may use WebSocket to receive the verification status from the system device 104 in real time or near real time without the need for repeated HTTP requests.

In some embodiments, the verification status includes a verification indicium in a standardized format (e.g., JSON, XML, HTML, an image, and/or the like). The visualization circuitry 312 may cause the verification indicium to be displayed in the mobile application. The verification indicium may a graphical representation of the verification status where the verification status is indicated by a particular shape (e.g., an 'x', a checkmark, a thumbs up, a thumbs down, and/or the like) and/or color (e.g., red, green, or yellow) that depicts a representation of the verification status. For example, in an instance in which a verification status is a not yet verified verification status, the verification indicium may be a yellow 'x'. As another example, in an instance in which a verification status is a successful verification status, the verification indicium may be a green checkmark. As yet another example, in an instance in which a verification status is a failed verification status, the verification indicium may be a red 'x'. In some embodiments, the verification indicium may further include text that is indicative of the verification status. For example, in an instance in which a verification status is a not yet verified verification status, the verification indicium may include the text "not yet verified". As another example, in an instance in which a verification status is a successful verification status, the verification indicium may include the text "successful verification". As yet another example, in an instance in which a verification status is a failed verification status, the verification indicium may include the text "failed verification-possible fraud".

As shown by operation 1008, the apparatus 300 includes means, such as processor 302, memory 304, communications hardware 306, authentication circuitry 310, or the like, for determining a device assignment. The communications hardware 306 may receive a device assignment from the system device 104 and may determine the device assignment (e.g., a primary device or a recipient device) for apparatus 300 based on this received device assignment. In some embodiments, the device assignment may be received in a device assignment message from the system device 104. In some embodiments, the device assignment may be received in either a prompt to determine an authentication sequence code in an instance in which apparatus 300 is assigned as the primary device or a prompt to provide the candidate authentication sequence code in an instance in which apparatus 300 is assigned as the recipient device. The authentication circuitry 310 may process a received prompt and/or device assignment message to determine a device assignment for the apparatus 300.

As shown by operation 1010, the apparatus 300 includes means, such as processor 302, memory 304, communications hardware 306, authentication circuitry 310, or the like, for determining apparatus 300 was assigned as the primary device. The authentication circuitry 310 may determine whether the received prompt and/or device assignment message assigned apparatus 300 as the primary device.

In an instance in which apparatus 300 was not assigned to be the primary device (e.g., assigned as the recipient device), the process proceeds to either operation 1012 or 1014. Either operation 1012 or 1014 may be used to generate a candidate authentication sequence code message. In some embodiments, the prompt and/or device assignment message received in operation 1008 may further include instructions on how to generate a candidate authentication sequence code message. In particular, the instructions may indicate the client user will be required interact with the agent user to obtain a candidate authentication sequence code and input the candidate authentication sequence code into a mobile application, in which case the process may proceed to operation 1012. Alternatively, the instructions may indicate the client user will be required to simply authorize a provision of the candidate authentication sequence code to a system device 104 using an authorization element within the mobile application, in which case the process may proceed to operation 1014. In some embodiments, the instructions may indicate the client user will be required interact with the agent user to either verify or reject the candidate authentication sequence code based on interaction with the agent user, in which case the process may also proceed to operation 1014. Here, the prompt may further include the candidate authentication sequence code to be presented to the client user. In some embodiments, the prompt may further include device information for system device 104 such that communications hardware 306 may determine where to provide the candidate authentication sequence code.

As shown by operation 1012, the apparatus 300 includes means, such as processor 302, memory 304, communications hardware 306, authentication circuitry 310, visualization circuitry 312, or the like, for prompting a client user to enter a candidate authentication sequence code. In some embodiments, the visualization circuitry 312 may be configured to render an input element in the mobile application. The input element may allow the client user to interact (e.g., select, type, speak, click, and/or the like) with it to provide the candidate authentication sequence code. Here, the client user may obtain the candidate authentication sequence code from the agent user. For example, the agent user may verbally describe the authentication sequence code if the communication channel is a phone call. As another example, the agent user may provide a message describing the authentication sequence code if the communication channel is a text-based platform. The client user may then be required to input a candidate authentication message into the mobile application. This explicit input of the candidate authentication sequence code serves as proof that the client user was authenticated and therefore able to access the client user account within the mobile device and further, may allow the client user to provide verification of his/her intent and/or authorize one or more client service requests.

Turning to FIG. 23, a graphical user interface (GUI) is provided that illustrates an example user interface of a mobile application where a current communication has not yet been verified. The GUI shown in FIG. 23 may be displayed to a user by the apparatus 300. As shown in FIG. 23, the mobile application may display a verification indicium 2301 indicative of the verification status of the current communication. Additionally, the mobile application may display an input element 2302 that the user may interact with to input the candidate authentication sequence code.

Returning now to FIG. 10, alternatively, as shown by operation 1014, the apparatus 300 includes means, such as processor 302, memory 304, communications hardware 306, visualization circuitry 310, or the like, for receiving a candidate authentication sequence code. In some embodiments, the visualization circuitry 312 may be configured to render an authorization element and rejection element in the mobile application. The authorization element may allow the client user to interact (e.g., select, type, speak, click, and/or the like) with it to authorize apparatus 300 to provide the candidate authentication sequence code. The rejection element may allow the client user to interact (e.g., select, type, speak, click, and/or the like) with it to cause apparatus 300 to provide a rejection message instead of the candidate authentication sequence code to system device 104. The rejection message may automatically cause the system device 104 to determine a failed verification status for the current communication.

In some embodiments, the communications hardware 306 may receive the candidate authentication sequence code from the agent device 108. The visualization circuitry 310 may similarly render an authorization element and a rejection element in the mobile application. The authorization element may allow the client user to interact (e.g., select, type, speak, click, and/or the like) with it to authorize apparatus 300 to provide the candidate authentication sequence code. While the agent user may provide an indication that the client user should be expecting the authorization element, no direct exchange of the authentication sequence code is needed between the client user and agent user. Rather, the communications hardware 306 may receive the candidate authentication sequence code from the agent device and may only need the client user to authorize apparatus 300 to provide the candidate authentication sequence code. Here, the system device 104 may perform the one or more verification operations using the candidate authentication sequence code. However, the explicit authorization may serve as proof that the client user was authenticated and therefore able to access the client user account within the mobile device and further, allows the client user to provide verification of his/her intent and/or authorize one or more client service requests.

Turning to FIG. 24, a GUI is provided that illustrates an example user interface of a mobile application where a current communication has not yet been verified. The GUI shown in FIG. 24 may be displayed to a user by the apparatus 300. As shown in FIG. 24, the mobile application may display a verification indicium 2401 indicative of the verification status of the current communication. Additionally, the mobile application may display an authorization element 2402 that the user may interact with to authorize the apparatus 300 to provide the candidate authentication sequence code and a rejection element 2403 that the user may interact with to prohibit the apparatus 300 from providing the candidate authentication sequence code.

In some embodiments, the received candidate authentication sequence may be received from the system device 104. The visualization circuitry 312 may be configured to display the received candidate authentication sequence code in the mobile application. The agent device 108 may be configured to display the authentication sequence code to the agent user, who may then read the authentication sequence code displayed via the agent device 108. The client user may compare the authentication sequence code provided by the agent user to the displayed candidate authentication sequence code to manually determine whether the codes match. In an instance the client user determines the codes match, the client user may interact with the authorization element to confirm the codes match. Alternatively, in an instance the client user determines the codes do not match, the client user may interact with the rejection element to reject the candidate authentication sequence code. Here, the client user may determine whether the codes match instead of system device 104, as described above.

Turning to FIG. 25, a GUI is provided that illustrates an example user interface of a mobile application where a current communication has not yet been verified and the client user confirms an authentication sequence code. The GUI shown in FIG. 25 may be displayed to a user by the apparatus 300. As shown in FIG. 25, the mobile application may display a verification indicium 2401 indicative of the verification status of the current communication. Additionally, the mobile application may display the candidate authentication sequence code 2502 to the client user, who may then use this code to compare to the code read by the agent user. The mobile application may display an authorization element 2503 that the user may interact with to authorize the candidate authorization sequence code in an instance the agent user provided code matches the displayed code and cause the apparatus 300 to provide a candidate authentication sequence code message indicative of this authentication. The mobile application may further display a rejection element 2403 that the user may interact with to reject the candidate authorization sequence code in an instance the agent user provided code which does not match the displayed code and cause the apparatus 300 to provide a candidate authentication sequence code message indicative of this failure.

Returning now to FIG. 10, in either example, as shown by operation 1016, the apparatus 300 includes means, such as processor 302, memory 304, communications hardware 306, or the like, for providing a candidate authentication sequence code message to the system device 104. The candidate authentication sequence code message may include the candidate authentication sequence code entered by the client user or received from the agent device 108. Alternatively, the candidate authentication sequence code message may include an indication of whether the client user verified the candidate sequence code or rejected the candidate sequence code.

In an instance in which apparatus 300 was assigned to be the primary device, the process proceeds to operation 1018. As shown by operation 1018, the apparatus 300 includes means, such as processor 302, memory 304, communications hardware 306, authentication circuitry 310, or the like, for determining an authentication sequence code to be provided to an agent device. In an instance in which apparatus 300 is assigned as the primary device, authentication circuitry 310 may be required to determine the authentication sequence code to be provided to an agent user. In some embodiments, the prompt and/or device assignment message received in operation 1008 may further include instructions on how to determine an authentication sequence code. In some embodiments, the instructions may indicate the authentication circuitry 310 may receive an authentication sequence code from system device 104 and should use the received authentication sequence code to directly or indirectly determine the authentication sequence. Alternatively, the instructions may indicate the authentication circuitry 310 should generate the authentication sequence code. In some embodiments, the prompt may further include device information for agent device 108 such that communications hardware 306 may determine where to provide the authentication sequence code (if needed).

Figure 12:
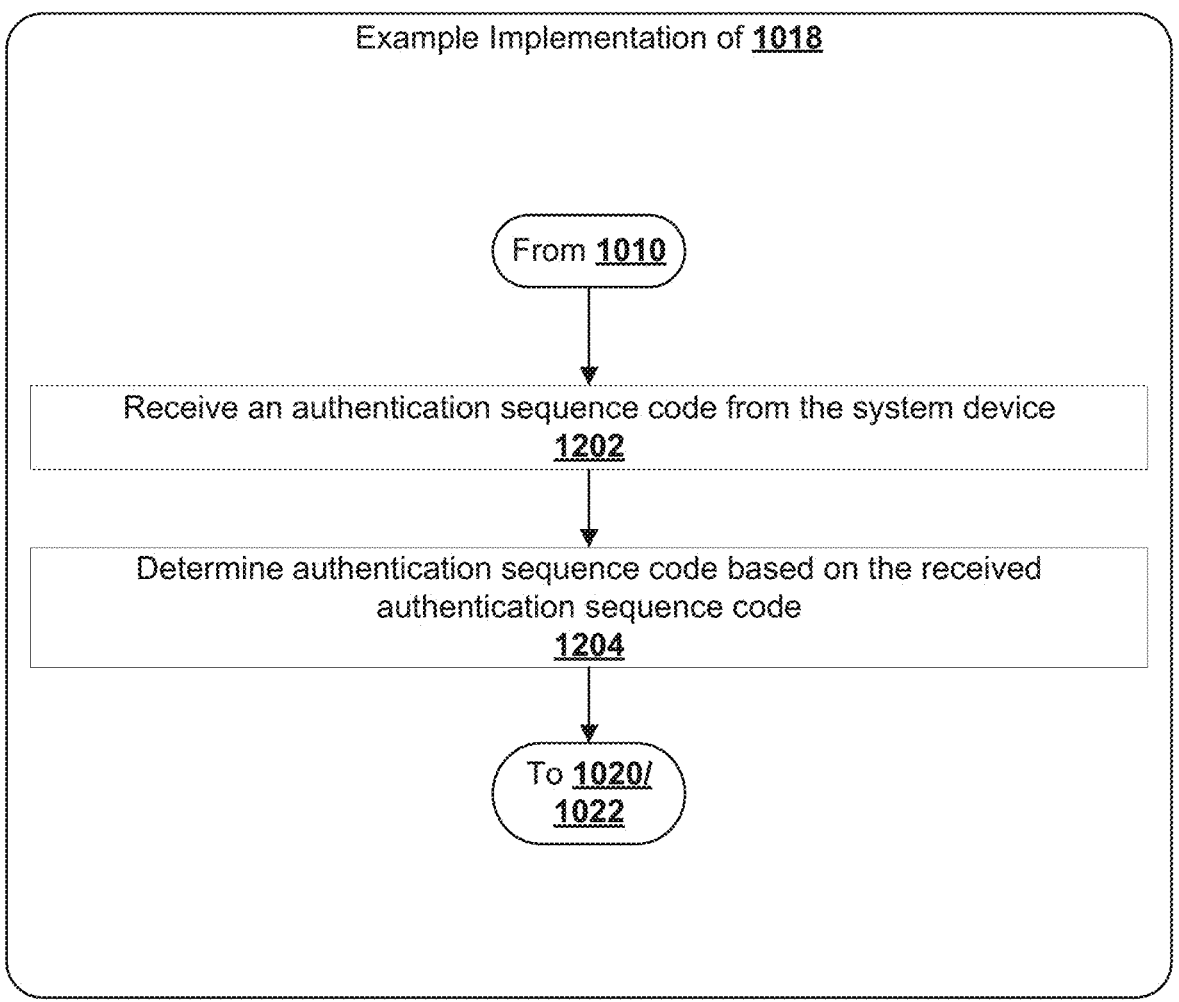
FIG. 12 illustrates an example flowchart for determining an authentication sequence code based on a received authentication sequence code using a client device, in accordance with some example embodiments described herein.
Figure 13:
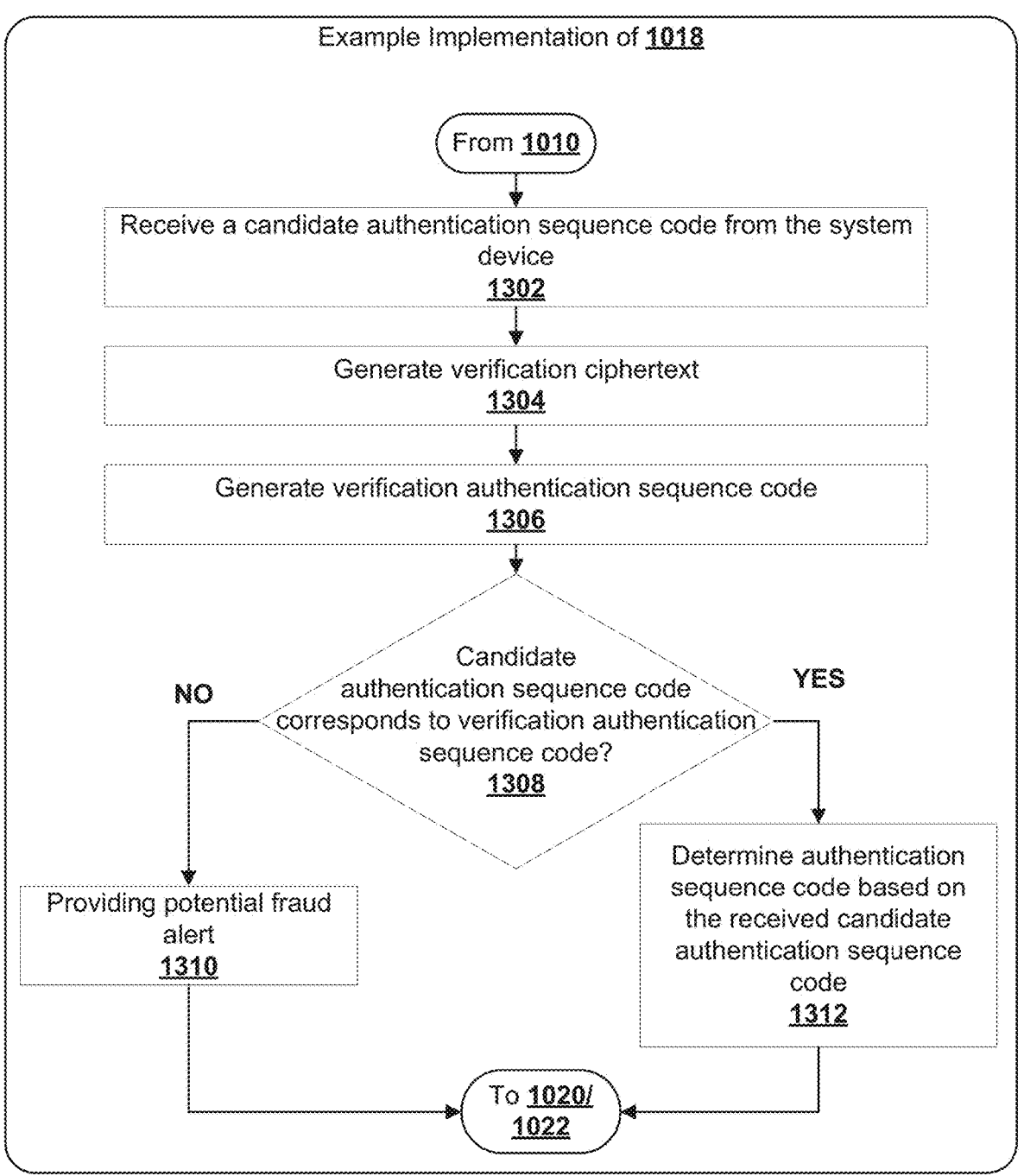
FIG. 13 illustrates an example flowchart for determining an authentication sequence code based on a verified, received authentication sequence code using a client device, in accordance with some example embodiments described herein.
Figure 14:
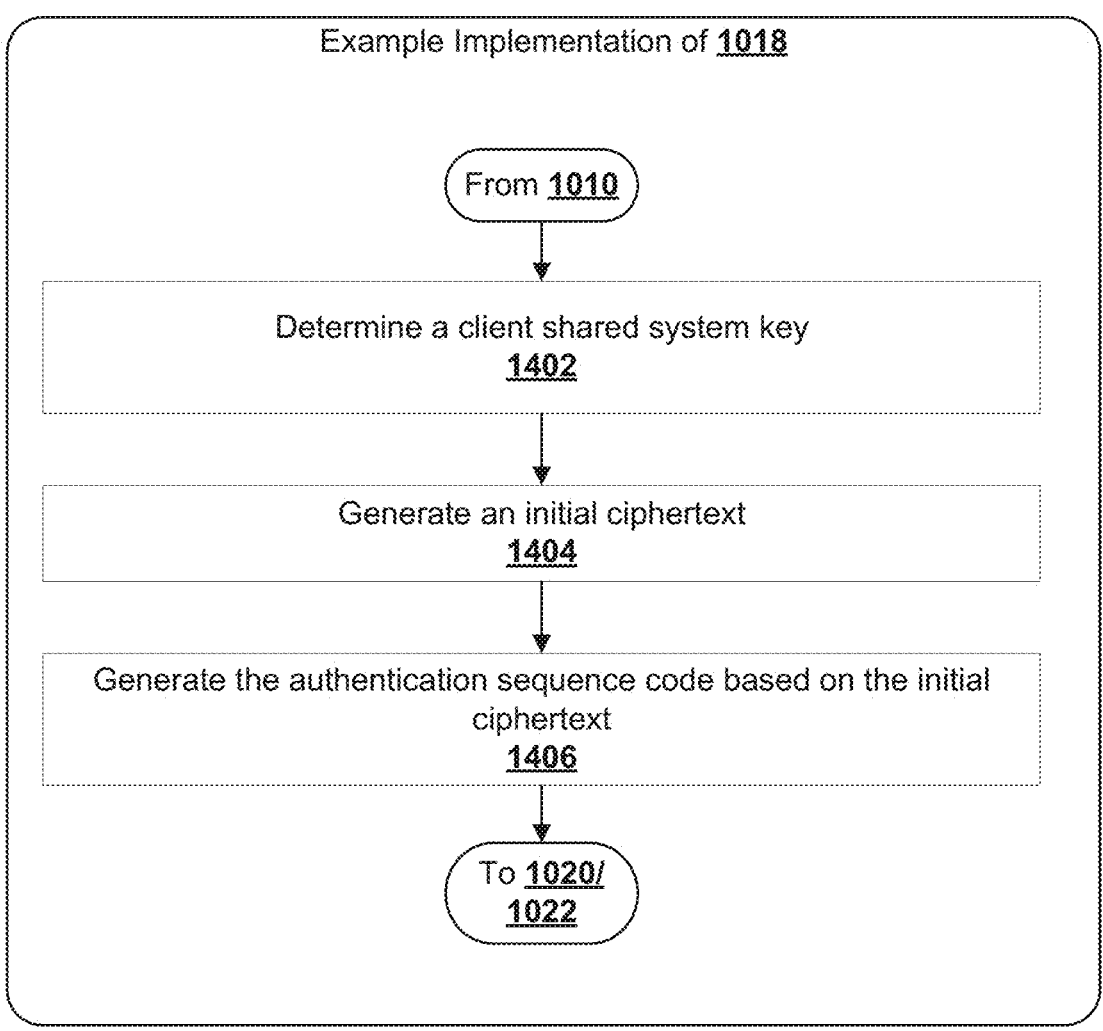
FIG. 14 illustrates an example flowchart for determining an authentication sequence code by generating the authentication sequence code using a client device, in accordance with some example embodiments described herein.

In some embodiments, operation 1018 may be performed in accordance with the operations described by FIG. 12, 13, or 14.

Turning first to FIG. 12, example operations are shown for determining an authentication sequence based on a received authentication sequence code. As shown by operation 1202, the apparatus 300 includes means, such as processor 302, memory 304, communications hardware 306, or the like, for receiving an authentication sequence code from the system device. As described above, the communications hardware 306 may receive an authentication sequence code from the system device 104.

As shown by operation 1204, the apparatus 300 includes means, such as processor 302, memory 304, communications hardware 306, authentication circuitry 310, or the like, for determining the authentication sequence code based on the received authentication sequence code. In some embodiments, the authentication circuitry 310 may directly determine the authentication sequence code based on the received authentication sequence code received in operation 1202. That is, the authentication sequence code determined by authentication circuitry 310 may be the authentication sequence code received from system device 104.

Turning next to FIG. 13, example operations are shown for determining an authentication sequence code based on a received and verified candidate authentication sequence code. Here, the authentication circuitry 310 may first verify the authentication sequence code received from the system device 104 by determining a verification authentication sequence code. As such, the authentication circuitry 310 may provide an additional layer of security when providing the authentication sequence code and prevent a fraudster attempt to spoof system device 104.

As shown by operation 1302, the apparatus 300 includes means, such as processor 302, memory 304, communications hardware 306, or the like, for receiving a candidate authentication sequence code from the system device. As described above, the communications hardware 306 may receive a candidate authentication sequence code from the system device 104. Here, an authentication sequence code received from the system device 104 will first be verified such that it is designated as a candidate authentication sequence code.

As shown by operation 1304, the apparatus 300 includes means, such as processor 302, memory 304, communications hardware 306, authentication circuitry 310, or the like, for generating a verification ciphertext. The verification ciphertext may be an independently derived ciphertext value using the same parameters theoretically used to generate the received candidate authentication sequence code and thus, can be used to verify the received candidate authentication sequence code. The authentication circuitry 310 may access the client shared system key linked to the client user account. In some embodiments, the shared system key may be used as a seed value for generating the candidate authentication sequence code.

The authentication circuitry 310 may then generate the verification ciphertext using a cryptographic hash function and the client shared system key. In some embodiments, the authentication circuitry 310 may use a HOTP algorithm, a TOTP algorithm, and/or other suitable OTP generation algorithm and/or extensions to generate the verification ciphertext. In particular, the authentication circuitry 310 may determine and provide a value of a counter, as done in HOTP, or a time-based counter, as done in TOTP, and the client shared system key to a cryptographic hash function to generate the verification ciphertext. In some embodiments, the cryptographic hash function may be any suitable one-way cryptographic hash function, such as secure hash algorithm (e.g., SHA-1, SHA-2, SHA-3), message digest algorithm (e.g., MD2, MD4, MD5, MD6), and/or the like. In some embodiments, the verification ciphertext value output may have a size of 128-bit, 224-bit, 256-bit, 384-bit, or 512-bit. The particular cryptographic hash function used may be the same cryptographic hash function used to generate an initial ciphertext that was used to generate the authentication sequence code.

As shown by operation 1306, the apparatus 300 includes means, such as processor 302, memory 304, communications hardware 306, authentication circuitry 310, or the like, for generating a verification authentication sequence code based on the verification ciphertext. The authentication circuitry 310 may then generate the verification authentication sequence code based on the verification ciphertext. In some embodiments, the authentication circuitry 310 may extract a portion of the digits from the verification ciphertext value and use these extracted digits as the verification authentication sequence code. For example, the authentication circuitry 310 may extract the last 6-8 digits of the verification ciphertext value and use these digits to generate the verification authentication sequence code. In some embodiments, the authentication circuitry 310 may generate the verification authentication sequence code using the entire verification ciphertext such that the value of the verification authentication sequence code is the same as the value of the verification ciphertext. The protocol the authentication circuitry 310 uses to generate the verification authentication sequence code may be the same protocol used to generate the authentication sequence code.

As shown by operation 1308, the apparatus 300 includes means, such as processor 302, memory 304, communications hardware 306, authentication circuitry 310, or the like, for determining whether the candidate authentication sequence code corresponds to the verification authentication sequence code. The authentication circuitry 310 may then compare the value of the candidate authentication sequence code (e.g., received in operation 1302) to the value of the verification authentication sequence code to determine whether the values correspond to one another. In some embodiments, the candidate authentication sequence code may be determined to correspond to the verification authentication sequence code in an instance in which the values exactly match. In an instance in which the candidate authentication sequence code and verification authentication sequence code values exactly match, this may indicate that the candidate authentication sequence code was generated and provided by the system device 104.

In some embodiments, the candidate authentication sequence code may be determined to fail to correspond to the verification authentication sequence code in an instance in which the values do not exactly match. In an instance in which the candidate authentication sequence code and verification authentication sequence code values do not exactly match, this may indicate that the candidate authentication sequence code did not come from the system device 104.

In an instance in which the candidate authentication sequence code does not correspond to the verification authentication sequence code, the process proceeds to operation 1310. As shown by operation 1310, the apparatus 300 includes means, such as processor 302, memory 304, communications hardware 306, authentication circuitry 310, or the like, for providing a potential fraud alert. The authentication circuitry 310 may generate a potential fraud alert that is indicative of a received candidate authentication sequence code from a device that is not system device 104. The authentication circuitry 310 may then display the potential fraud alert to a user in the mobile application and/or may provide the potential fraud alert to system device 104. Should system device 104 receive a potential fraud alert, an investigation into the potentially fraudulent matter may be opened and one or more proactive anti-fraud steps may be taken by a corresponding entity, such as temporarily freezing client account access, requiring a reset of the client user's password, and/or the like.

In an instance in which the candidate authentication sequence code corresponds to the verification authentication sequence code, the process proceeds to operation 1312. As shown by operation 1312, the apparatus 300 includes means, such as processor 302, memory 304, communications hardware 306, authentication circuitry 310, or the like, for determining the authentication sequence code based on the received candidate authentication sequence code. In some embodiments, the authentication circuitry 310 may determine the authentication sequence code based on the received candidate authentication sequence code received in operation 1302 once the candidate authentication sequence code is determined to correspond to the verification authentication sequence code. That is, the authentication sequence code determined by authentication circuitry 310 may be the candidate authentication sequence code received from system device 104.

Finally, turning to FIG. 14, example operations are shown for determining an authentication sequence by generating the authentication sequence code. As shown by operation 1402, the apparatus 300 includes means, such as processor 302, memory 304, communications hardware 306, authentication circuitry 310 or the like, for determining a client shared system key. As described above in operation 1002, the authentication circuitry 310 may establish a client shared system key for the client user. Thus, authentication circuitry 310 may access the client shared system key linked to client user account. In some embodiments, the client shared system key may be used as a seed value for generating the authentication sequence code.

As shown by operation 1404, the apparatus 300 includes means, such as processor 302, memory 304, communications hardware 306, authentication circuitry 310, or the like, for generating an initial ciphertext. In some embodiments, the authentication circuitry 310 may generate the initial ciphertext using a cryptographic hash function and using the client shared system key. In some embodiments, the authentication circuitry 310 may use a HOTP algorithm, a TOTP algorithm, and/or other suitable OTP generation algorithms and/or extensions to generate the initial ciphertext. In particular, the authentication circuitry 310 may determine and provide a value of a counter, as done in HOTP, or a time-based counter, as done in TOTP, and the client shared system key to a cryptographic hash function to generate the initial ciphertext. In some embodiments, the cryptographic hash function may be any suitable one-way cryptographic hash function, such as secure hash algorithm (e.g., SHA-1, SHA-2, SHA-3), message digest algorithm (e.g., MD2, MD4, MD5, MD6), and/or the like. In some embodiments, the initial ciphertext value output may have a size of 128-bit, 224-bit, 256-bit, 384-bit, or 512-bit.

As shown by operation 1406, the apparatus 300 includes means, such as processor 302, memory 304, communications hardware 306, authentication circuitry 310, or the like, for determining the authentication sequence code based on the initial ciphertext. The authentication circuitry 310 may then generate the authentication sequence code based on the initial ciphertext. In some embodiments, the authentication circuitry 310 may extract a portion of the digits from the initial ciphertext value and use these extracted digits as the authentication sequence code. For example, the authentication circuitry 310 may extract the last 6-8 digits of the initial ciphertext value and use these digits to generate the authentication sequence code. In some embodiments, the authentication circuitry 310 may generate the authentication sequence code using the entire initial ciphertext such that the value of the authentication sequence code is the same as the value of the initial ciphertext. The authentication circuitry 310 may thereby determine the authentication sequence code based on the generated authentication sequence code. That is, the authentication sequence code determined by authentication circuitry 310 may be the generated authentication sequence code.

Returning now to FIG. 10, the process may then proceed to either operation 1020 or 1022. Either operation 1020 or 1022 may be used to cause an authentication sequence code to be provided to an agent device 108. In some embodiments, the prompt and/or device assignment message received in operation 1008 may further include instructions on how to provide the authentication sequence code to the agent device. In particular, the instructions may indicate the client user will be required to obtain the authentication sequence code from an indication element in the mobile application and interact with the agent user to provide the authentication sequence code, in which case the process may proceed to operation 1020. Alternatively, the instructions may indicate the client user will be required to simply authorize a provision of the authentication sequence code to the agent device 108 using an authorization element within the mobile application, in which case the process may proceed to operation 1022.

As shown by operation 1020, the apparatus 300 includes means, such as processor 302, memory 304, communications hardware 306, visualization circuitry 312, or the like, for displaying the authentication sequence code in the mobile application. In some embodiments, the visualization circuitry 312 may be configured to render an indication element in the mobile application. The indication element may display the authentication sequence code to the client user within the mobile application. Here, the client user may view the indication element to obtain the authentication sequence code and may provide the authentication sequence code to the agent user. For example, the client user may verbally describe the authentication sequence code if the communication channel is a phone call. As another example, the client user may provide a message describing the authentication sequence code if the communication channel is a text-based platform. This requirement of providing the agent user with the authentication sequence code may serves as proof that the client user was authenticated and therefore able to access the client user account within the mobile device and further, allows the client user to provide verification of his/her intent and/or authorize one or more client service requests.

Turning to FIG. 26, a GUI is provided that illustrates an example user interface of a mobile application where a current communication has not yet been verified. The GUI shown in FIG. 26 may be displayed to a user by the apparatus 300. As shown in FIG. 26, the mobile application may display a verification indicium 2601 indicative of the verification status of the current communication. Additionally, the mobile application may display an indication element 2602 that may display the authentication sequence code to the client user.

Alternatively, as shown by operation 1022, the apparatus 300 includes means, such as processor 302, memory 304, communications hardware 306, visualization circuitry 312, or the like, for providing the authentication sequence code to the agent device. In some embodiments, the visualization circuitry 312 may be configured to render an authorization element in the mobile application. The authorization element may allow the client user to interact (e.g., select, type, speak, click, and/or the like) with it to authorize apparatus 300 to provide the authentication sequence code to the agent device 108. Here, no direct exchange of the authentication sequence code is needed between the client user and agent user. Rather, the communications hardware 306 may provide the authentication sequence code to the agent device and may only need the client user to authorize apparatus 300 to provide the authentication sequence code. This explicit authorization may serve as proof that the client user was authenticated and therefore able to access the client user account within the mobile device and further, allows the client user to provide verification of his/her intent and/or authorize one or more client service requests. Additionally, the visualization circuitry 312 may be configured to render a rejection element in the mobile application. The rejection element may allow the client user to interact (e.g., select, type, speak, click, and/or the like) with it to prohibit apparatus 300 from providing the authentication sequence code. Thus, the client user is provided with a way to decline to proceed with the process should he/she not wish to continue.

After operations 1016 or 1022, the process may proceed to operation 1024. As shown by operation 1024, the apparatus 300 includes means, such as processor 302, memory 304, communications hardware 306, visualization circuitry 312, or the like, for receiving a shared trust decision message. The communications hardware 306 may receive the shared trust decision message from system device 104. The shared trust decision message may be indicative of the updated verification status for the current communication. In some embodiments, the shared trust decision message further includes updated verification indicium in a standardized format (e.g., JSON, XML, HTML, an image, and/or the like). The visualization circuitry 312 may cause the verification indicium to be displayed in the mobile application. Thus, the client user may view the updated verification status and/or verification indicium within the mobile application to determine whether the agent user identity has been verified. The client user may thus make informed decisions regarding the provision of sensitive client user information until the current communication has been verified. Thus, client users may be protected from fraudsters attempting to steal sensitive information and/or gain access to client user account by first establishing bidirectional shared trust with the agent user.

In some embodiments, the communications hardware 306 may receive the shared trust decision message as a push notification for the mobile application from the system device 104. In some embodiments, the communications hardware 306 may use specific APIs, such as RESTful APIs or WebSocket APIs to receive the shared trust decision message from system device 104. In some embodiments, the communications hardware 306 may use WebSocket to receive the shared trust decision message from the system device 104 in real time or near real time without the need for repeated HTTP requests.

In some embodiments, once the verification status is a successful verification status, the mobile application may be configured to display one or more client user request elements that allow the client user to provide one or more new client user requests. In particular, the shared trust decision message may include the one or more available client user requests. In some embodiments, these client user requests may only become available once a successful verification status is achieved (e.g., shared trust is established with the agent user). A client user request element may allow the client user to interact (e.g., select, type, speak, click, and/or the like) with it to authorize apparatus 300 to request the described client user request. In an instance in which the client user interacts with a client user request element, an indication of the client user request may be provided to the agent device such that the agent user is made aware of the client user request and may facilitate appropriate processes and/or operations. The indication of a client user request may be provided using any suitable means, such as by using HTTP protocols and/or specific APIs.

In some embodiments, the shared trust decision message may further include agent information. The agent information may describe information regarding the agent user. For example, the agent information may include an agent name, department, phone number, email, branch location, picture, live video, and/or the like. The mobile application may be configured to display the agent information. In some embodiments, the agent information may be displayed once a successful verification status is achieved (e.g., shared trust is established with the agent user).

In some embodiments, once a successful verification status is achieved, a revocation element may be displayed in the mobile application. The revocation element may allow the client user to interact (e.g., select, type, speak, click, and/or the like) with it to revoke authorization of an agent user to proceed with one or more client user requests. In an instance in which the client user interacts with the revoke authorization element, an indication of a revocation may be provided to the agent device such that the agent user is made aware of the client user's revocation and may cancel or abandon pending client user requests. The indication of the revocation may be provided using any suitable means, such as by using HTTP protocols and/or specific APIs. In some embodiments, the verification status may be updated to a revoked verification status. As such, the client user may revoke his/her authorization to proceed with particular client user requests even after a successful verification status has been achieved.

Turning to FIG. 27, a GUI is provided that illustrates an example user interface of a mobile application where a current communication has been successfully verified. The GUI shown in FIG. 27 may be displayed to a user by the apparatus 300. As shown in FIG. 27, the mobile application may display a verification indicium 2701 indicative of the verification status of the current communication. Additionally, the mobile application may display a revocation element 2702 that the user may interact with to revoke authorization for an agent user to proceed with a client user request. The mobile application may additionally display agent information 2703 regarding the agent user the client user is currently connected with. The mobile application may further display one or more client user request elements 2704 that allow the client users to provide one or more new client user requests.

Agent Device Operations

Turning to FIGS. 15-18, example flowcharts are illustrated that contain example operations implemented by example embodiments described herein. The operations illustrated in FIGS. 15-18 may, for example, be performed by an agent device 108, which may in turn be embodied by an apparatus 400, which is shown and described in connection with FIG. 4. To perform the operations described below, the apparatus 400 may utilize one or more of processor 402, memory 404, communications hardware 406, authentication circuitry 410, visualization circuitry 412, and/or any combination thereof.

Figure 15:
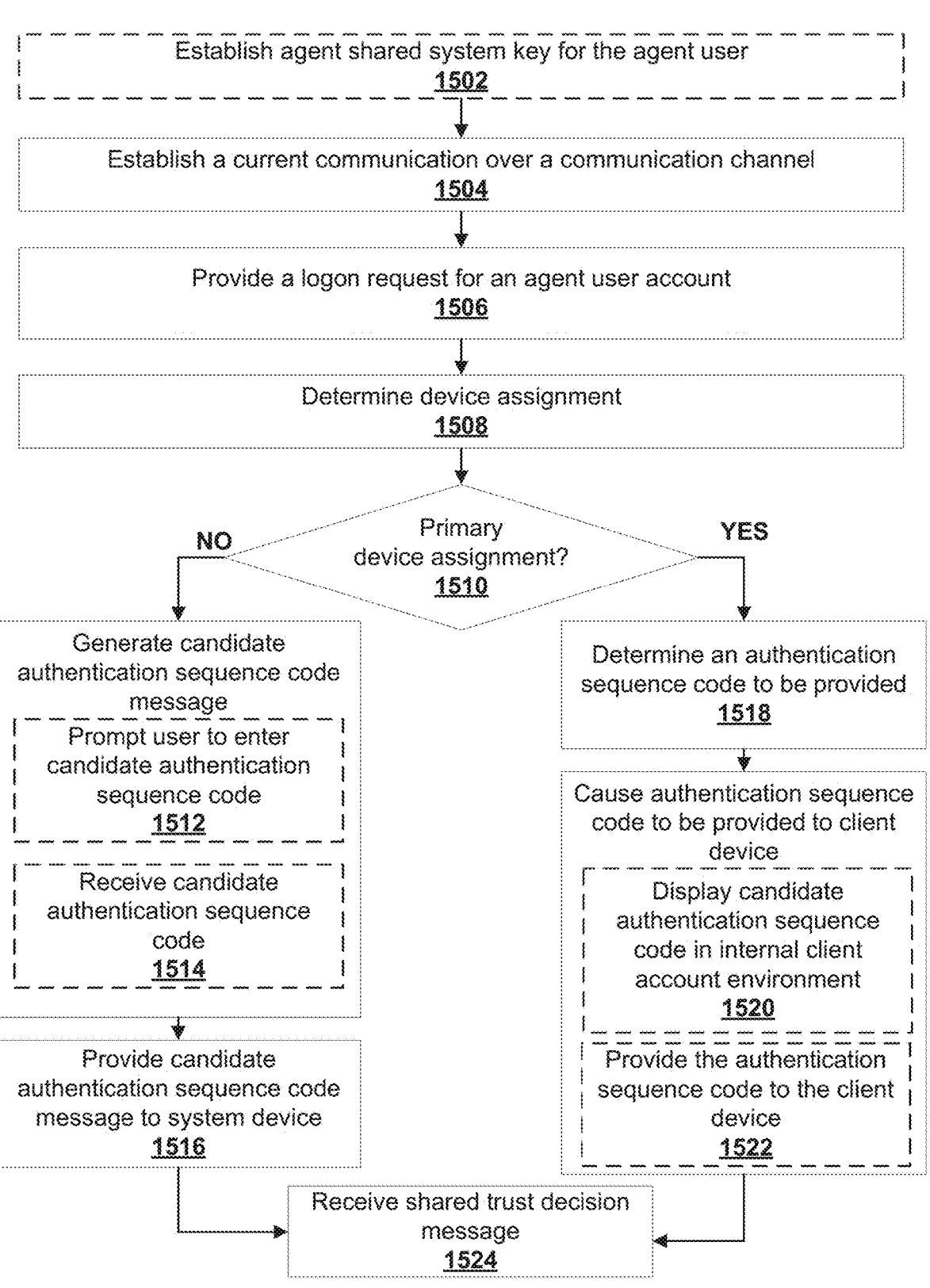
FIG. 15 illustrates an example flowchart for establishing shared trust with a client user for a current communication using an agent device, in accordance with some example embodiments described herein.

Turning now to FIG. 15, example operations are shown for establishing shared trust with a client user for a current communication.

Optionally, as shown by operation 1502, the apparatus 400 includes means, such as processor 402, memory 404, communications hardware 406, authentication circuitry 410, or the like, for establishing an agent shared system key for an agent user. An agent user may be a user associated with apparatus 400. In some embodiments, the agent user may be a user who is an authorized user associated with the shared trust verification system 102. An agent user account, which may include information about the agent user (e.g., name, email, title, role, department, and/or the like) and may be stored and maintained in an associated memory (e.g., memory 404 or another data repository). The agent user account may further be associated with an agent user identifier (e.g., a username, email, employee number, and/or the like) and agent user credentials (e.g., a password, biometric data, personal identification number, and/or the like).

The agent user profile may also include a set of permissions that allow the agent user to access certain data or information within the shared trust verification system 102 that other unauthorized users would not be able to access. For example, a set of permissions associated with the agent user may allow the agent user to use agent device 108 to access client user information (e.g., client user account information) within an internal account environment, such as via trusted communications network 105.

In order for apparatus 400 to generate authentication sequence codes in an instance in which the apparatus 400 is the primary device, the authentication circuitry 410 must first establish an agent shared system key for the agent user. In some embodiments, the agent shared system key may be used as seed value for generating an authentication sequence code for the agent user. In some embodiments, the agent shared system key may be a cryptographic symmetric key. As described in further detail in FIG. 16, the authentication circuitry 410 may receive an agent shared system key for the agent user from system device 104 and protect and store the agent shared system key for future use (e.g., during authentication sequence code generation).

Figure 16:
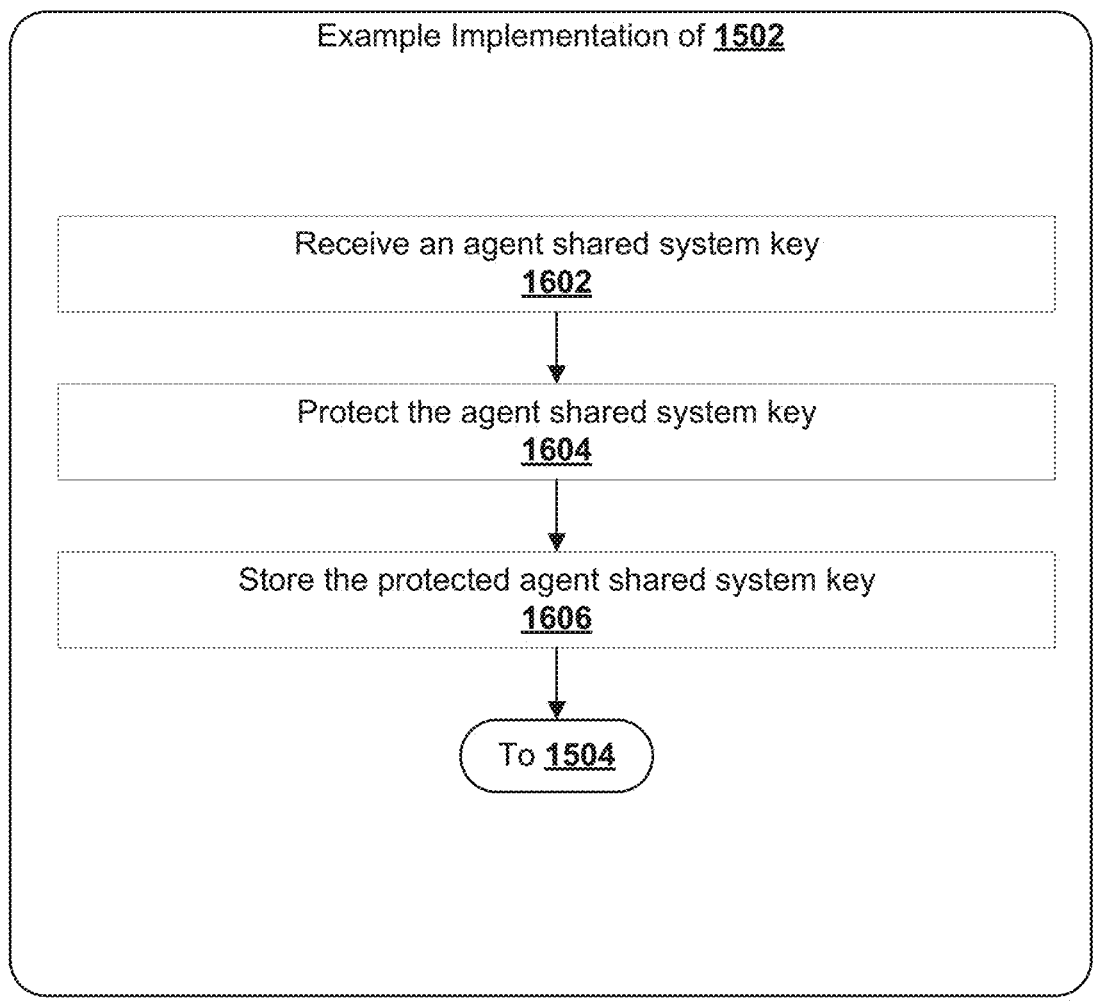
FIG. 16 illustrates an example flowchart for establishing a shared secret for an agent user using an agent device, in accordance with some example embodiments described herein.

In some embodiments, operation 1502 may be performed in accordance with the operations described by FIG. 16. Turning now to FIG. 16, example operations are shown for establishing a shared secret for an agent user.

As shown by operation 1602, the apparatus 400 includes means, such as processor 402, memory 404, communications hardware 406, or the like, for receiving an agent shared system key. In some embodiments, the communications hardware 406 may receive the agent shared system key from system device 104 by any suitable means. For example, the communications hardware 406 may use cryptographic exchange protocols (e.g., DH or ECDH), a public key infrastructure, a SSL/TSL protocol, secure communication protocols (e.g., SSH or IPSec), and/or the like to receive the agent shared system key from system device 104. In some embodiments, the communications hardware 306 may download the agent shared system key from a removable hardware configured with the agent shared system key. In some embodiments, the communications hardware 406 may capture visual indicium (e.g., a QR code) displayed on another agent device and/or monitor associated with the agent user and use the visual indicium to extract the agent shared system key.

As shown by operation 1604, the apparatus 400 includes means, such as processor 402, memory 404, communications hardware 406, authentication circuitry 410 or the like, for protecting an agent shared system key. In some embodiments, the authentication circuitry 410 may protect the client shared system key using any suitable method, such as by encrypting the agent shared system key using a symmetric encryption algorithm (e.g., an AES algorithm, a DES algorithm, a Blowfish algorithm, or a Rivest Cipher algorithm, such as RC4, RC5, or RC6) or an asymmetric encryption algorithm (e.g., an RSA algorithm).

As shown by operation 1606, the apparatus 400 includes means, such as processor 402, memory 404, communications hardware 406, authentication circuitry 410 or the like, for storing an agent shared system key. The authentication circuitry 410 may store the agent shared system key in a secure manner. For example, the authentication circuitry 410 may store the agent shared system key within a HSM or cloudHSM. As another example, the authentication circuitry 410 may store the agent shared system key in a dedicated key management system or secure key vault. As another example, the authentication circuitry 410 may store the agent shared system key within an associated database or memory, such as memory 404. The authentication circuitry 410 may further link the agent shared system key to the agent user account. That is, the authentication circuitry 410 may require that an agent user identifier and agent user credentials be provided and successfully verified prior to allowing access to the stored agent shared system key. This ensures that the correct agent shared system key for the particular agent user account is used when generating an authentication sequence when apparatus 400 is assigned as the primary device.

Returning to FIG. 15, as shown by operation 1504, the apparatus 400 includes means, such as processor 402, memory 404, communications hardware 406, or the like, for establishing a current communication over a communication channel with a client user. A communication channel may be any pathway or medium through which the client user and agent user communicate. For example, a communication channel may be a voice communication channel (e.g., phone calls), a messaging platform (e.g., online or mobile application chat center), text-based messaging (e.g., SMS texts), and/or the like. The communication channel need not be the mobile application for client device 106 or the internal account environment of apparatus 400. Additionally, in some embodiments, the current communication need not be established using apparatus 400 and a different agent device (e.g., agent device 108N) may be used to establish the current communication over the communication channel.

As described in operation 1004 of FIG. 10, the current communication over the communication channel may be initiated by either the client user or the agent user. In some embodiments, the current communication may be initiated in response to an agent initiated communication. For example, the agent user may call the client user to inquire whether the client user would prefer to modify an existing client user account. As another example, suspicious activity may be determined within the client user account may be determined by system device 104 and system device 104 may provide communications hardware 406 with this suspicious activity indication. This may prompt the agent user to call the client user to determine whether the suspicious activity on the client user account is fraudulent or not.

As shown by operation 1506, the apparatus 400 includes means, such as processor 402, memory 404, communications hardware 406, visualization circuitry 412, or the like, for providing a logon request for the agent user account. In some embodiments, the logon request may be a request to access an agent user account within an internal account environment. An internal account environment may refer to a digital platform developed by a company or institution that manages and/or maintains a client user account and further, is associated with the agent user (e.g., an employer of the agent user). The internal account environment may allow agent users to view certain client user accounts authorized by the set of permission associated with the agent user account. In order to access the internal account environment, an agent user may first need to provide a logon request, which requires his/her agent user identifier (e.g., a username, email, employee number, and/or the like) and agent user credentials (e.g., a password, biometric data, personal identification number, and/or the like). An agent user may input this information into the internal account environment login screen to create a logon request and communications hardware 406 may be used to provide the logon request that includes the agent user identifier and agent user credentials, to system device 104. In some embodiments, the logon request follows an HTTP/HTTPS protocol (e.g., an HTTP request). The communications hardware 406 may receive an indication of whether the logon request was successfully authenticated (e.g., via an HTTP response) and in an instance in which the logon request was successfully authenticated, may receive data or content for the agent user account. Thus, visualization circuitry 412 may process the received content to cause rendering or display of the content within the internal account environment.

In some embodiments, the agent user may provide a logon request to system device 104 before the system device 104 has determined the current communication and/or before the current communication has been established. In such an instance, the communications hardware 406 may provide an HTTP request to receive the verification status from system device 104. Alternatively, the system device 104 may provide a push notification to the communications hardware 306 for the internal account environment such that the verification status is received via the push notification. In some embodiments, the communications hardware 406 may use specific APIs, such as RESTful APIs or WebSocket APIs to receive the verification status from system device 104. In some embodiments, the communications hardware 406 may use WebSocket to receive the verification status from the system device 104 in real time or near real time without the need for repeated HTTP requests.

In some embodiments, the verification status includes a verification indicium in a standardized format (e.g., JSON, XML, HTML, an image, and/or the like). The visualization circuitry 412 may cause the verification indicium to be displayed in the internal account environment. As described above in operation 1006, the verification indicium may a graphical representation of the verification status where the verification status is indicated by a particular shape (e.g., an 'x', a checkmark, a thumbs up, a thumbs down, and/or the like) and/or color (e.g., red, green, or yellow) that depicts a representation of the verification status and may further include text that is indicative of the verification status.

As shown by operation 1508, the apparatus 400 includes means, such as processor 402, memory 404, communications hardware 406, authentication circuitry 410, or the like, for determining a device assignment. The communications hardware 406 may receive a device assignment from the system device 104 and may determine the device assignment (e.g., a primary device or a recipient device) for apparatus 400 based on this received device assignment. In some embodiments, the device assignment may be received in a device assignment message from the system device 104. In some embodiments, the device assignment may be received in either a prompt to determine an authentication sequence code in an instance in which apparatus 400 is assigned as the primary device or a prompt to provide the candidate authentication sequence code in an instance in which apparatus 400 is assigned as the recipient device. The authentication circuitry 410 may process a received prompt and/or device assignment message to determine a device assignment for the apparatus 400.

As shown by operation 1510, the apparatus 400 includes means, such as processor 402, memory 404, communications hardware 406, authentication circuitry 410, or the like, for determining apparatus 400 was assigned as the primary device. The authentication circuitry 410 may determine whether the received prompt and/or device assignment message assigned apparatus 400 as the primary device.

In an instance in which apparatus 400 was not assigned to be the primary device (e.g., assigned as the recipient device), the process proceeds to either operation 1512 or 1514. Either operation 1512 or 1514 may be used to generate a candidate authentication sequence code message. In some embodiments, the prompt and/or device assignment message received in operation 1508 may further include instructions on how to generate a candidate authentication sequence code message. In particular, the instructions may indicate the agent user will be required interact with the client user to obtain a candidate authentication sequence code and input the candidate authentication sequence code into an internal account environment, in which case the process may proceed to operation 1512. Alternatively, the instructions may indicate the agent user will be required to simply authorize a provision of the candidate authentication sequence code to a system device 104 using an authorization element within the internal account environment, in which case the process may proceed to operation 1514. In some embodiments, the instructions may indicate the agent user will be required interact with the client user to and either verify or reject the candidate authentication sequence code based on interaction with the client user, in which case the process may also proceed to operation 1514. In some embodiments, the prompt may further include device information for system device 104 such that communications hardware 406 may determine where to provide the candidate authentication sequence code.

As shown by operation 1512, the apparatus 400 includes means, such as processor 402, memory 404, communications hardware 406, authentication circuitry 410, visualization circuitry 412, or the like, for prompting a user to enter a candidate authentication sequence code. In some embodiments, the visualization circuitry 412 may be configured to render an input element in the internal account environment. The input element may allow the agent user to interact (e.g., select, type, speak, click, and/or the like) with it to provide the candidate authentication sequence code. Here, the agent user may obtain the candidate authentication sequence code from the client user. For example, the client user may verbally describe the authentication sequence code if the communication channel is a phone call. As another example, the client user may provide a message describing the authentication sequence code if the communication channel is a text-based platform. The agent user may then be required to input a candidate authentication message into the internal account environment. This explicit input of the candidate authentication sequence code requires the agent user to interact inside the internal account environment and thus, serves as proof that the agent user was successfully authenticated in order to be able to access the internal account environment.

Alternatively, as shown by operation 1514, the apparatus 400 includes means, such as processor 402, memory 404, communications hardware 406, or the like, for receiving a candidate authentication sequence code. In some embodiments, the visualization circuitry 412 may be configured to render an authorization element in the internal account environment. The authorization element may allow the agent user to interact (e.g., select, type, speak, click, and/or the like) with it to authorize apparatus 400 to provide the candidate authentication sequence code. The rejection element may allow the agent user to interact (e.g., select, type, speak, click, and/or the like) with it to cause apparatus 400 to provide a rejection message instead of the candidate authentication sequence code to system device 104. The rejection message may automatically cause the system device 104 to determine a failed verification status for the current communication.

In some embodiments, the communications hardware 406 may receive the candidate authentication sequence code from the client device 106. The visualization circuitry 410 may render an authorization element and a rejection element in the mobile application. The authorization element may allow the agent user to interact (e.g., select, type, speak, click, and/or the like) with it to authorize apparatus 400 to provide the candidate authentication sequence code. Here, No direct exchange of the authentication sequence code is needed between the client user and agent user. Rather, the communications hardware 406 may receive the candidate authentication sequence code from the client device 106 and may only need the agent user to authorize apparatus 400 to provide the candidate authentication sequence code. Here, the system device 104 may perform the one or more verification operations using the candidate authentication sequence code. However, the explicit authorization may serve as proof that the agent user was authenticated and therefore able to access the agent user account within the internal account environment and further.

In some embodiments, the received candidate authentication sequence may be received from the system device 104. The visualization circuitry 412 may be configured to display the received candidate authentication sequence code in the internal account environment. The client device 106 may be configured to display the authentication sequence code to the client user, who may then read the authentication sequence code displayed via the client device 106. The agent user may compare the authentication sequence code provided by the client user to the displayed candidate authentication sequence code to manually determine whether the codes match. In an instance the agent user determines the codes match, the agent user may interact with the authorization element to confirm the codes match. Alternatively, in an instance the agent user determines the codes do not match, the agent user may interact with the rejection element to reject the candidate authentication sequence code. Here, the agent user may determine whether the codes match instead of system device 104, as described above In either example, as shown by operation 1516, the apparatus 400 includes means, such as processor 402, memory 404, communications hardware 406, or the like, for providing the candidate authentication sequence code to the system device. Once the candidate authentication sequence code has been determined, either by operation 1512 or 1514, the communications hardware 406 may provide the candidate authentication sequence code to system device 104. The candidate authentication sequence code message may include the candidate authentication sequence code entered by the agent user or received from the client device 106. Alternatively, the candidate authentication sequence code message may include an indication of whether the agent user verified the candidate sequence code or rejected the candidate sequence code.

In an instance in which apparatus 400 was assigned to be the primary device, the process proceeds to operation 1518. As shown by operation 1518, the apparatus 400 includes means, such as processor 402, memory 404, communications hardware 406, authentication circuitry 410, or the like, for determining an authentication sequence code to be provided to a client device. In an instance in which apparatus 400 is assigned as the primary device, authentication circuitry 410 may be required to determine the authentication sequence code to be provided to client device 106. In some embodiments, the prompt and/or device assignment message received in operation 1508 may further include instructions on how to determine an authentication sequence code. In some embodiments, the instructions may indicate the authentication circuitry 410 may receive an authentication sequence code from system device 104 and should use the received authentication sequence code to determine the authentication sequence. Alternatively, the instructions may indicate the authentication circuitry 410 should generate the authentication sequence code. In some embodiments, the prompt may further include device information for client device 106 such that communications hardware 406 may determine where to provide the authentication sequence code (if needed).

Figure 17:
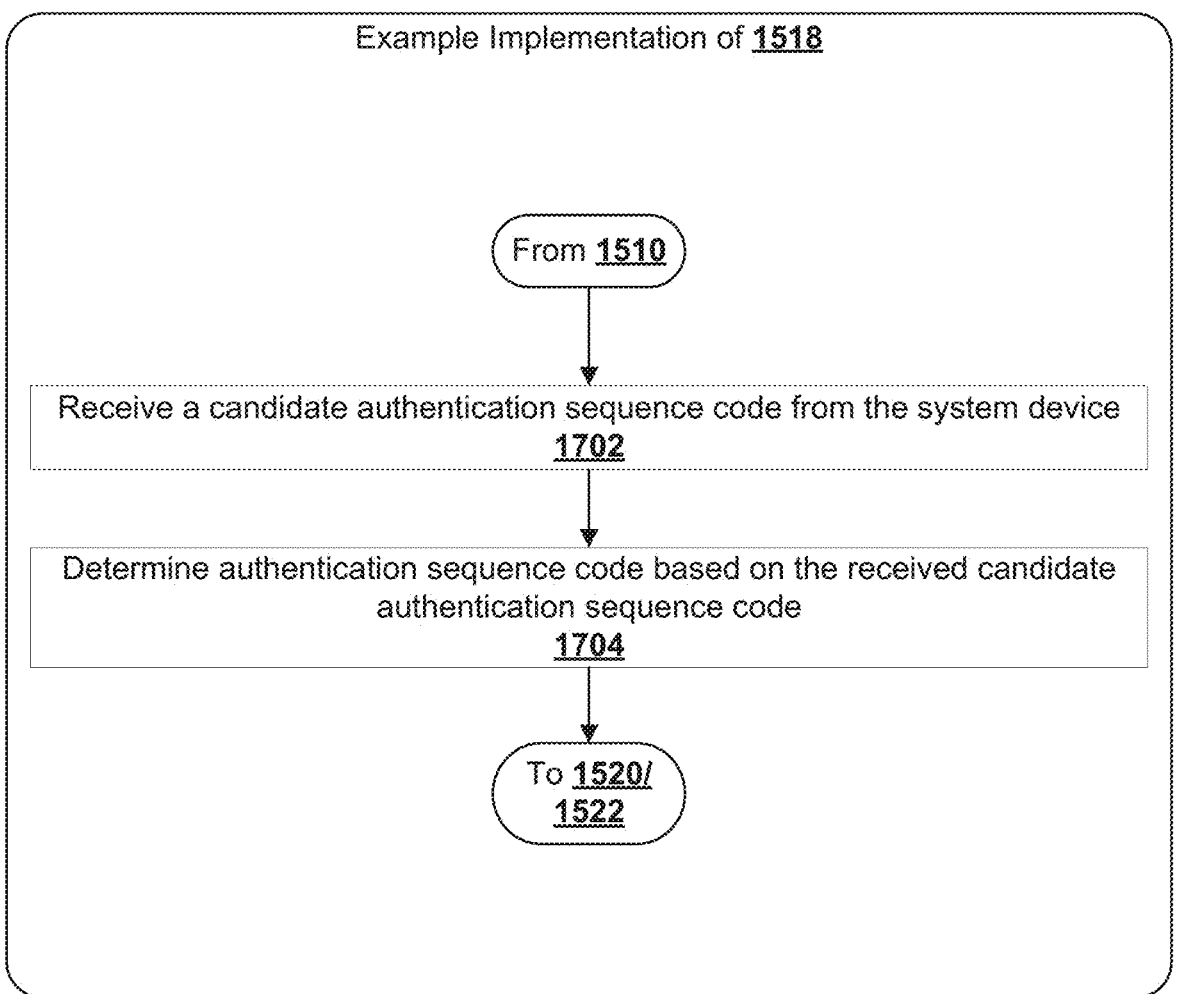
FIG. 17 illustrates an example flowchart for determining an authentication sequence code based on a received authentication sequence code using an agent device, in accordance with some example embodiments described herein.
Figure 18:
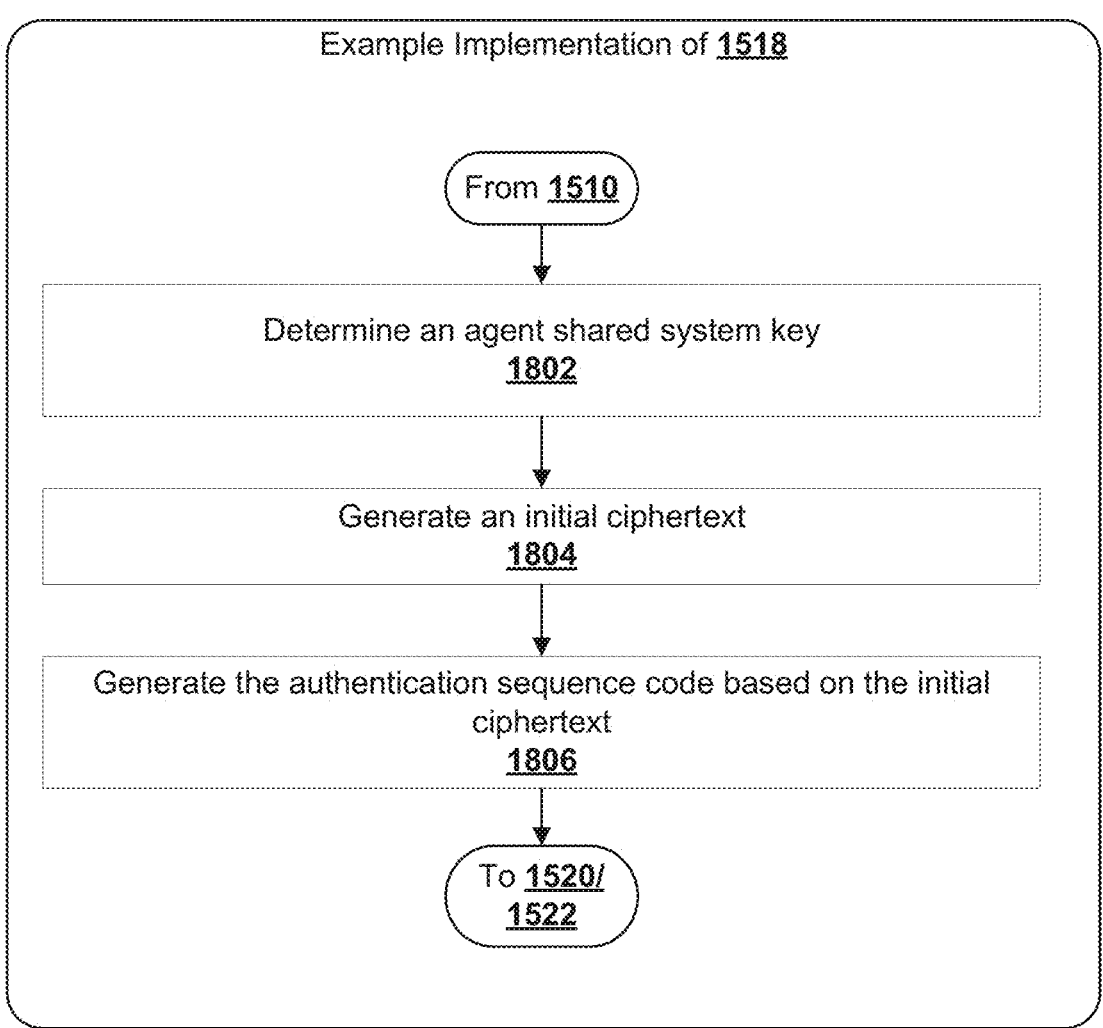
FIG. 18 illustrates an example flowchart for determining an authentication sequence code by generating the authentication sequence code using an agent device, in accordance with some example embodiments described herein.

In some embodiments, operation 1518 may be performed in accordance with the operations described by FIG. 17 or 18.

Turning first to FIG. 17, example operations are shown for determining an authentication sequence based on a received authentication sequence code. As shown by operation 1702, the apparatus 400 includes means, such as processor 402, memory 404, communications hardware 406, or the like, for receiving an authentication sequence code from the system device. As described above, the communications hardware 406 may receive an authentication sequence code from the system device 104.

As shown by operation 1704, the apparatus 400 includes means, such as processor 402, memory 404, communications hardware 406, authentication circuitry 410, or the like, for determining the authentication sequence code based on the received authentication sequence code. In some embodiments, the authentication circuitry 410 may directly determine the authentication sequence code based on the received authentication sequence code received in operation 1702. That is, the authentication sequence code determined by authentication circuitry 410 may be the authentication sequence code received from system device 104. To note, the authentication circuitry 410 may not need to verify the received authentication sequence code as described in FIG. 13 for client device, as the communications hardware 406 may be configured to receive the authentication sequence code from the system device over trusted communications network 105. As described above, trusted communications network 105 is a restricted or private communication network, such as an intranet, which only certain authorized devices (e.g., system device 104 and agent device 108) are authorized to use for communications. Thus, the authentication circuitry 410 need not verify receive authentication sequence codes. However, in some embodiments, the authentication circuitry 410 may perform verification operations in a substantially similar manner using agent shared system key as client device 106 as described in FIG. 13.

Turning next to FIG. 18, example operations are shown for determining an authentication sequence by generating the authentication sequence code. As shown by operation 1802, the apparatus 400 includes means, such as processor 402, memory 404, communications hardware 406, authentication circuitry 410 or the like, for determining an agent shared system key. As described above in operation 1502, the authentication circuitry 410 may establish an agent shared system key for the agent user. Thus, authentication circuitry 410 may access the agent shared system key linked to agent user account. In some embodiments, the agent shared system key may be used as a seed value for generating the authentication sequence code.

As shown by operation 1804, the apparatus 400 includes means, such as processor 402, memory 404, communications hardware 406, authentication circuitry 410, or the like, for generating an initial ciphertext. In some embodiments, the authentication circuitry 410 may generate the initial ciphertext using a cryptographic hash function and using the agent shared system key. In some embodiments, the authentication circuitry 410 may use a HOTP algorithm, a TOTP algorithm, and/or other suitable OTP generation algorithms and/or extensions to generate the initial ciphertext. In particular, the authentication circuitry 410 may determine and provide a value of a counter, as done in HOTP, or a time-based counter, as done in TOTP, and the agent shared system key to a cryptographic hash function to generate the initial ciphertext. In some embodiments, the cryptographic hash function may be any suitable one-way cryptographic hash function, such as secure hash algorithm (e.g., SHA-1, SHA-2, SHA-3), message digest algorithm (e.g., MD2, MD4, MD5, MD6), and/or the like. In some embodiments, the initial ciphertext value output may have a size of 128-bit, 224-bit, 256-bit, 384-bit, or 512-bit.

As shown by operation 1806, the apparatus 400 includes means, such as processor 402, memory 404, communications hardware 406, authentication circuitry 410, or the like, for determining the authentication sequence code based on the initial ciphertext. The authentication circuitry 410 may then generate the authentication sequence code based on the initial ciphertext. In some embodiments, the authentication circuitry 410 may extract a portion of the digits from the initial ciphertext value and use these extracted digits as the authentication sequence code. For example, the authentication circuitry 410 may extract the last 6-8 digits of the initial ciphertext value and use these digits to generate the authentication sequence code. In some embodiments, the authentication circuitry 410 may generate the authentication sequence code using the entire initial ciphertext such that the value of the authentication sequence code is the same as the value of the initial ciphertext. The authentication circuitry 410 may thereby determine the authentication sequence code based on the generated authentication sequence code.

That is, the authentication sequence code determined by authentication circuitry 410 may be the generated authentication sequence code.

Returning now to FIG. 15, the process may then proceed to either operation 1520 or 1522. Either operation 1520 or 1522 may be used to cause an authentication sequence code to be provided to a client device 106. In some embodiments, the prompt and/or device assignment message received in operation 1508 may further include instructions on how to provide the authentication sequence code to the client device 106. In particular, the instructions may indicate the client user will be required to obtain the authentication sequence code from an indication element in the internal account environment and interact with the client user to provide the authentication sequence code, in which case the process may proceed to operation 1520. Alternatively, the instructions may indicate the agent user will be required to simply authorize a provision of the authentication sequence code to the client device 106 using an authorization element within the internal account environment, in which case the process may proceed to operation 1522.

As shown by operation 1520, the apparatus 400 includes means, such as processor 402, memory 404, communications hardware 406, visualization circuitry 412, or the like, for displaying the authentication sequence code in the internal account environment. In some embodiments, the visualization circuitry 412 may be configured to render an indication element in the internal account environment. The indication element may display the authentication sequence code to the agent user within the internal account environment. Here, the agent user may view the indication element to obtain the authentication sequence code and may provide the authentication sequence code to the client user. For example, the agent user may verbally describe the authentication sequence code if the communication channel is a phone call. As another example, the agent user may provide a message describing the authentication sequence code if the communication channel is a text-based platform. This requirement of providing the client user with the authentication sequence code may serves as proof that the agent user was authenticated and therefore able to access the internal account environment.

Alternatively, as shown by operation 1522, the apparatus 400 includes means, such as processor 402, memory 404, communications hardware 406, or the like, for providing the authentication sequence code to the client device. In some embodiments, the visualization circuitry 412 may be configured to render an authorization element in the internal account environment. The authorization element may allow the agent user to interact (e.g., select, type, speak, click, and/or the like) with it to authorize apparatus 400 to provide the authentication sequence code to the client device 106. Here, no direct exchange of the authentication sequence code is needed between the client user and agent user. Rather, the communications hardware 406 may provide the authentication sequence code to the client device 106 and may only need the agent user to authorize apparatus 400 to provide the authentication sequence code. This explicit authorization may serve as proof that the agent user was authenticated and therefore able to access the internal account environment. Additionally, in some embodiments, the visualization circuitry 312 may be configured to render a rejection element in the internal account environment. The rejection element may allow the agent user to interact (e.g., select, type, speak, click, and/or the like) with it to prohibit apparatus 400 from providing the authentication sequence code. The agent user may thus be provided with a way to end the interaction should the client user not wish to continue.

After operations 1516 or 1522, the process may proceed to operation 1524. As shown by operation 1524, the apparatus 400 includes means, such as processor 402, memory 404, communications hardware 406, or the like, for receiving a shared trust decision message. The communications hardware 406 may receive the shared trust decision message from system device 104. The shared trust decision message may be indicative of the updated verification status for the current communication. In some embodiments, the shared trust decision message further includes updated verification indicium in a standardized format (e.g., JSON, XML, HTML, an image, and/or the like). The visualization circuitry 412 may cause the verification indicium to be displayed in the internal account environment. Thus, the agent user may view the updated verification status and/or verification indicium within the internal account environment to determine whether the client user identity has been verified. The agent user may thus make informed decisions and may prohibit the rendering of any services for the client user account until the current communication has been verified. Thus, this helps ensure that agent users maintain the integrity and security of client user accounts.

In some embodiments, the communications hardware 406 may receive the shared trust decision message as a push notification for the internal account environment from the system device 104. In some embodiments, the communications hardware 406 may use specific APIs, such as RESTful APIs or WebSocket APIs to receive the shared trust decision message from system device 104. In some embodiments, the communications hardware 406 may use WebSocket to receive the shared trust decision message from the system device 104 in real time or near real time without the need for repeated HTTP requests.

FIGS. 5-18 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

Figure 19A:
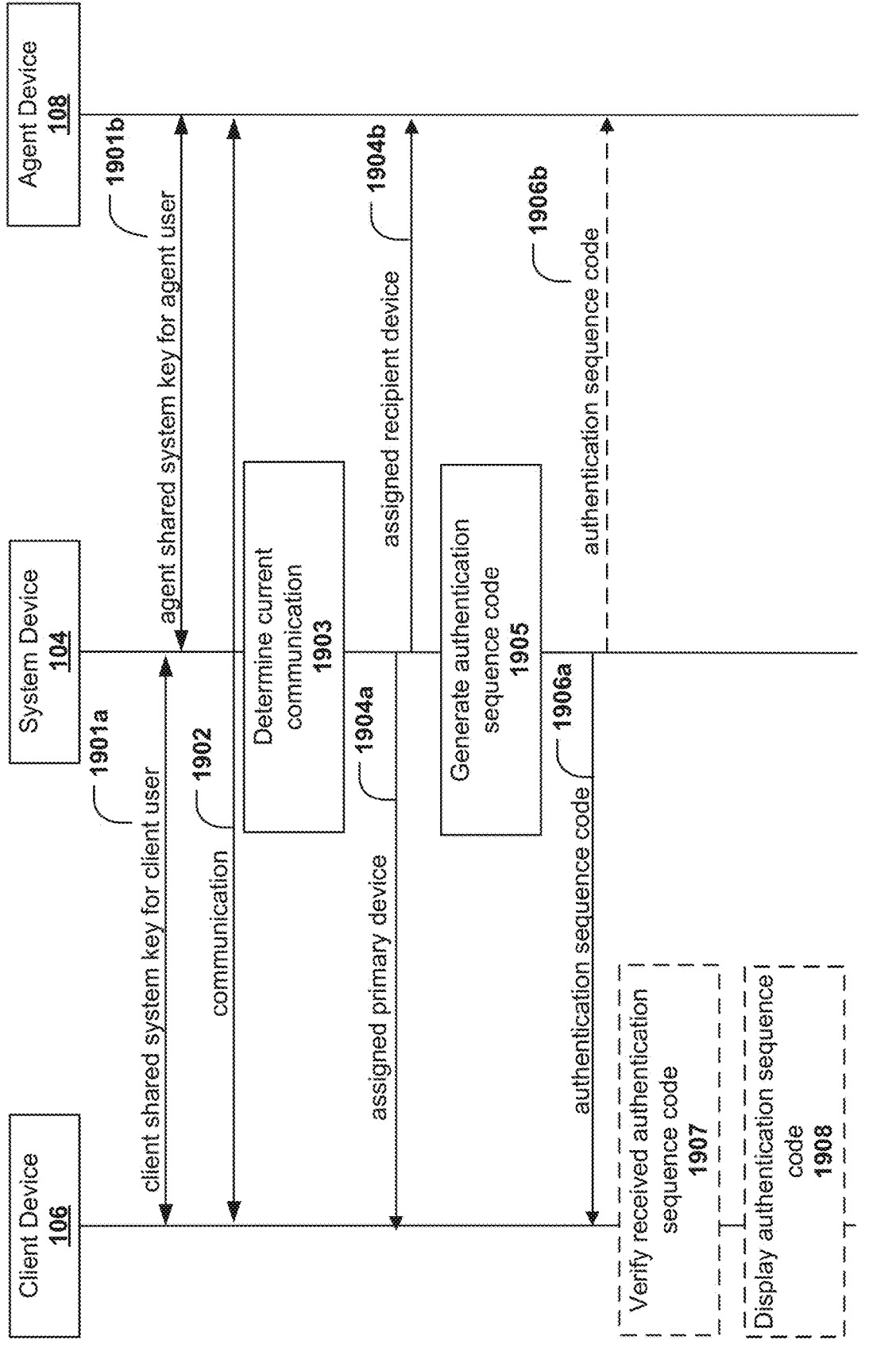
FIGS. 19A-19B illustrate a swim lane diagram with example operations that may be performed by components of the environment depicted in FIGS. 1A-1C in a first example scenario in which a system device generates the authentication sequence code and a client device serves as the primary device, in accordance with some example embodiments described herein.
Figure 19B:
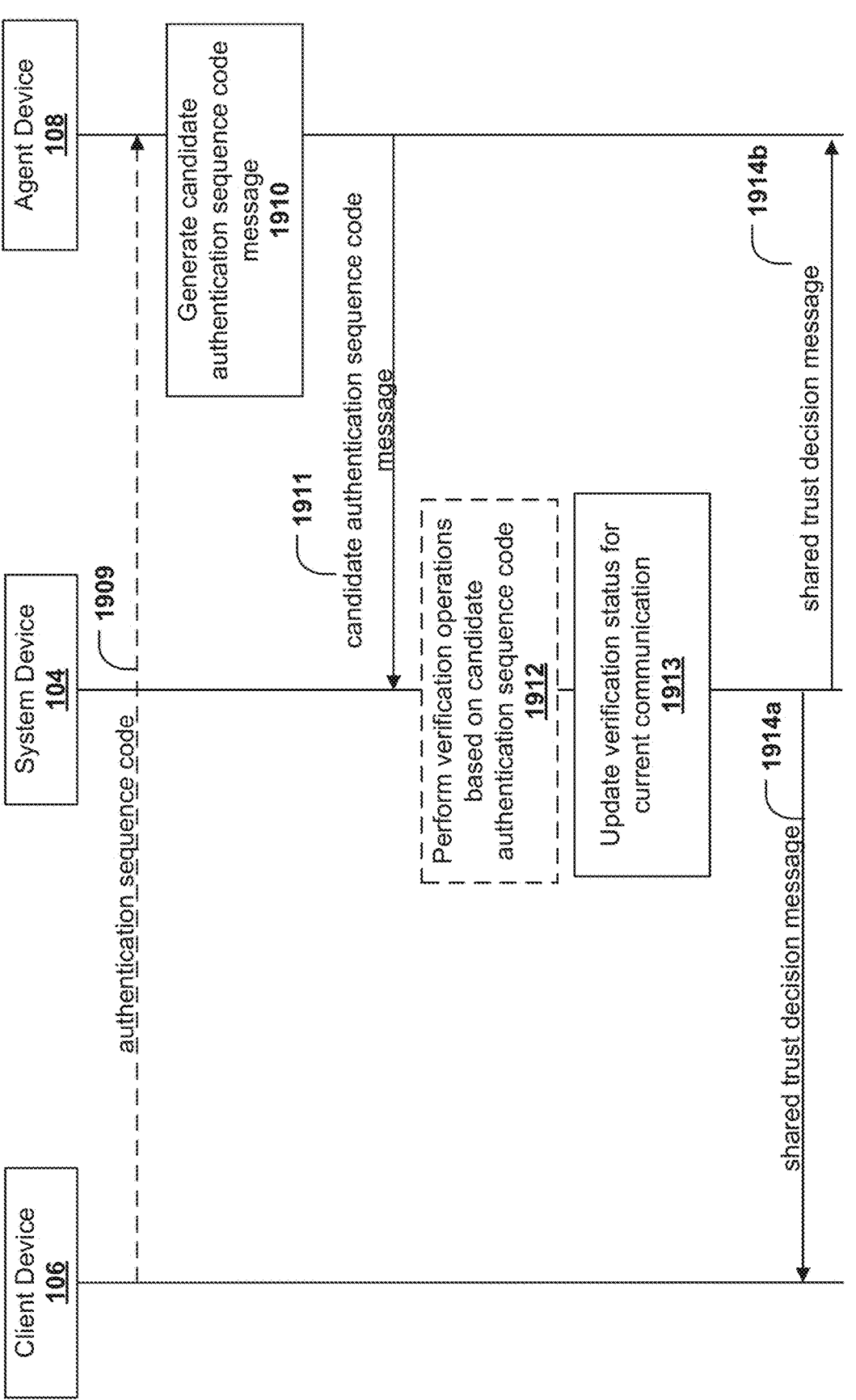

Example Scenario 1: System Device Generates
Authentication Sequence Code and Client Device
Serves as the Primary Device FIGS. 19A-19B show swim lane diagrams illustrating example operations (e.g., as described above in connection with FIGS. 5-18) performed by components of the environment depicted in FIGS. 1A-1C to produce various benefits of the implementations described herein. In particular, FIGS. 19A-19B illustrate example operations performed in an instance in which a system device 104 generates the authentication sequence code for the primary device and the client device 106 is assigned as the primary device. The operations shown in the swim lane diagram performed by client device 106 are shown along the line extending from the box labeled "Client Device 106," operations performed by a system device 104 are shown along the line extending from the box labeled "System Device 104," and operations performed by agent device 108 are shown along the line extending from the box labeled "Agent Device 108." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIGS. 19A-19B. Additionally, it will be appreciated that although communication is shown between client device 106 and agent device 108, as described above, this communication need not necessarily occur between the client device 106 or agent device 108 that is involved in the authentication process, and instead, may be another client device or agent device. In some embodiments, some of the operations described above in connection with FIGS. 5-18 may be modified or further amplified. Furthermore, in some embodiments, additional optional operations may be included. Modifications, amplifications, or additions to the operations above may be performed in any order and in any combination.

Turning first to FIG. 19A, at operation 1901a, the system device 104 and client device 106 establish a client shared system key for a client user. At operation 1901b, the system device 104 and agent device 108 establish an agent hared system key for an agent user. At operation 1902, client device 106 and agent device 108 establish communication over a communication channel. At operation 1903, the system device determines the current communication. At operation 1904a, the system device 104 assigns the client device 106 as the primary device and provides the client device 106 with an indication of its assignment as primary device. At operation 1904b, the system device 104 assigns the agent device 108 as the recipient device and provides the agent device 108 with an indication of its assignment as recipient device. At operation 1905, the system device 104 generates the authentication sequence code. At operation 1906a, the system device 104 provides the authentication sequence code to the client device. Optionally, at operation 1906b, the system device 104 provides the authentication sequence code to the agent device 108. Optionally, at operation 1907, the client device 106 may verify the received authentication sequence code. Optionally, at operation 1908, the client device 106 may display the authentication sequence code such that the client user may view the authentication sequence code. The client user may then audibly or otherwise provide this authentication sequence code to an agent user.

Turning now to FIG. 19B, alternatively, at operation 1909, the client device 106 may automatically provide the authentication sequence code to the agent device 108 without requiring the client user to explicitly provide this to an agent user. At operation 1910, the agent device 108 may generate the candidate authentication sequence code message. In an instance in which the client user had audibly or otherwise provided the authentication sequence code to the agent user, the agent device 108 may determine the candidate authentication sequence code from input from the agent user (e.g., a candidate authentication sequence code input by the agent user based on the interaction with the client user). Alternatively, the agent device 108 may automatically generate the candidate authentication sequence code message upon receipt of the authentication sequence code from the client device. Alternatively still, the agent device 108 may automatically determine the candidate authentication sequence message based on a client user input indicating whether the candidate authentication sequence message is verified or rejected by the client user. At operation 1911, the agent device 108 may provide the candidate authentication sequence code to the system device 104. At operation 1912, the system device 104 may perform verification operations based on the candidate authentication sequence code. At operation 1913, the system device 104 may update a verification status for the current communication. The verification status may be updated based on the result of the verification operations or the candidate authentication sequence code message. At operation 1914a, the system device 104 may provide a shared trust decision message to the client device 106 and at operation 1914b, the system device 104 may provide a shared trust decision message to the agent device 108. The shared trust decision message may be indicative of the updated verification status for the current communication.

Figure 20A:
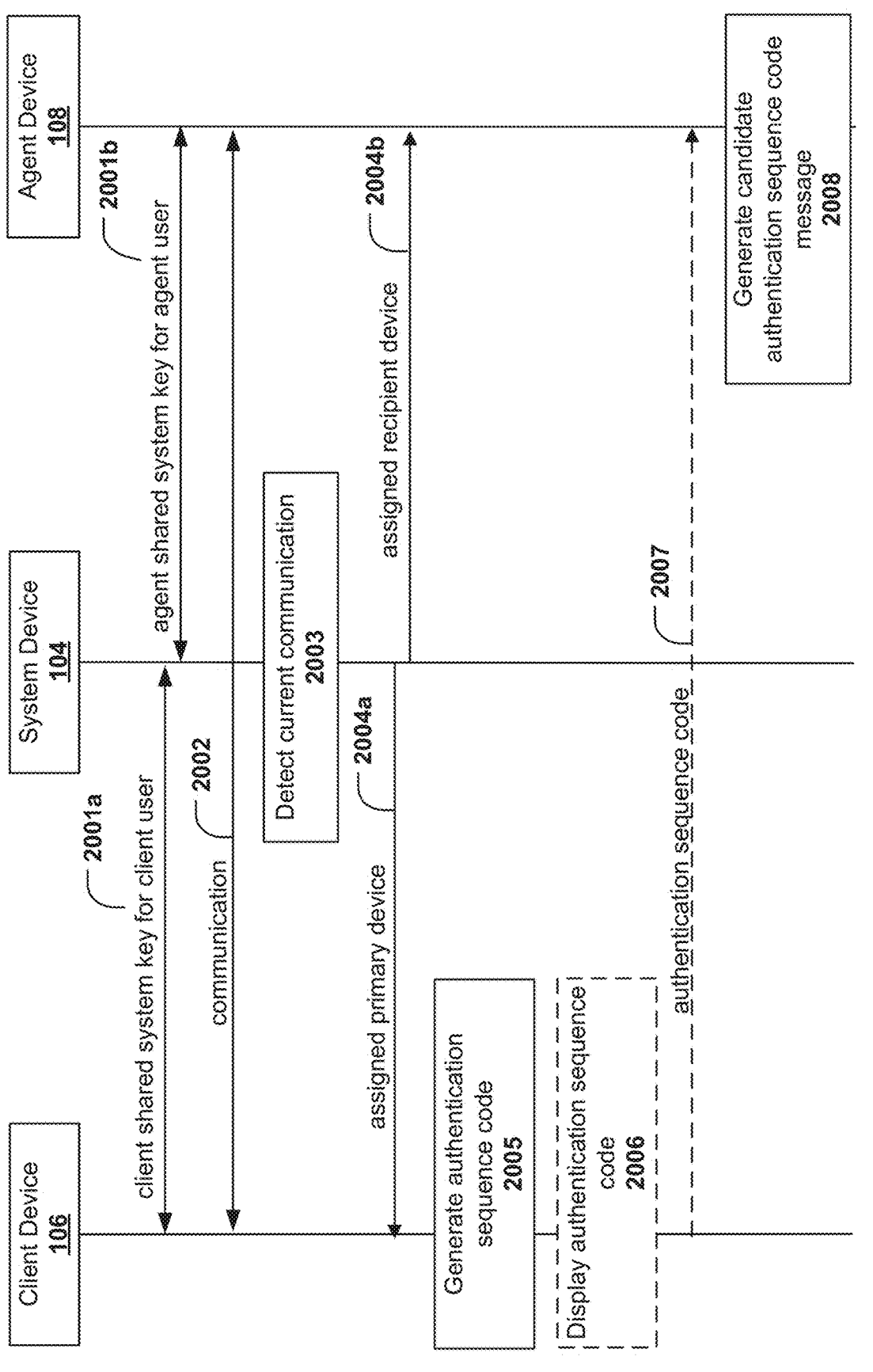
FIGS. 20A-20B illustrate a swim lane diagram with example operations that may be performed by components of the environment depicted in FIGS. 1A-1C in a second example scenario in which a system device generates the authentication sequence code and an agent device serves as the primary device, in accordance with some example embodiments described herein.
Figure 20B:
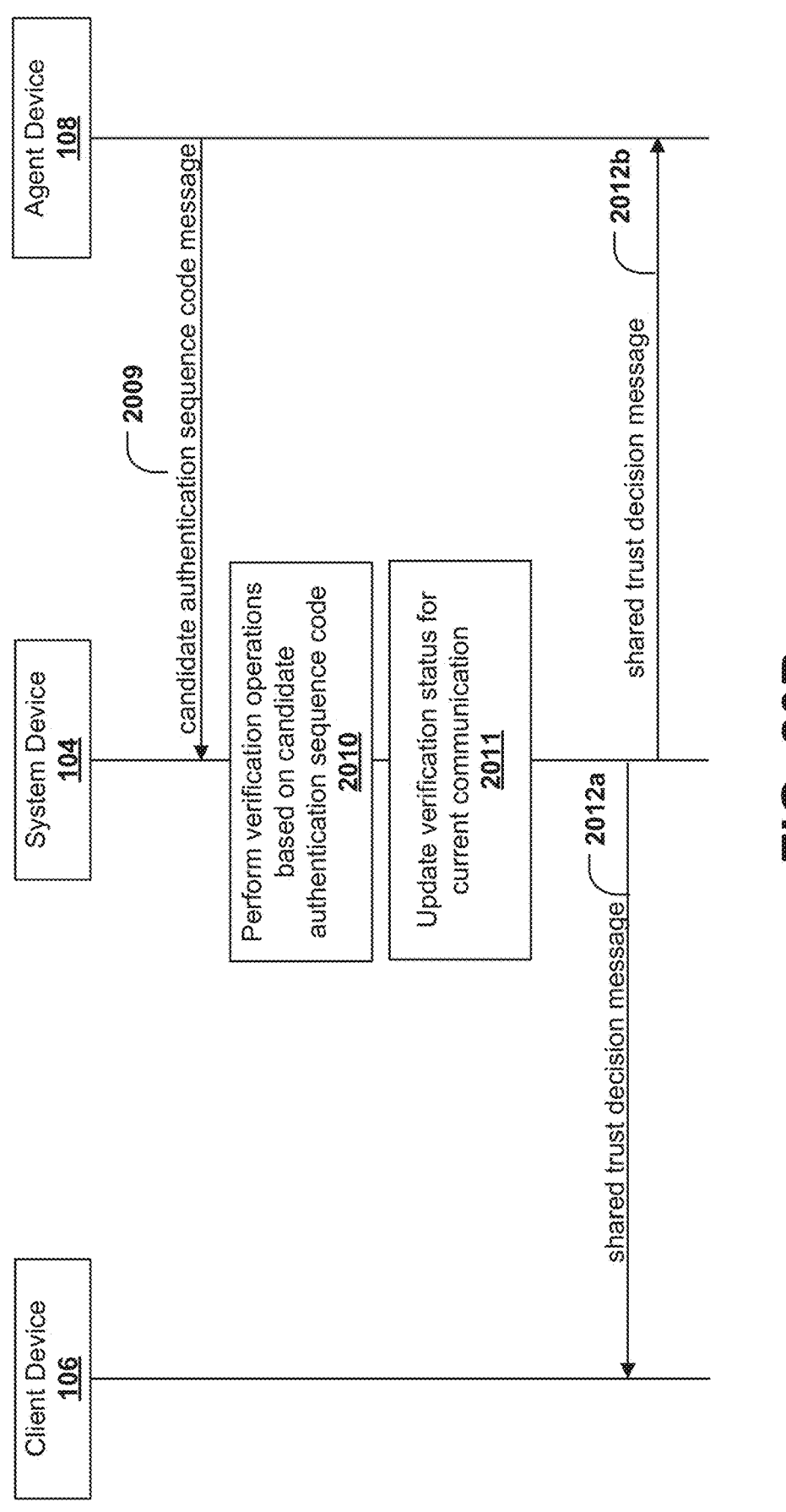

Example Scenario 2: Primary Device Generates
Authentication Sequence Code and Client Device
Serves as the Primary Device FIGS. 20A-20B show swim lane diagrams illustrating example operations (e.g., as described above in connection with FIGS. 5-18) performed by components of the environment depicted in FIGS. 1A-1C to produce various benefits of the implementations described herein. In particular, FIGS. 20A-20B illustrate example operations performed in an instance in which a primary device generates the authentication sequence code and the client device 106 is assigned as the primary device. The operations shown in the swim lane diagram performed by client device 106 are shown along the line extending from the box labeled "Client Device 106," operations performed by a system device 104 are shown along the line extending from the box labeled "System Device 104," and operations performed by agent device 108 are shown along the line extending from the box labeled "Agent Device 108." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIGS. 20A-20B. Additionally, it will be appreciated that although communication is shown between client device 106 and agent device 108, as described above, this communication need not necessarily occur between the client device 106 or agent device 108 that is involved in the authentication process, and instead, may be another client device or agent device. In some embodiments, some of the operations described above in connection with FIGS. 5-18 may be modified or further amplified. Furthermore, in some embodiments, additional optional operations may be included. Modifications, amplifications, or additions to the operations above may be performed in any order and in any combination.

Turning first to FIG. 20A, at operation 2001*a*, the system device 104 and client device 106 establish a client shared system key for a client user. At operation 2001*b*, the system device 104 and agent device 108 establish an agent hared system key for an agent user. At operation 2002, client device 106 and agent device 108 establish communication over a communication channel. At operation 2003, the system device determines the current communication. At operation 2004*a*, the system device 104 assigns the client device 106 as the primary device and provides the client device 106 with an indication of its assignment as primary device. At operation 2004*b*, the system device 104 assigns the agent device 108 as the recipient device and provides the agent device 108 with an indication of its assignment as recipient device. At operation 2005, the client device 106 generates the authentication sequence code. Optionally, at operation 2006, the client device 106 may display the authentication sequence code such that the client user may view the authentication sequence code. The client user may then audibly or otherwise provide this authentication sequence code to an agent user. Alternatively, at operation 2007, the client device 106 may automatically provide the authentication sequence code to the agent device 108 without requiring the client user to explicitly provide this to an agent user. At operation 2008, the agent device 108 may generate the candidate authentication sequence code message. In an instance in which the client user had audibly or otherwise provided the authentication sequence code to the agent user, the agent device 108 may generate the candidate authentication sequence code message from input from the agent user (e.g., a candidate authentication sequence code input by the agent user based on the interaction with the client user). Alternatively, the agent device 108 may automatically generate the candidate authentication sequence code message upon receipt of the authentication sequence code from the client device 106.

Turning now to FIG. 20B, at operation 2009, the agent device 108 may provide the candidate authentication sequence code message to the system device 104. At operation 2010, the system device 104 may perform verification operations based on the candidate authentication sequence code. At operation 2011, the system device 104 may update a verification status for the current communication. The verification status may be updated based on the result of the verification operations. At operation 2012*a*, the system device 104 may provide a shared trust decision message to the client device 106 and at operation 2012*b*, the system device 104 may provide a shared trust decision message to the agent device 108. The shared trust decision message may be indicative of the updated verification status for the current communication.

Figure 21A:
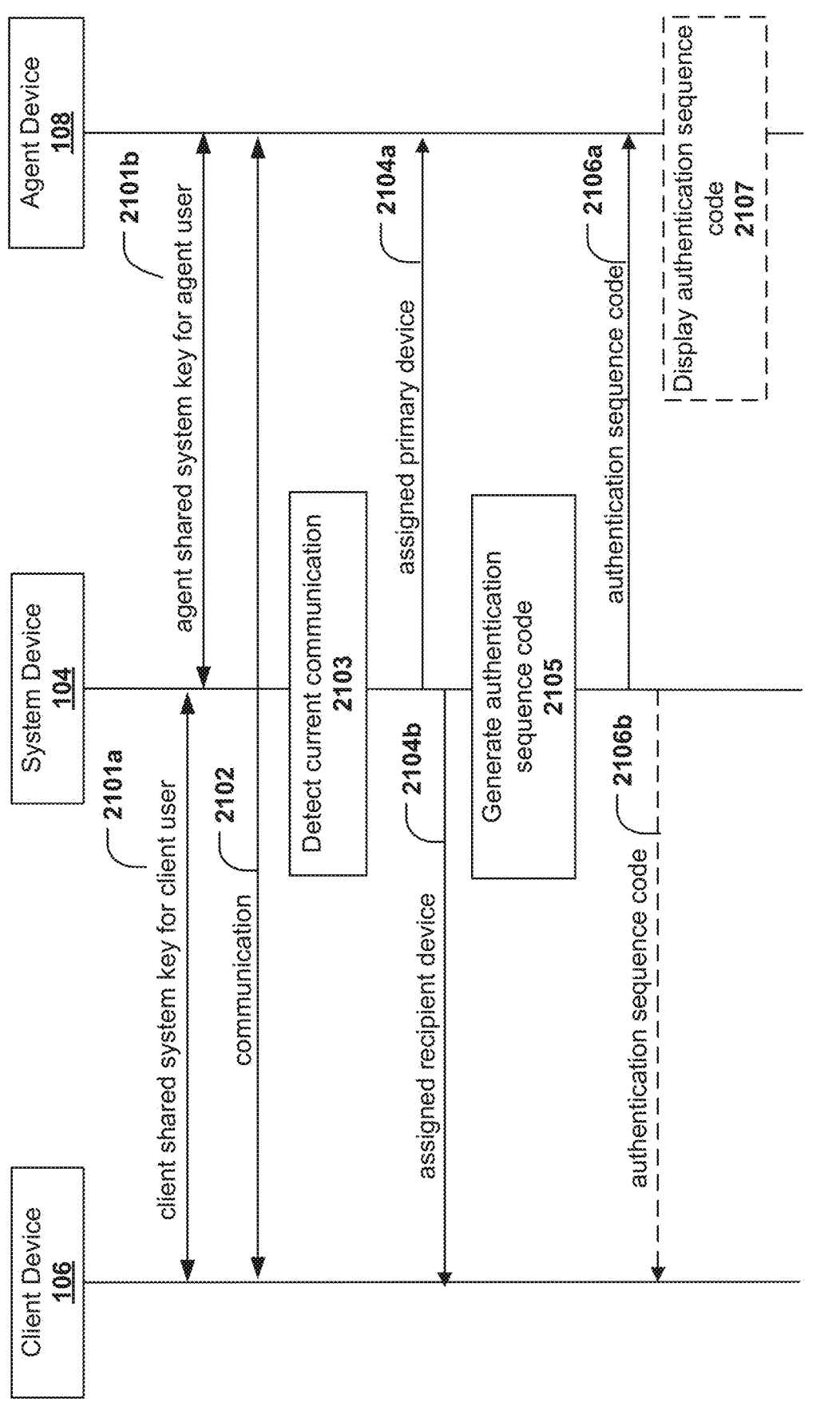
FIGS. 21A-21B illustrate a swim lane diagram with example operations that may be performed by components of the environment depicted in FIGS. 1A-1C in a third example scenario in which a primary device generates the authentication sequence code and a client device serves as the primary device, in accordance with some example embodiments described herein.
Figure 21B:
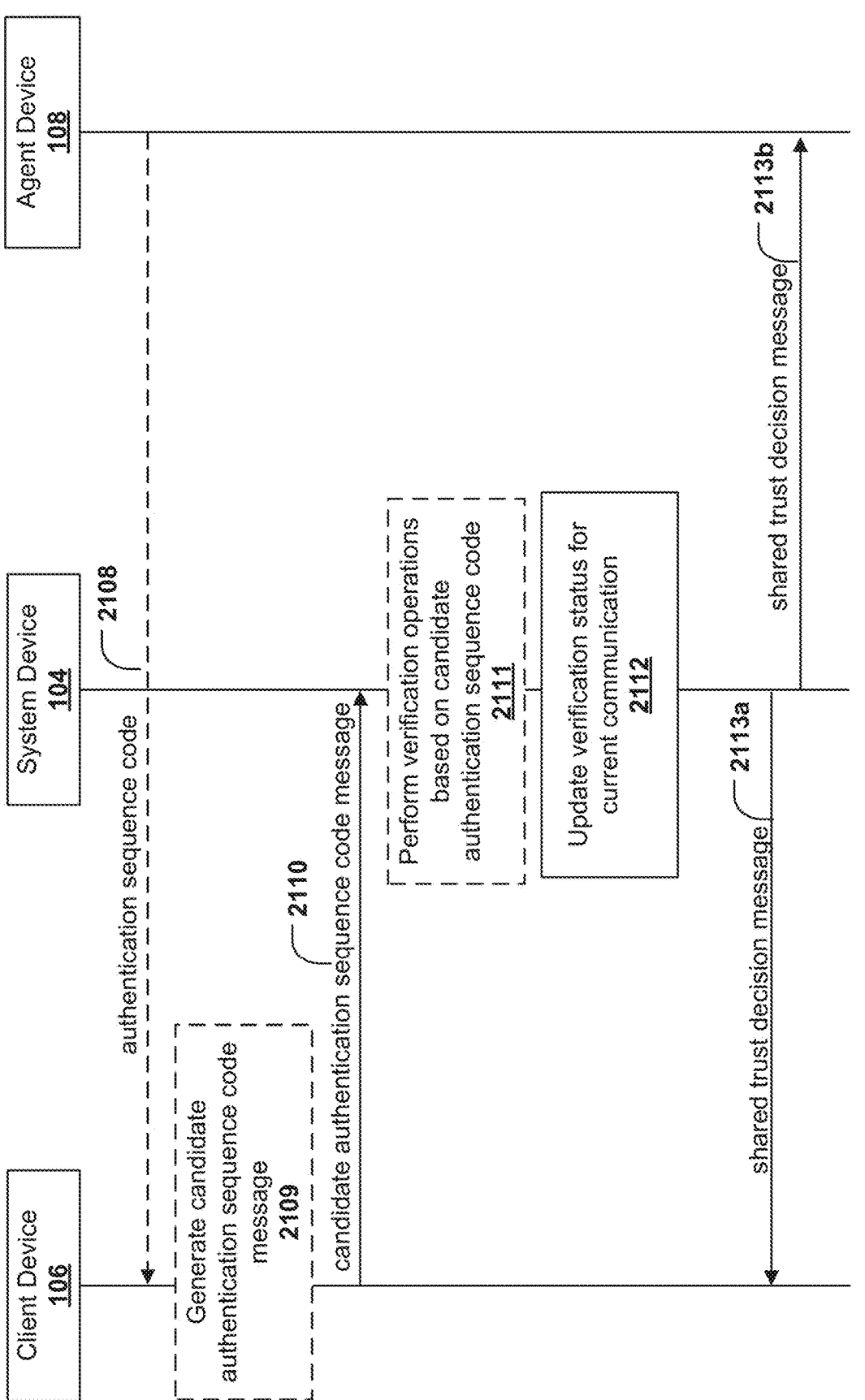

Example Scenario 3: System Device Generates Authentication Sequence Code and Agent Device Serves as the Primary Device FIGS. 21A-21B show swim lane diagrams illustrating example operations (e.g., as described above in connection with FIGS. 5-18) performed by components of the environment depicted in FIGS. 1A-1C to produce various benefits of the implementations described herein. In particular, FIGS. 21A-21B illustrate example operations performed in an instance in which a system device 104 generates the authentication sequence code for the primary device and the agent device 108 is assigned as the primary device. The operations shown in the swim lane diagram performed by client device 106 are shown along the line extending from the box labeled "Client Device 106," operations performed by a system device 104 are shown along the line extending from the box labeled "System Device 104," and operations performed by agent device 108 are shown along the line extending from the box labeled "Agent Device 108." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIGS. 21A-21B. Additionally, it will be appreciated that although communication is shown between client device 106 and agent device 108, as described above, this communication need not necessarily occur between the client device 106 or agent device 108 that is involved in the authentication process, and instead, may be another client device or agent device. In some embodiments, some of the operations described above in connection with FIGS. 5-18 may be modified or further amplified. Furthermore, in some embodiments, additional optional operations may be included. Modifications, amplifications, or additions to the operations above may be performed in any order and in any combination.

Turning first to FIG. 21A, at operation 2101*a*, the system device 104 and client device 106 establish a client shared system key for a client user. At operation 2101*b*, the system device 104 and agent device 108 establish an agent hared system key for an agent user. At operation 2102, client device 106 and agent device 108 establish communication over a communication channel. At operation 2103, the system device determines the current communication. At operation 2104*a*, the system device 104 assigns the agent device 108 as the primary device and provides the agent device 108 with an indication of its assignment as primary device. At operation 2104*b*, the system device 104 assigns the client device 106 as the recipient device and provides the client device 106 with an indication of its assignment as recipient device. At operation 2105, the system device 104 generates the authentication sequence code. At operation 2106*a*, the system device 104 provides the authentication sequence code to the agent device. Optionally, at operation 2106*b*, the system device 104 provides the authentication sequence code to the client device 106. Optionally, at operation 2107, the agent device 108 may display the authentication sequence code such that the agent user may view the authentication sequence code. The agent user may then audibly or otherwise provide this authentication sequence code to a client user.

Turning now to FIG. 21B, alternatively, at operation 2108, the agent device 108 may automatically provide the authentication sequence code to the client device 106 without requiring the agent user to explicitly provide this to the client user. At operation 2109, the client device 106 may generate the candidate authentication sequence code message. In an instance in which the agent user had audibly or otherwise provided the authentication sequence code to the client user, the client device 106 may generate the candidate authentication sequence code message from input from the client user (e.g., a candidate authentication sequence code input by the client user based on the interaction with the agent user).

Alternatively, the client device 106 may automatically generate the candidate authentication sequence code message upon receipt of the authentication sequence code from the agent device. Alternatively still, the agent device 108 may automatically determine the candidate authentication sequence message based on a client user input indicating whether the candidate authentication sequence message is verified or rejected by the client user. At operation 2110, the client device 106 may provide the candidate authentication sequence code to the system device 104. At operation 2111, the system device 104 may perform verification operations based on the candidate authentication sequence code. At operation 2112, the system device 104 may update a verification status for the current communication. The verification status may be updated based on the result of the verification operations or the candidate authentication sequence code message. At operation 2113*a*, the system device 104 may provide a shared trust decision message to the client device 106 and at operation 2113*b*, the system device 104 may provide a shared trust decision message to the agent device 108. The shared trust decision message may be indicative of the updated verification status for the current communication.

Figure 22A:
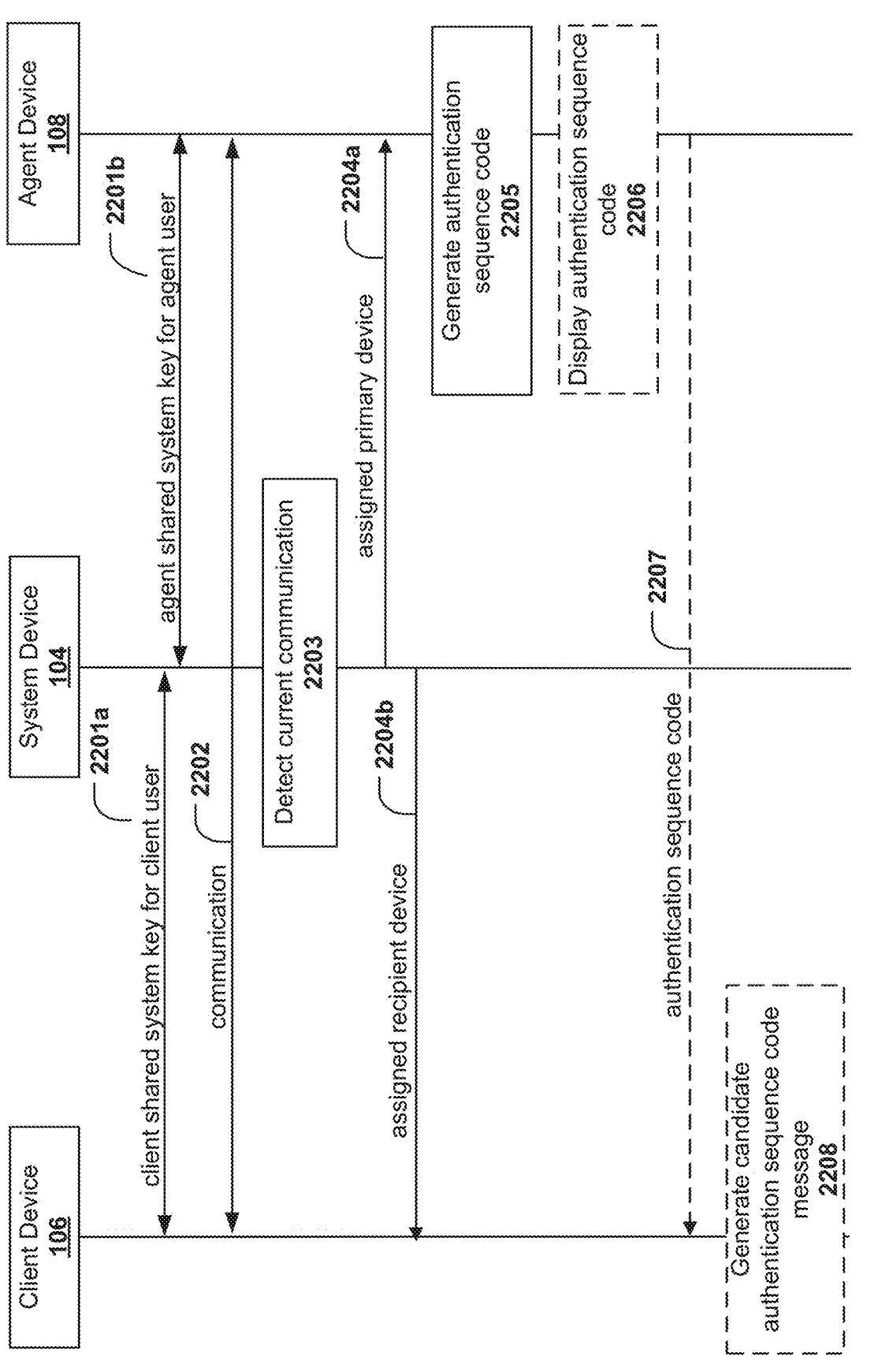
FIGS. 22A-22B illustrate a swim lane diagram with example operations that may be performed by components of the environment depicted in FIGS. 1A-1C in a fourth example scenario in which a primary device generates the authentication sequence code and an agent device serves as the primary device, in accordance with some example embodiments described herein.
Figure 22B:
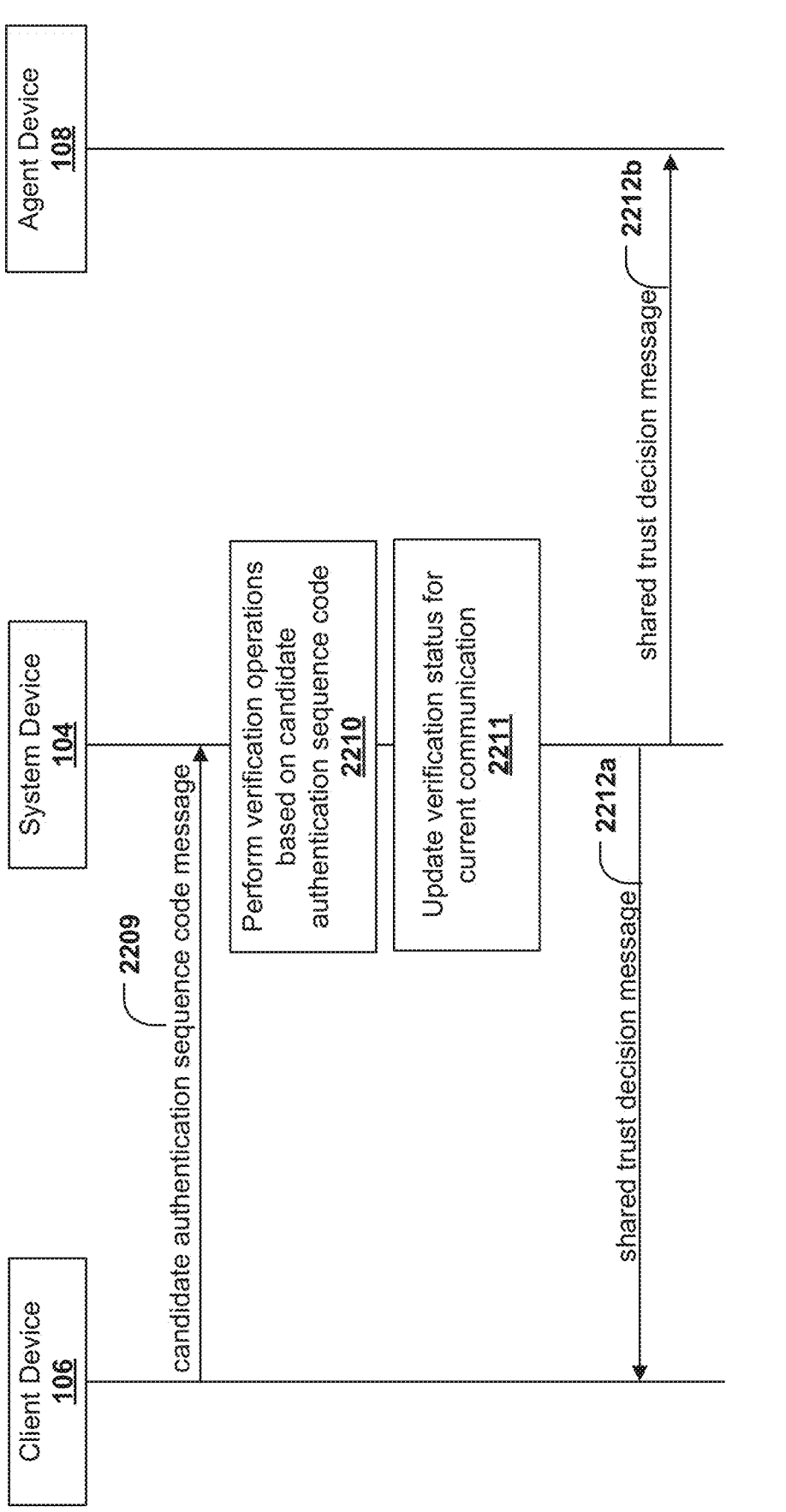

Example Scenario 4: Primary Device Generates Authentication Sequence Code and Agent Device Serves as the Primary Device FIGS. 22A-22B show swim lane diagrams illustrating example operations (e.g., as described above in connection with FIGS. 5-18) performed by components of the environment depicted in FIGS. 1A-1C to produce various benefits of the implementations described herein. In particular, FIGS. 22A-22B illustrate example operations performed in an instance in which a primary device generates the authentication sequence code and the agent device 108 is assigned as the primary device. The operations shown in the swim lane diagram performed by client device 106 are shown along the line extending from the box labeled "Client Device 106," operations performed by a system device 104 are shown along the line extending from the box labeled "System Device 104," and operations performed by agent device 108 are shown along the line extending from the box labeled "Agent Device 108." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIGS. 22A-22B. Additionally, it will be appreciated that although communication is shown between client device 106 and agent device 108, as described above, this communication need not necessarily occur between the client device 106 or agent device 108 that is involved in the authentication process, and instead, may be another client device or agent device. In some embodiments, some of the operations described above in connection with FIGS. 5-18 may be modified or further amplified. Furthermore, in some embodiments, additional optional operations may be included. Modifications, amplifications, or additions to the operations above may be performed in any order and in any combination.

Turning first to FIG. 22A, at operation 2201*a*, the system device 104 and client device 106 establish a client shared system key for a client user. At operation 2201*b*, the system device 104 and agent device 108 establish an agent hared system key for an agent user. At operation 2202, client device 106 and agent device 108 establish communication over a communication channel. At operation 2203, the system device determines the current communication. At operation 2204*a*, the system device 104 assigns the agent device 108 as the primary device and provides the agent device 108 with an indication of its assignment as primary device. At operation 2204*b*, the system device 104 assigns the client device 106 as the recipient device and provides the client device 106 with an indication of its assignment as recipient device. At operation 2205, the agent device 108 generates the authentication sequence code. Optionally, at operation 2206, the agent device 108 may display the authentication sequence code such that the agent user may view the authentication sequence code. The agent user may then audibly or otherwise provide this authentication sequence code to a client user. Alternatively, at operation 2207, the agent device 108 may automatically provide the authentication sequence code to the client device 106 without requiring the agent user to explicitly provide this to the client user. At operation 2208, the client device 106 may generate the candidate authentication sequence code message. In an instance in which the agent user had audibly or otherwise provided the authentication sequence code to the client user, the client device 106 may generate the candidate authentication sequence code message from input from the client user (e.g., a candidate authentication sequence code input by the client user based on the interaction with the agent user). Alternatively, the client device 106 may automatically generate the candidate authentication sequence code message upon receipt of the authentication sequence code from the agent device 108.

Turning now to FIG. 22B, at operation 2209, the client device 106 may provide the candidate authentication sequence code message to the system device 104. At operation 2210, the system device 104 may perform verification operations based on the candidate authentication sequence code. At operation 2211, the system device 104 may update a verification status for the current communication. The verification status may be updated based on the result of the verification operations. At operation 2212*a*, the system device 104 may provide a shared trust decision message to the client device 106 and at operation 2212*b*, the system device 104 may provide a shared trust decision message to the agent device 108. The shared trust decision message may be indicative of the updated verification status for the current communication.

CONCLUSION

As described above, example embodiments provide methods and apparatuses that enable improved verification processes that allow for bi-directional trust to be established between the client user and the agent user. Example embodiments thus provide tools that overcome the problems faced by traditional user authentication processes that are limited to one-sided verification challenges. Additionally, example embodiments contemplated herein further require client users to provide authorization prior to performing or authorizing one or more client user requests such that example embodiments further may serve to a verify client user intent and/or authorization to perform granular actions or interactions related to his/her client user account. Embodiments described herein also require a client user interaction and agent user interaction within a secure environment (e.g., a mobile application or an internal account environment) such that the client user's and agent user's ability to access this information may serve as proof of their respective identities. Thus, example embodiments provide a method for user authentication that is more secure for both the client user as well as the company or entity associated with the client user account and further, provides a new method of interaction that allows client users to express intent and authentication for particular actions related to his/her client account.

Example embodiments additionally allow for different permutations and/or combinations of devices performing specific operations. For example, either a client device or agent device may be assigned as a primary device. As another example, either a system device or primary device may generate the authentication sequence code. Thus, this flexibility in the operational process flow may add an additional layer of difficulty and uncertainty for would-be fraudsters that would be impossible to consistently mimic, thereby improving overall client user account security.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for establishing shared trust with an agent device used by an agent user for a current communication, the method comprising:

providing, by communications hardware of a client device and via a mobile application of the client device, a logon request for a client user account associated with a client user of the client device to a system device;

in an instance in which the logon request was successfully authenticated, determining, by authentication circuitry of the client device and using the mobile application, an authentication sequence code;

causing, by the communications hardware of the client device, the authentication sequence code to be provided to the agent device used by the agent user; and receiving, by the communications hardware of the client device, a shared trust decision message from the system device, wherein (a) the shared trust decision message is indicative of a verification status for the current communication and (b) the verification status is determined based on a candidate authentication sequence code received by the system device from the agent device.

2. The method of claim 1, wherein determining the authentication sequence code further comprises:

receiving, by the communications hardware and via the mobile application, the authentication sequence code from the system device.

3. The method of claim 1, wherein determining the authentication sequence code further comprises:

receiving, by the communications hardware and via the mobile application, the authentication sequence code from the system device;

generating, by the authentication circuitry, a verification ciphertext using a cryptographic hash function and based on a client shared system key; and determining, by the authentication circuitry, a verification authentication sequence code based on the verification ciphertext, wherein in an instance in which the authentication sequence code corresponds to the verification authentication sequence code, the authentication sequence code is provided to the agent device.

4. The method of claim 1, wherein determining the authentication sequence code further comprises:

generating, by the authentication circuitry, the authentication sequence code.

5. The method of claim 4, further comprising:

determining, by the authentication circuitry, a client shared system key; and generating, by the authentication circuitry, an initial ciphertext using a cryptographic hash function and based on the client shared system key, wherein the authentication sequence code is generated based on the initial ciphertext.

6. The method of claim 1, further comprising:

receiving, by the communications hardware, a prompt to determine the authentication sequence code from the system device, wherein (i) the received prompt is indicative of a primary device assignment, (ii) the received prompt is indicative to provide the authentication sequence code to the agent device, and (iii) the received prompt further includes device information for the agent device.

7. The method of claim 1, further comprising:

receiving, by the communications hardware, a client shared system key from the system device; and storing, by the authentication circuitry, the client shared system key, wherein the client shared system key is linked to a user account associated with the client user.

8. The method of claim 7, further comprising:

protecting, by the authentication circuitry, the client shared system key prior to storing the client shared system key.

9. The method of claim 1, wherein causing the authentication sequence code to be provided to the agent device further comprises:

receiving, by the communications hardware and via the mobile application, client user authorization to provide the authentication sequence code; and providing, by the communications hardware, the authentication sequence code to the agent device in response to receiving the client user authorization.

10. The method of claim 1, wherein causing the authentication sequence code to be provided to the agent device further comprises:

displaying, by visualization circuitry, the authentication sequence code within the mobile application.

11. The method of claim 1, further comprising:

displaying, by visualization circuitry, the verification status of the current communication within the mobile application.

12. The method of claim 1, further comprising:

displaying, by visualization circuitry, agent information within the mobile application, wherein the agent information comprises at least one of an agent name, department, phone number, email, branch location, picture, or live video.

13. The method of claim 1, wherein the authentication sequence code is a one-time password.

14. An apparatus, including a client device, for establishing shared trust with an agent device used by an agent user for a current communication, the apparatus comprising:

communications hardware of the client device configured to:

provide, via a mobile application of the client device, a logon request for a client user account associated with a client user to a system device; and authentication circuitry of the client device configured to:

in an instance in which the logon request was successfully authenticated, determine, using the mobile application of the client device, an authentication sequence code;

wherein the communications hardware of the client device is further configured to:

cause the authentication sequence code to be provided to the agent device used by the agent user, and receive a shared trust decision message from the system device, wherein (a) the shared trust decision message is indicative of a verification status for the current communication and (b) the verification status is determined based on a candidate authentication sequence code received by the system device from the agent device.

15. The apparatus of claim 14, wherein the communications hardware is further configured to receive, via the mobile application, the authentication sequence code from the system device.

16. The apparatus of claim 14, wherein the authentication circuitry is further configured to generate the authentication sequence code.

17. The apparatus of claim 16, wherein authentication circuitry is further configured to:

determine a client shared system key; and generate an initial ciphertext using a cryptographic hash function and based on the client shared system key, wherein the authentication sequence code is generated based on the initial ciphertext.

18. The apparatus of claim 14, wherein the communications hardware is further configured to:

receive a prompt to determine the authentication sequence code from the system device, wherein (i) the received prompt is indicative of a primary device assignment, (ii) the received prompt is indicative to provide the authentication sequence code to the agent device, and (iii) the received prompt further includes device information for the agent device.

19. The apparatus of claim 14, further comprising visualization circuitry configured to display the verification status of the current communication within the mobile application.

20. A computer program product for establishing shared trust with an agent device used by an agent user for a current communication, the computer program product comprising at least one non-transitory computer-readable storage medium storing software instructions that, when executed, cause an apparatus including a client device to:

provide, via a mobile application of the client device, a logon request for a client user account associated with a client user to a system device;

in an instance in which the logon request was successfully authenticated, determine, using the mobile application of the client device, an authentication sequence code;

cause the authentication sequence code to be provided to the agent device associated with the agent user; and receive a shared trust decision message from the system device, wherein (a) the shared trust decision message is indicative of a verification status for the current communication and (b) the verification status is determined based on a candidate authentication sequence code received by the system device from the agent device.

* * * * *